United States Patent

Nakayasu et al.

[11] Patent Number: 6,049,690
[45] Date of Patent: *Apr. 11, 2000

[54] PRINTING APPARATUS

[75] Inventors: Hirofumi Nakayasu; Hiroji Uchimura; Morihisa Kawahara; Tsutomu Nagatomi; Kouichi Kobayashi; Youji Houki; Takeo Kojima, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/041,003

[22] Filed: Mar. 12, 1998

[30] Foreign Application Priority Data

Jun. 5, 1997 [JP] Japan .................................. 9-147647

[51] Int. Cl.$^7$ ................................. G03G 15/14
[52] U.S. Cl. ..................... 399/301; 399/299; 399/306
[58] Field of Search .............................. 399/299, 300, 399/301, 306

[56] References Cited

U.S. PATENT DOCUMENTS

| | | | |
|---|---|---|---|
| 4,752,804 | 6/1988 | Ohno | 399/300 |
| 4,796,050 | 1/1989 | Furuta et al. | 399/299 |
| 5,243,396 | 9/1993 | Castelli et al. | 399/301 |

*Primary Examiner*—Richard Moses
*Attorney, Agent, or Firm*—Armstrong, Westerman, Hattori, McLeland & Naughton

[57] ABSTRACT

A drum phase correction unit for detecting rotational positions of a plurality of photosensitive drums by means of a plurality of drum position sensors and corrects to set rotational phases of the drums to predetermined phases in such a manner that transfer positions on drum circumferential surfaces relative to a belt when employing the thus detected rotational positions as their respective references have a specific relationship including coincidence. A positional offset detection unit detects positional offsets of transfer image on recording paper attributable to the wow and flutter in a drive system including the belt and the photosensitive drums. On the basis of the thus detected positional offsets, a wow and flutter correction unit corrects the positional offsets of the transfer images on the recording paper attributable to the wow and flutter.

22 Claims, 44 Drawing Sheets

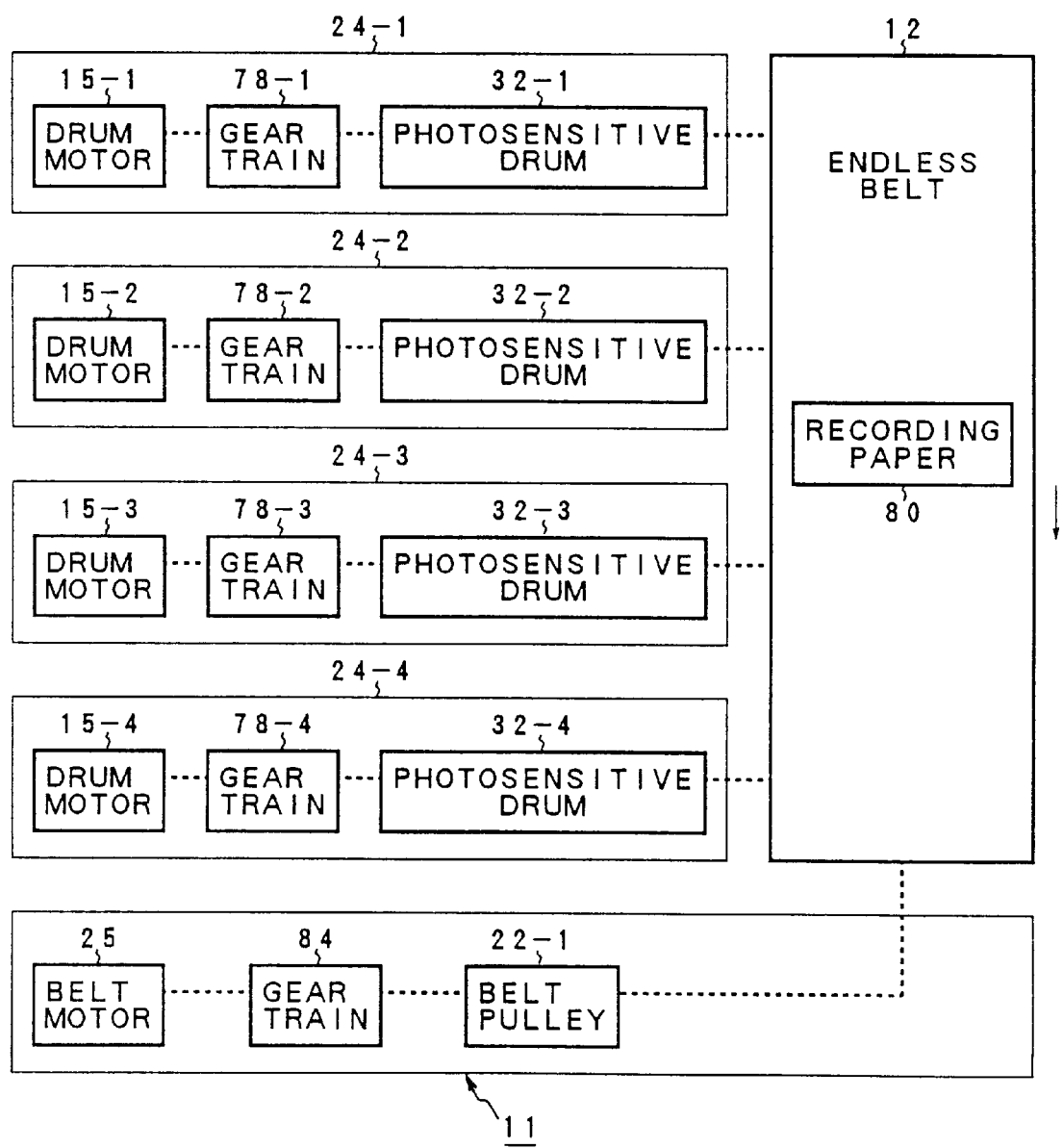

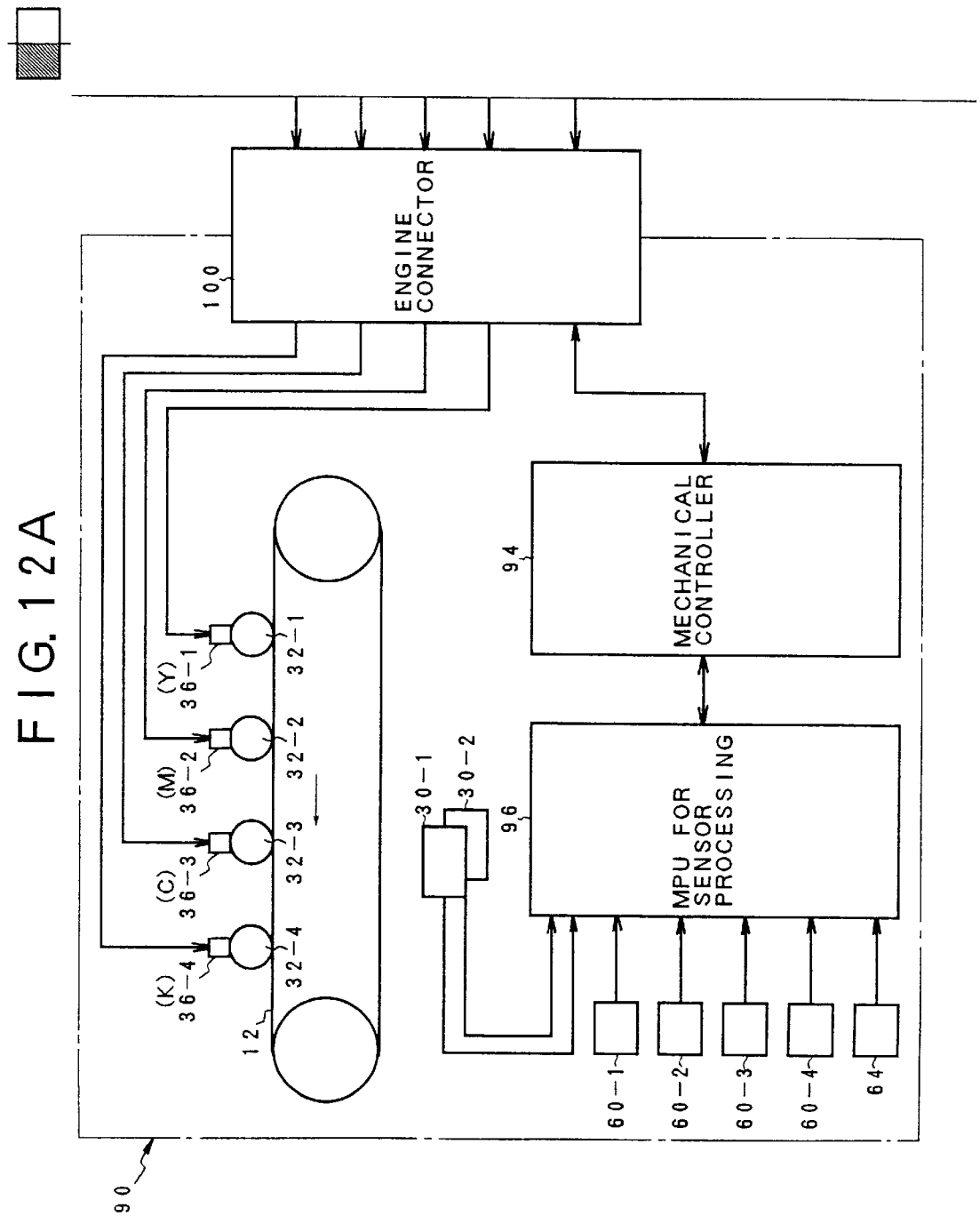

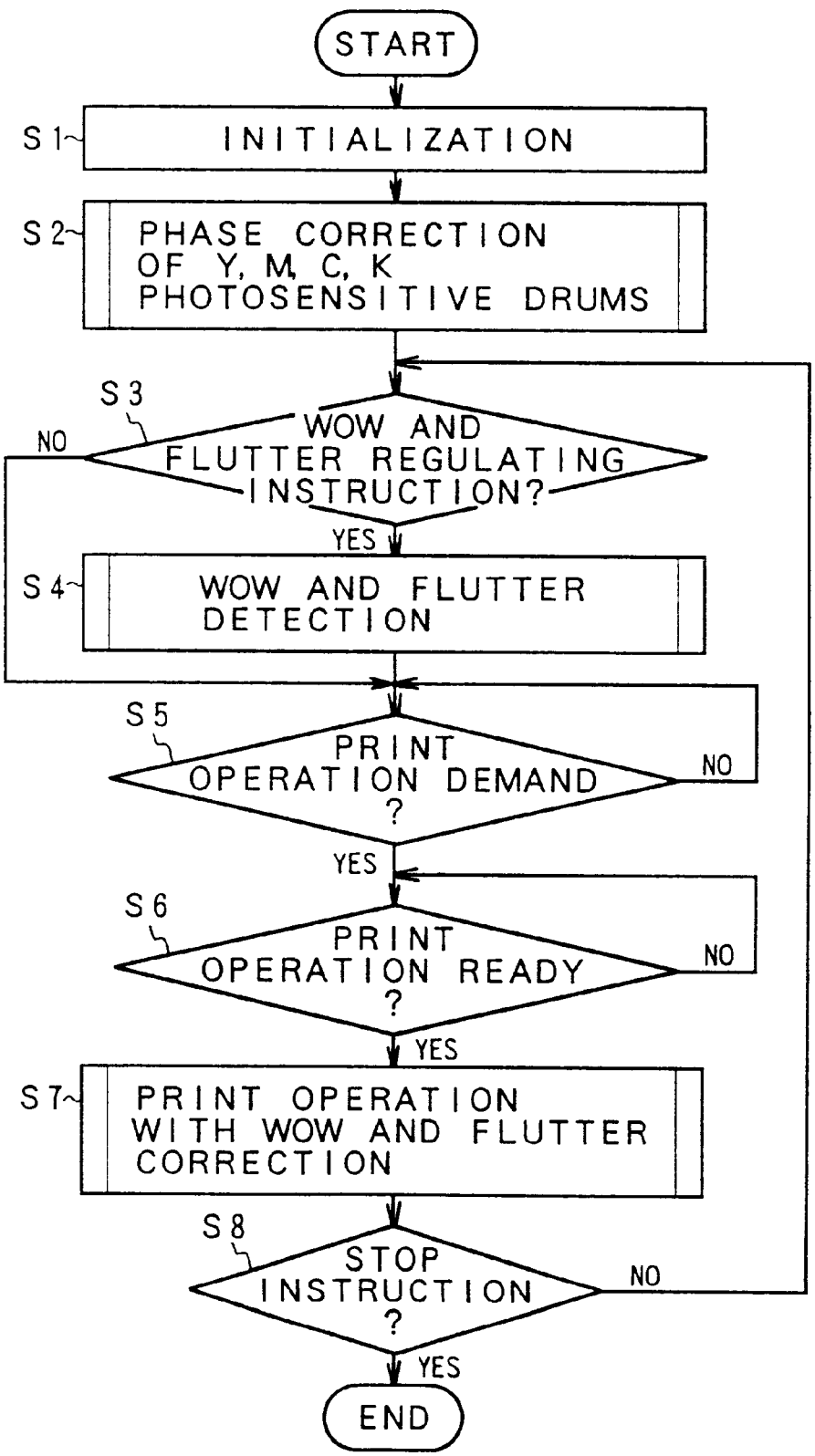

F I G. 1 5
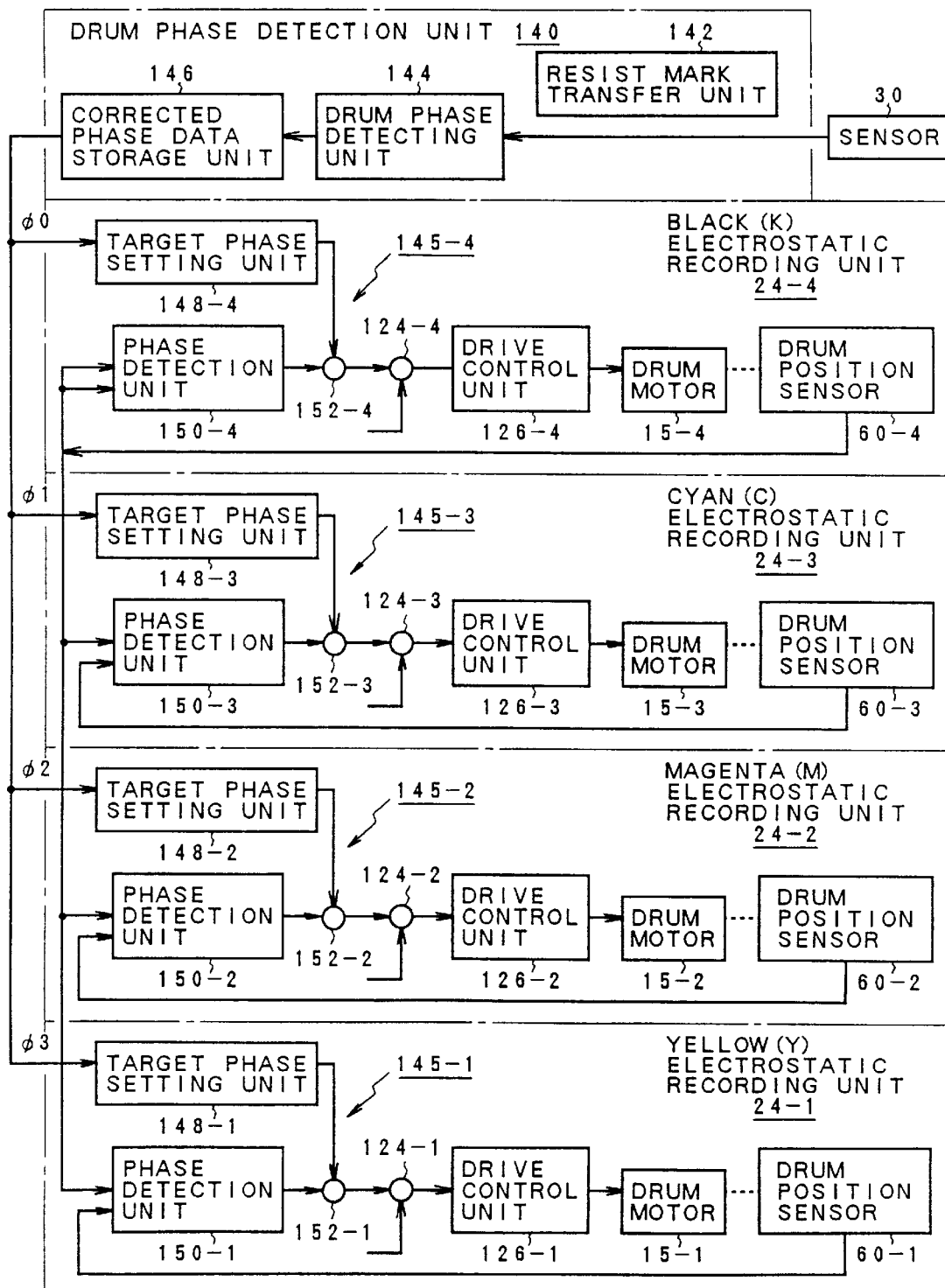

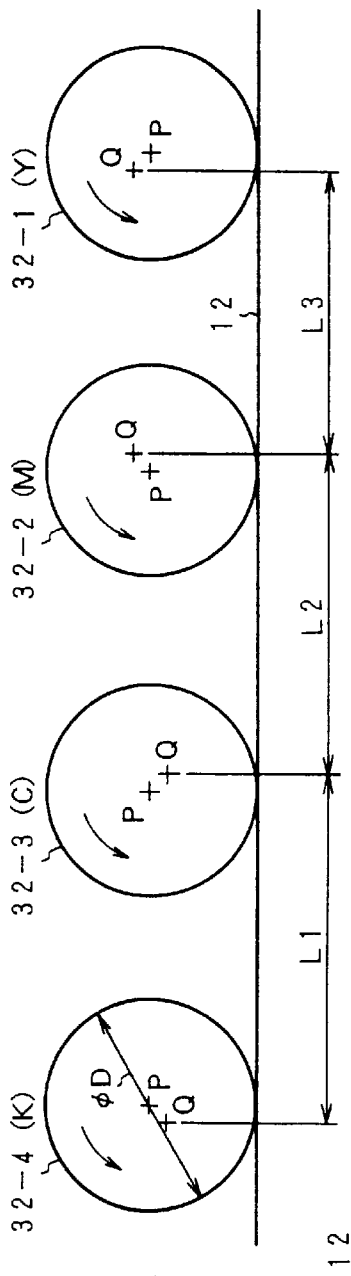
F I G. 16A
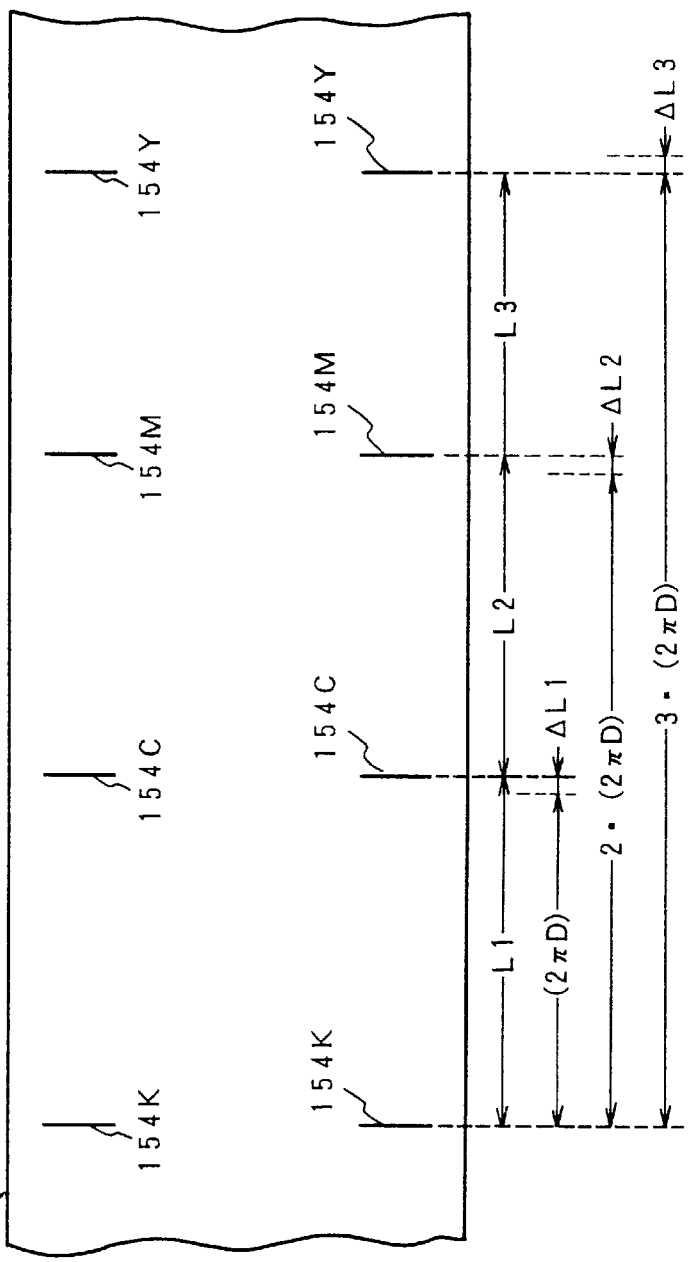
F I G. 16B

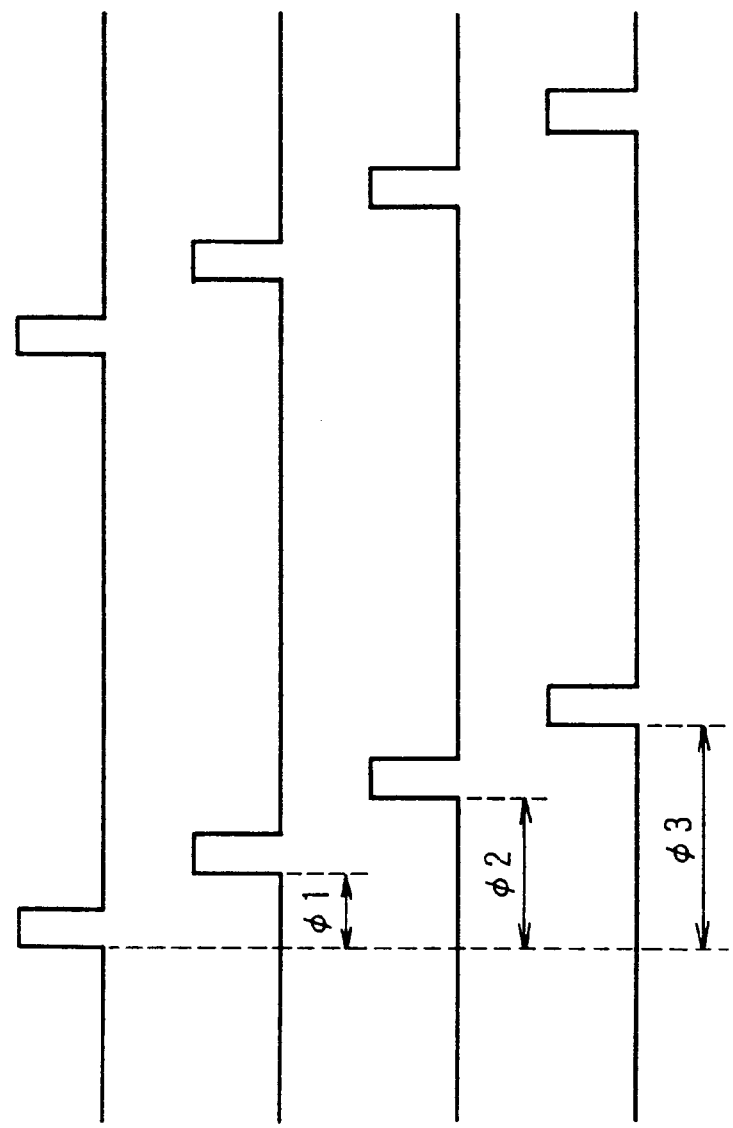

F I G. 2 0 A
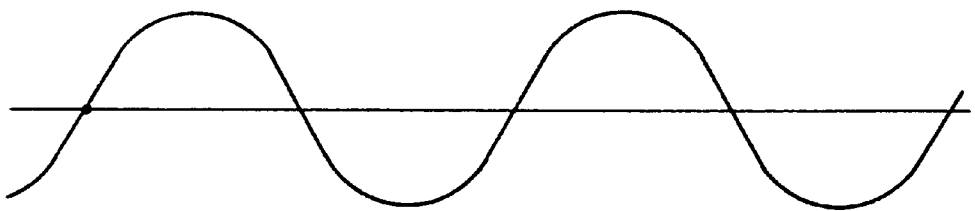
F I G. 2 0 B
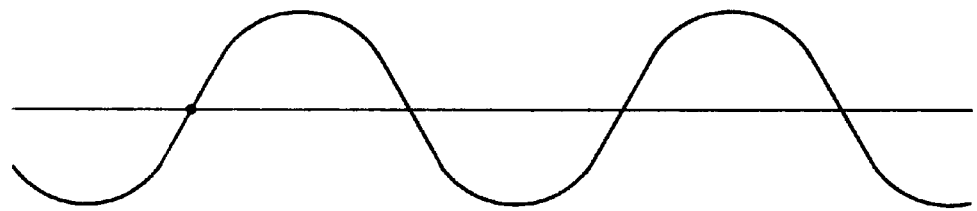
F I G. 2 0 C
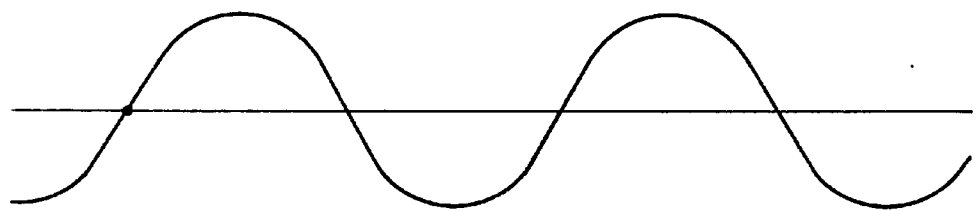
F I G. 2 0 D
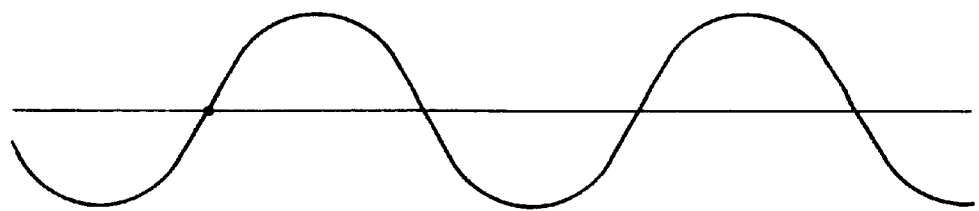

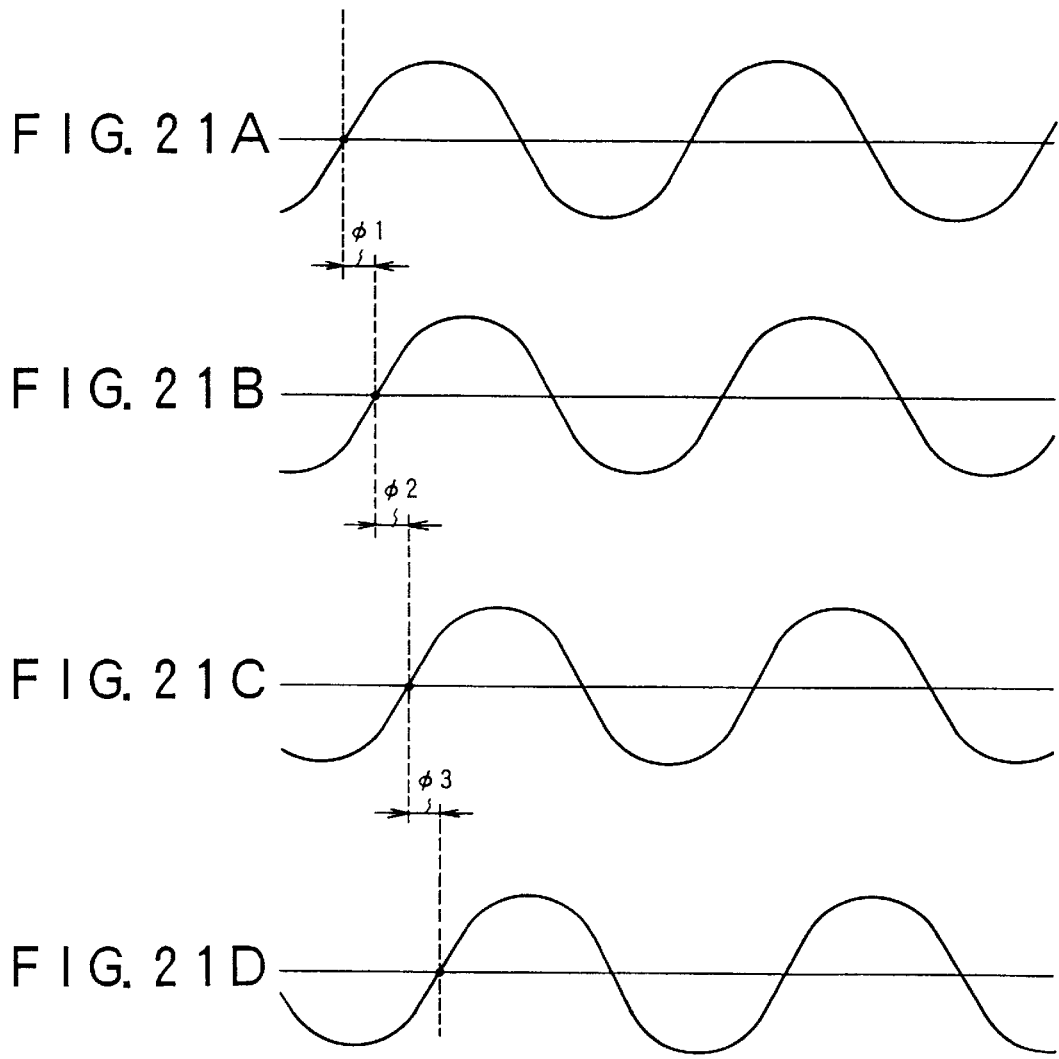

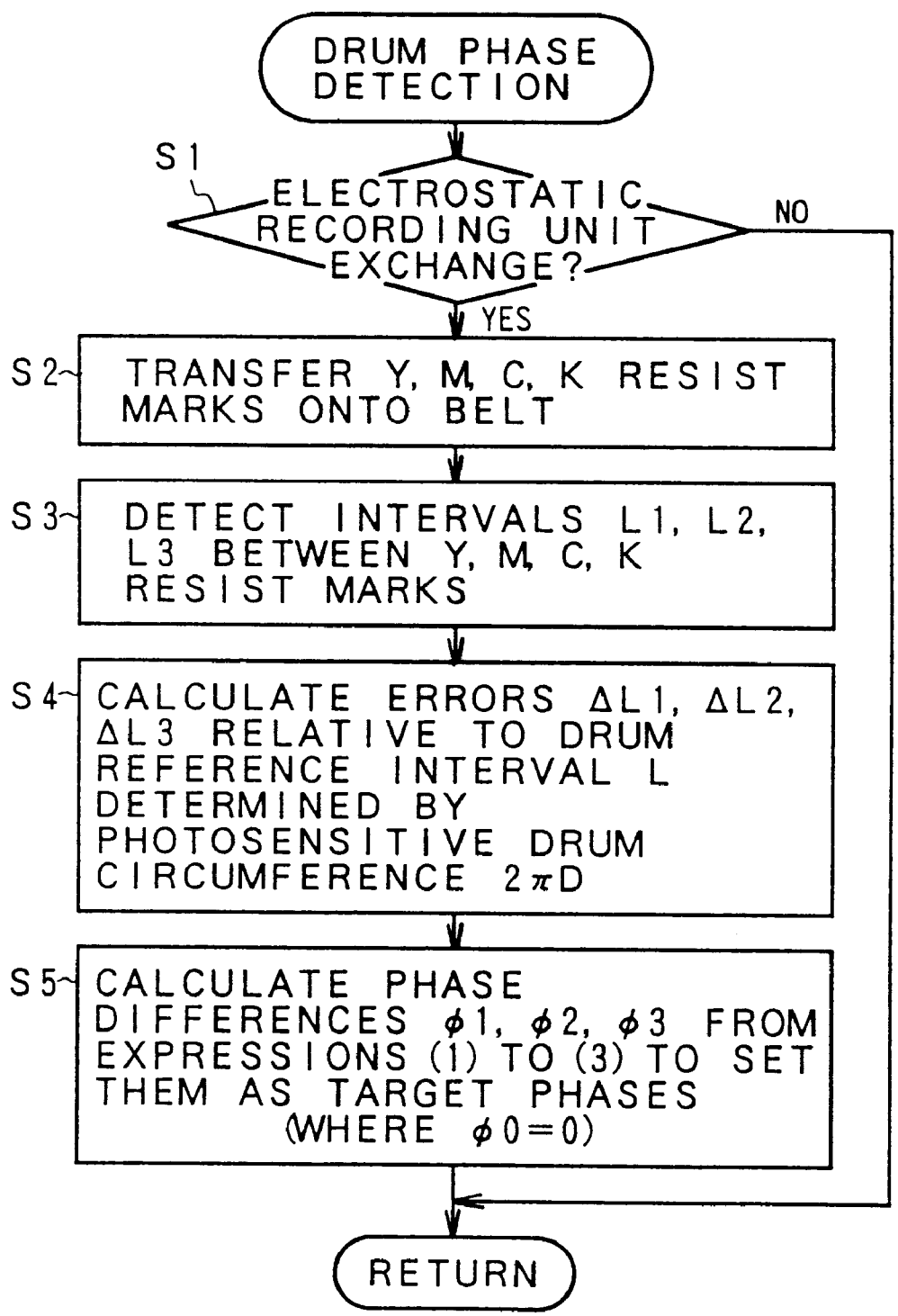

FIG. 33A BELT CONVEYANCE SYNCHRONIZING PULSE

FIG. 33B CLOCK

FIG. 33C MOTOR DRIVE PULSE

FIG. 33D ADDRESS COUNTER

FIG. 33E CORRECTION TABLE READ-OUT VALUE

FIG. 33F ADDER OUTPUT VALUE

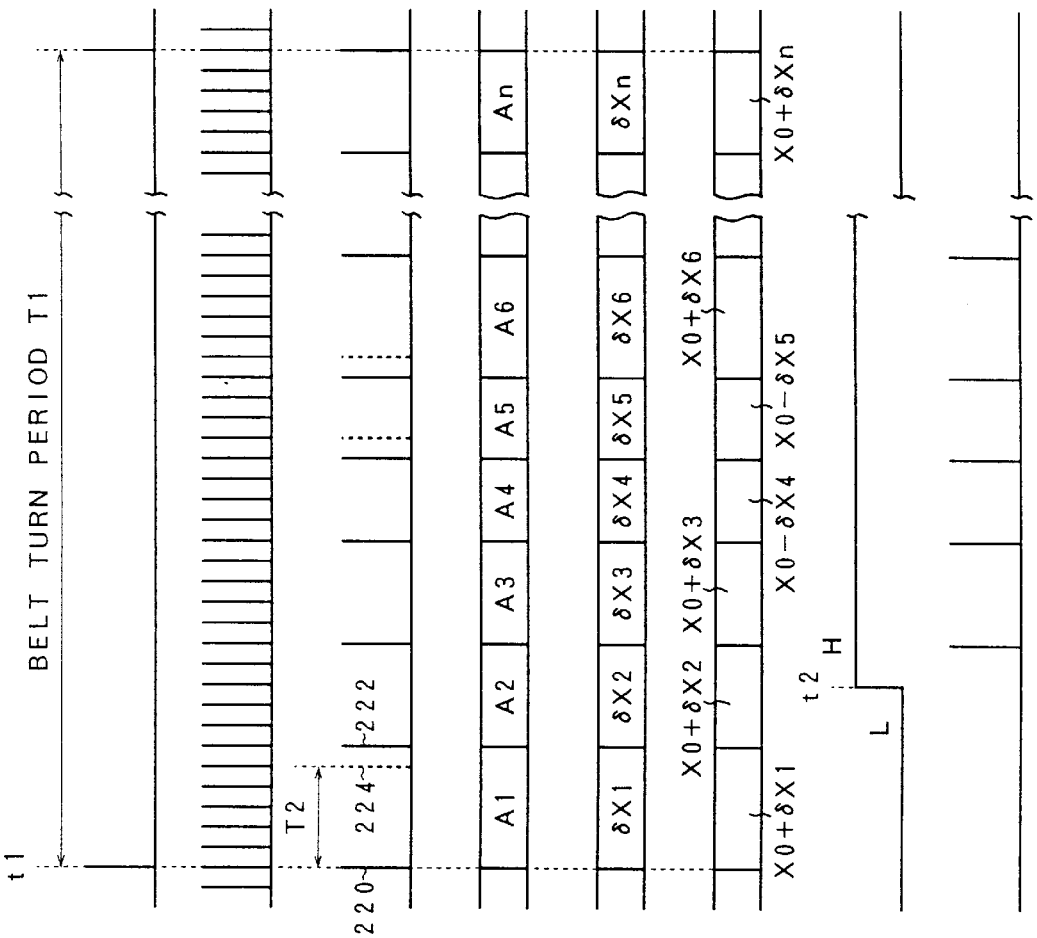

F I G. 3 5
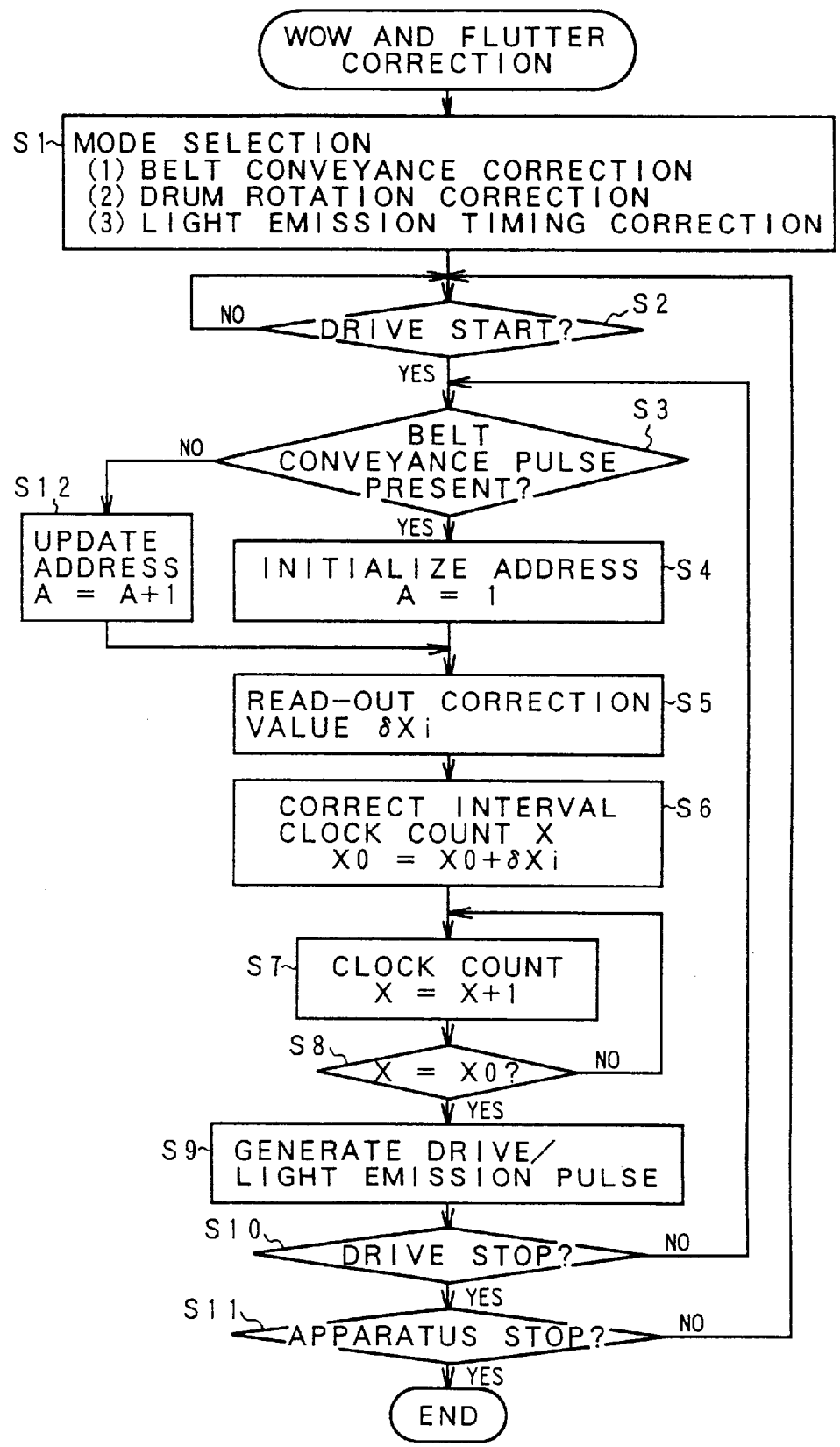

BELT
SYNCHRONIZING
PULSE

RECORDING
PAPER WOW
AND FLUTTER

BELT PULLEY
WOW AND
FLUTTER

MOTOR GEAR
WOW AND
FLUTTER

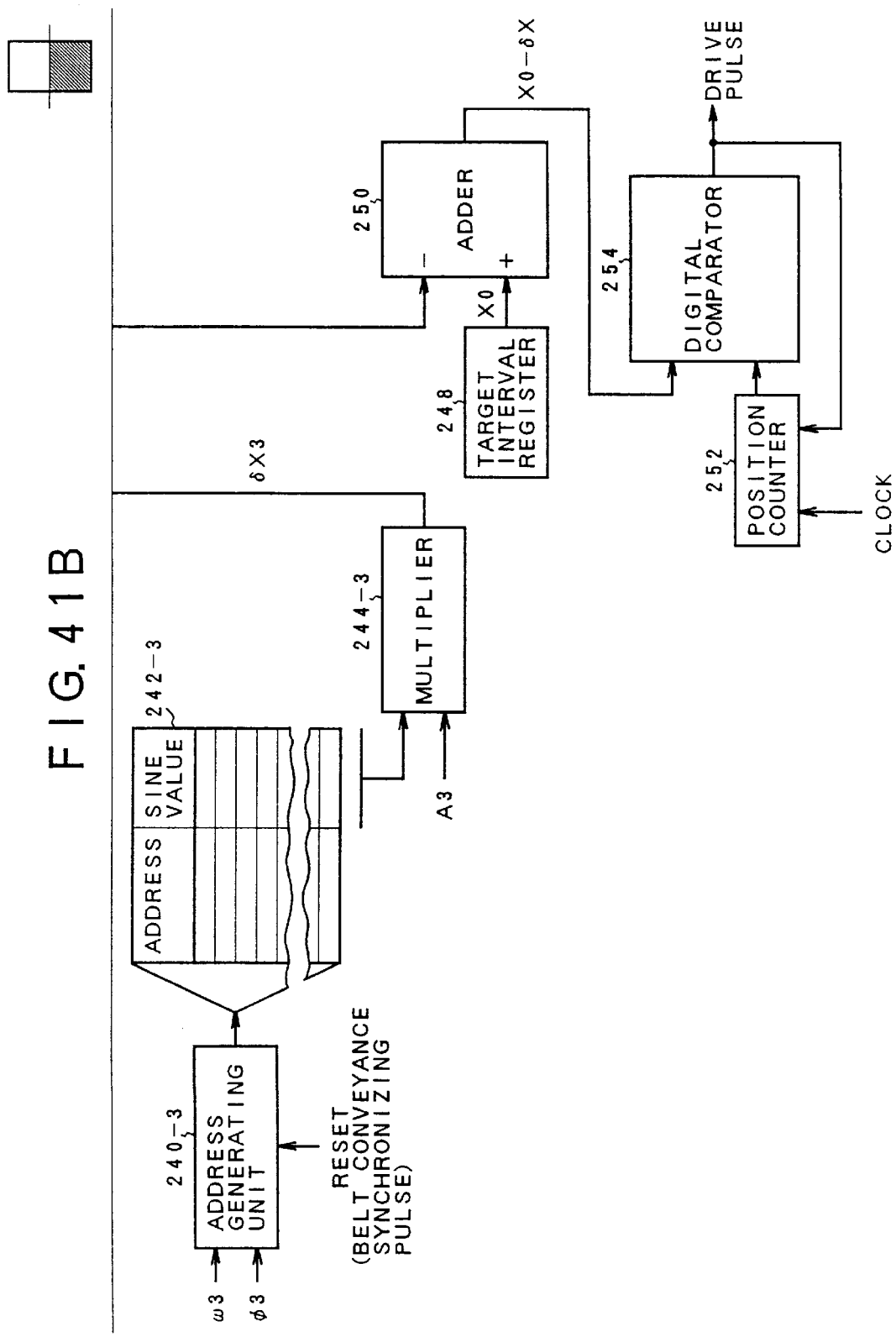

PRINTING APPARATUS

BACKGROUND OF THE INVENTION

1. Field of the Invention

The present invention relates in general to a printing apparatus that prints full-color images by transferring overlapped different color images by use of a plurality of electrostatic recording units equipped with the function of electrophotographic recording printing and, more particularly, to a printing apparatus that corrects a wow and flutter of color images caused by a flutter in the speed of a plurality of detachable electrostatic recording unit's photosensitive drums or a wow and flutter of a drive system including belts which convey recording paper.

2. Description of the Related Art

The conventional color printing apparatus utilizing electrophotographic recording places in tandem the four-color (black (K), cyan (C), magenta (M), and yellow (Y)) electrostatic recording units in a direction in which recording paper is conveyed. Those four-color electrostatic recording units form latent images by optically scanning a photosensitive drum based on the image data and develop the latent images with color toner and then overlap and transfer those latent images onto constantly moving recording paper in order of yellow (Y), magenta (M), cyan (C), and black (K) and finally heat and fix them with a fixing apparatus. The yellow (Y), magenta (M), cyan (C), and black (K) electrostatic recording units must be replaced totally or partially immediately after the color toner has run out. For this purpose, the electrostatic recording units have a structure such that they can easily be detached with the unit cover as opened.

The color printing apparatus in which Y, M, C, and K electrostatic recording units are placed in tandem in a direction of conveying recording paper must improve the accuracy of color matching by decreasing the wow and flutter of toner images transferred onto moving recording paper by those electrostatic recording units. If, for example, the resolution in both the main scanning direction (perpendicular to the conveying direction) and the sub-scanning direction (conveying direction) of recording paper is 600 dpi, the pixel pitch is about 42 micrometers, so that the wow and flutter must be decreased to 42 micrometers or less. Those color printing apparatus of a structure that Y, M, C, and K electrostatic recording units are placed in tandem in a recording-paper conveying direction transfer toner images by rotating the Y, M, C, and K electrostatic recording units at a constant speed while conveying a conveyer belt which sucks the recording paper. With this, to increase the resolution in a sub-scanning direction, i.e. recording-paper conveying direction, the circumferential rotational speed of the belt and the circumferential speed of the photosensitive drum must be held at a constant value. The belt conveyer system transmits motor rotations via a gear train to a belt pulley, to circulate the belt. Likewise, the photosensitive drum drive system transmits motor rotations via a gear train to the photosensitive drums. Those systems, however, are susceptible to an axial eccentricity due to a mechanical inaccuracy of the rotational axis, which eccentricity causes a periodical flutter in the belt's circumferential rotational seed and circumferential speed. Therefore, even if the belt drive motor and the drum drive motor are accurately controlled at a prescribed target speed, an inevitable wow and flutter develops in the belt's circumferential rotational speed and circumferential speed caused by an eccentricity of the rotational center, thus fluctuating the pixel pitch. To decrease the wow and flutter of pixels because of a speed flutter, the mechanical processing accuracy and assembly accuracy for the rotating portions of the drive systems must be improved, thus greatly increasing the manufacturing cost. For example, it has been difficult to control a speed flutter mechanically so as to decrease the printing error down to 42 micrometers or less within a practical cost. With this, the conventional tandem-type color printing apparatus bring about as large as a 300 micrometers of a wow and flutter, being difficult to provide a practical printing quality by use of overlapping of color components.

SUMMARY OF THE INVENTION

It is therefore the object of the present invention to provide a printing apparatus that prints high-accuracy color images by correcting the wow and flutter due to a wow and flutter of the drive system, independently of the processing accuracy and assembly accuracy.

A printing apparatus according to the present invention comprises: a belt conveyer system which circulates a belt (at a constant speed endless belt) by driving a pulley with a belt motor, to convey recording paper sucked on the belt; and a plurality of electrostatic recording units which are placed in a direction in which the belt conveys recording paper and which form latent images based on the image data by performing optical scanning for a photosensitive drum 32 rotated at a constant speed by the drum motor and then develop those latent images with toner components of different colors and finally transfer them onto the recording paper on the belt.

Phase correction for photosensitive drum

Such a printing apparatus according to the present invention features that each of a plurality of photosensitive drums is provided with a drum position sensor which detects a prescribed rotational drum position. Based on the thus detected position used as a reference, a drum phase correction unit is provided which corrects the phase of each of those drums so that they may match on, for example, the recording paper in phase. By thus matching the rotational phases of the photosensitive drums, it is possible to regulate the eccentric direction of the rotational center in the drum drive system from the drum motor via the gear train through the photosensitive drums, so that even with a flutter in the circumferential speed of the photosensitive drums present, the transfer position by each of those drums can be matched on the recording paper on the belt. Therefore, the pixel pitch in the conveying direction may change but it is possible to decrease the flutter of each color pixel (color mismatch) of Y, M, C, and K overlapped and transferred at the same position.

The drum phase correction unit comprises a resist-mark transfer unit, a phase correction unit, and a phase control unit. The resist-mark transfer unit simultaneously operates a plurality of electrostatic recording units on a belt, to transfer the resist mark of each color. The phase detection unit uses a sensor to detect a resist mark transferred on the belt, to obtain a transfer interval with respect to the adjacent electrostatic recording unit and a rotational phase of other photosensitive drums with respect to a particular photosensitive drum. The phase control unit controls the phase of the drum motor in such a way as to maintain a rotational phase of other photosensitive drums detected by the phase detection unit as relative to a reference phase of a reference photosensitive drum. The phase detection unit, based on thus determined interval L of the adjacent drum, obtains the remainder of a drum circumference (2πD) and determines an error (L mod 2πD) as well as a cumulative error of other photosensitive drums with respect to a photosensitive drum positioned at the edge and then converts each cumulative error into a drum rotational angle to calculate a rotational phase φ. Another aspect of the drum position correction unit employs a design value rather than detecting the drum interval by transferring resist marks. That is, the phase detection unit sets to a prescribed value L0 the adjacent drum interval for a plurality of electrostatic recording units and uses the drum interval L0 to obtain the remainder of the drum circumference (2πD) based on the drum diameter D. It then obtains an error (L0 mod 2πD) as well as each cumulative error of other photosensitive drums with respect to the photosensitive drum positioned at the edge and converts this error into a rotational drum angle, to determine the rotational phase φ with respect to the reference drum. The phase control unit performs phase control so that a phase with respect to thus determined rotational position of the reference photosensitive drum to the detected rotational position of other photosensitive drums may agree with a phase detected by the phase detection unit. The plurality of electrostatic recording units are placed, from the upstream side to the downstream side of the belt, starting from yellow, magenta, cyan, and to block or cyan, magenta, yellow, and to black, so that the phase detection unit and the phase control unit respectively detect and control the phase with reference to the photosensitive drum of a black electrostatic recording unit. Upon the start-up by power application after the electrostatic recording unit is replaced, the drum phase correction unit detects the rotational position of a plurality of photosensitive drums and corrects each drum phase so that it agrees with a prescribed phase value. The drum phase correction unit may detect the rotational position of the plurality of photosensitive drums to regulate each drum's rotational position to a prescribed value at factory shipment or other manufacturing steps.

Correction of wow and flutter

The present invention features a belt conveyer system and a plurality of electrostatic recording units, comprising a wow and flutter detection unit which detects a flutter of images transferred onto recording paper caused by a wow and flutter of the drive system including a belt and photosensitive drums; and a speed flutter correction unit which corrects a flutter of the transferred images with respect to the recording paper caused by the speed flutter, based on the flutter detected by the wow and flutter detection unit. By thus detecting a wow and flutter of the drive system of the belt and photosensitive drums contributing to a flutter of images transferred onto the recording paper and then correcting the speed so as to eliminate the wow and flutter, it is possible to decrease the wow and flutter caused by the eccentricity of the rotational center of the rotating members such as gears, drums, and rollers in the drive system, thereby improving the accuracy of pixel pitch in the recording-paper conveying direction on the belt, without increasing the processing accuracy and assembly accuracy.

The wow and flutter detection unit comprises: a resist-mark transfer unit which transfers resist marks at a prescribed interval by operating at least one electrostatic recording unit on the belt; and a wow and flutter detection unit which detects a flutter of transferred images with respect to a position on the belt, to provide a correction value. The wow and flutter detection unit, moreover, has a belt-position sensor which detects a reference position of the conveyer belt. The resist-mark transfer unit transfers resist marks at a prescribed pitch all over the circumference of the belt in synchronization with a position, as a start point, detected by the belt position sensor, while the wow and flutter detection unit detects a flutter for each prescribed pitch all over the circumference of the belt with respect to a position, as the start point, detected by the belt position sensor, to generate a correction and store it in the correction information storage unit. The wow and flutter correction unit comprises a belt-speed control unit which corrects and controls the speed of a belt motor so as to eliminate a flutter of transferred images caused by the wow and flutter of the drive system, based on a correction value generated by the wow and flutter detection unit. Alternatively, a drum seed control unit may be employed which corrects and controls the speed of a plurality of drum motors so as to eliminate a flutter of transferred images caused by the wow and flutter of the drive system, based on a correction value generated by the wow and flutter detection unit. Even alternatively, a light emission control unit may be employed which corrects and controls the light emission timing in a sub-scanning direction, i.e. the belt conveying direction in optical scanning of the electrostatic recording units.

Fourier transform

Another aspect of the wow and flutter detection unit according to the present invention comprises a Fourier transform unit which conducts Fourier transform on a flutter in the belt conveyance direction detected by the wow and flutter detection unit and divides it into flutter components for each plurality of frequency components and then stores it in the correction information storage unit. The Fourier transform unit performs Fourier transform on belt-conveyance directional interval errors δX1, δX2, . . . , δXn or average intervals ΔX1, ΔX2, ΔX3, . . . , ΔXn detected by the wow and flutter detection unit and generates the following sine function which gives a wow and flutter δXi for a peculiar frequency component fi:

$$\delta Xi = Ai \cdot \sin(\omega i \cdot t + \phi i)$$

and stores angular frequency ωi [rad/s], phase φi [rad], and amplitude Ai [μm] of this sine function as correction information, in the correction information storage unit.

Based on the correction information of angular frequency ωi, phase φi, and amplitude Ai stored by the Fourier transform unit, the wow and flutter correction unit calculates a correction δXi for each frequency component fi for each belt conveyance position from the sine function, to obtain an offset amount δX, and based on the offset amount δX, conducts control to eliminate a wow and flutter of transferred images. This correction control comes in belt-motor speed correction, drum-motor speed correction, or correction control of light emission timing in the sub-scanning direction, i.e. belt-conveyance direction in the optical scanning of the electrostatic recording units. The wow and flutter detection unit detects a wow and flutter of transferred images which has caused a wow and flutter of the drive system, upon the start-up by power application immediately after a plurality of electrostatic recording units are replaced. The wow and flutter of transferred images responsible for a wow and flutter of the drive system may be detected at factory shipment or other manufacturing steps.

The above and other objects, feature, and advantages of the present invention will become more apparent from the following detailed description with reference to the drawings.

BRIEF DESCRIPTION OF THE DRAWINGS

FIG. 10 is a block diagram of photosensitive drum and belt drive systems according to the present invention;

FIGS. 12A and 12B are block diagrams of a hardware configuration according to the present invention;

FIG. 13 is a flowchart for overall printing according to the present invention;

FIG. 15 is a block diagram of the control functions for drum rotational phase detection and correction processing;

FIGS. 16A and 16B show transferring of resist marks for a belt to detect an eccentric state and a drum interval when rotational phases of photosensitive drums are not matched;

FIGS. 19A, 19B, 19C, and 19D are timing charts for detection signals of a drum position sensor when drum rotational phases are matched;

FIGS. 20A and 20B are speed diagrams illustrating fluctuations in the drum circumferential speed before drum rotational phases are corrected;

FIGS. 21A, 21B, 21C, and 21D are speed diagrams illustrating fluctuations in the drum circumferential speed after drum rotational phases are corrected;

FIG. 22 is a flowchart for detecting drum phases, according to the present invention;

FIGS. 33A, 33B, 33C, 33D, 33E, and 33F are timing charts for driving a belt or photosensitive drums by correction of a wow and flutter of FIG. 32;

FIGS. 34A, 34B, 34C, 34D, 34E, 34F, and 34H are timing charts for light emission driving of LED arrays by correction of a wow and flutter of FIG. 32;

FIG. 35 is a flowchart for correction of a wow and flutter by FIG. 32;

FIGS. 41A and 41B are functional block diagrams wow and flutter correction by combining of three frequency components which are Fourier-transformed in FIG. 37.

DETAILED DESCRIPTION OF THE PREFERRED EMBODIMENTS

Printer structure

Figure 1:
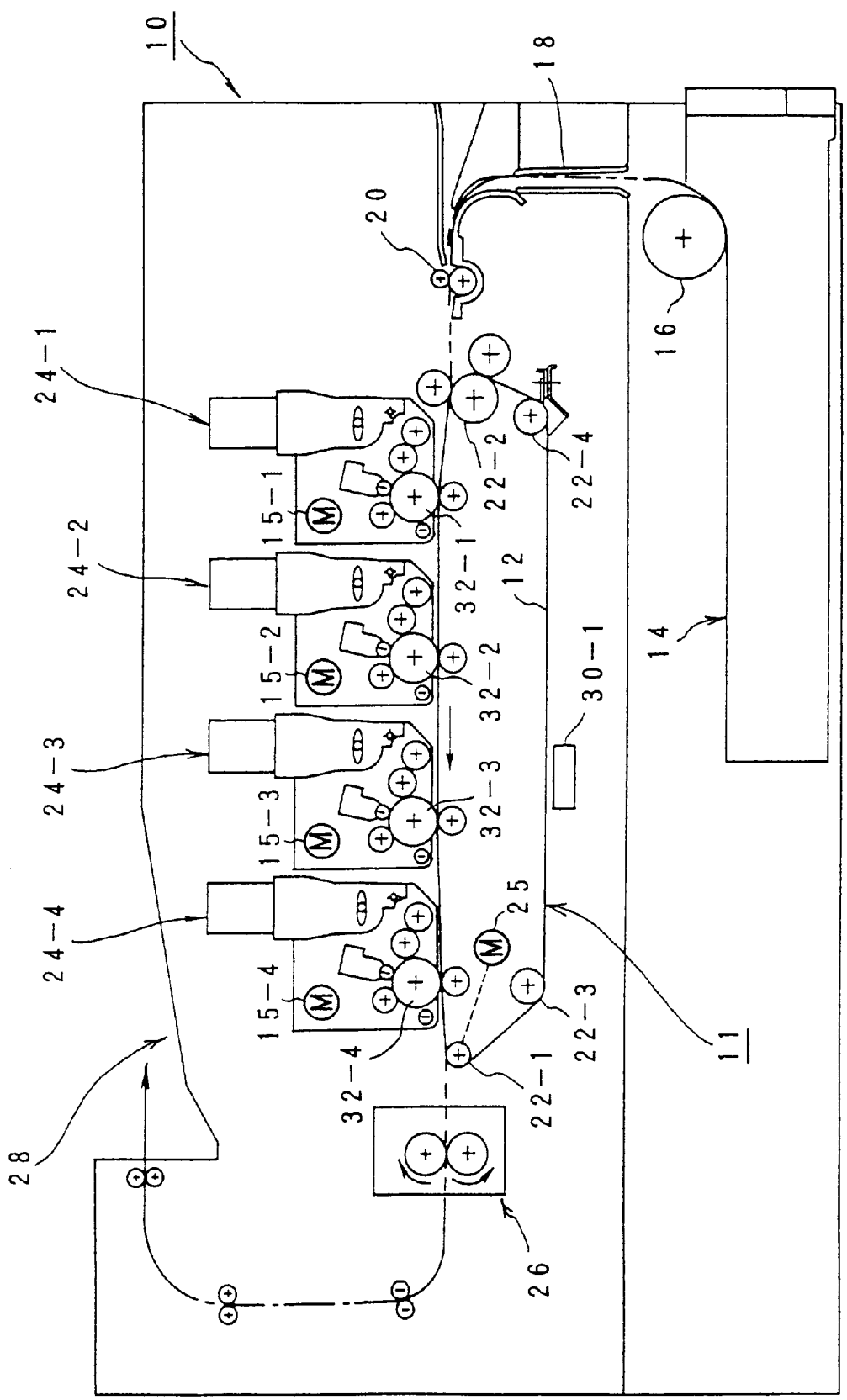
FIG. 1 shows an internal structure of the printing apparatus of a printing apparatus according to the present invention.

FIG. 1 shows an internal structure of a printing apparatus according to the present invention. A printing apparatus body 10 incorporates a conveyance belt unit 11 which conveys recording medium, e.g. recording paper. The conveyance belt unit 11 has a rotational endless belt 12 made of an appropriate plastic material. The endless belt 12 is engaged around rollers 22-1, 22-2, 22-3, and 22-4. The conveyance belt unit 11 is mounted on the printing apparatus body 10 in a detachable manner. The roller 221- acts as a drive roller, while the roller 22-1 drives the endless belt 12 in a circumferential manner at a constant speed clockwise as indicated by an arrow, by use of a belt drive motor 25 coupled via a gear train (not shown). The drive roller 22-1 acts also as an AC-removal roller to remove electric charge from the endless belt 12. The roller 22-2 acts as a driven roller, which in turn acts as a charged roller which charges the endless belt 12. The rollers 22-3 and 22-4 both act as a guide roller, being placed near the drive rollers 22-1 and 22-2 respectively. An upper side travel portion of the endless belt 12 between the drive roller 22-2 and the driven roller 22-1 forms a travel path for recording paper. Recording paper is stored in a hopper 14 and picked up by each sheet starting from the top in the hopper 14 by a pick-up roller 16 and then passes through a recording paper guide path 18 and is introduced by a pair of recording paper rollers 20 to a recording paper travel path on the belt 12 side from the driven roller 22-2 side of the endless belt 12 and finally is ejected from the drive roller 22-1 when it has passed through the recording paper travel path. Since the endless belt 12 is charged by the driven roller 22-2, recording paper is sucked electrostatically to the endless belt 12 when it has been introduced to the recording paper travel path, thus preventing a wow and flutter of the recording paper itself during travel. The ejecting drive roller 22-1, on the other hand, acts as a discharging roller, so that the endless belt 12 is discharged at its portions which come in contact with the drive roller 22-1. Therefore, recording paper is discharged when it passes through the drive roller 22-1, being easily removed and ejected from the endless belt 12 without being rolled up at the bottom of the belt.

In the printing apparatus body 10, four-color (Y, M, C, and K) electrostatic recording units 24-1, 24-2, 24-3, and 24-4 are mounted in a tandem structure that they are placed in series in order of Y, M, C, and K from the upstream side to the downstream side along the recording paper travel path above the endless belt 12 provided between the driven roller 22-2 and the drive roller 22-1 of that belt. The electrostatic recording units 24-1 through 24-4 have the same configuration except that they respectively use a yellow toner component (Y), a magenta toner component (M), a cyan toner component (C), and a black toner component (B) as a developing agent. With this, the electrostatic recording units 24-1 through 24-4 sequentially overlap and transfer a yellow toner image, a magenta toner image, a cyan toner image, and a black toner image one after another on recording paper traveling along the recording paper travel path, thus forming a full-color toner image. The electrostatic recording units 24-1 through 24-4 are provided with photosensitive drums 32-1 through 32-4 respectively, which are respectively driven during recording by drum motors 15-1 through 15-4 coupled therewith via a gear train (not shown) and rotated at a constant speed clockwise.

Figure 2:
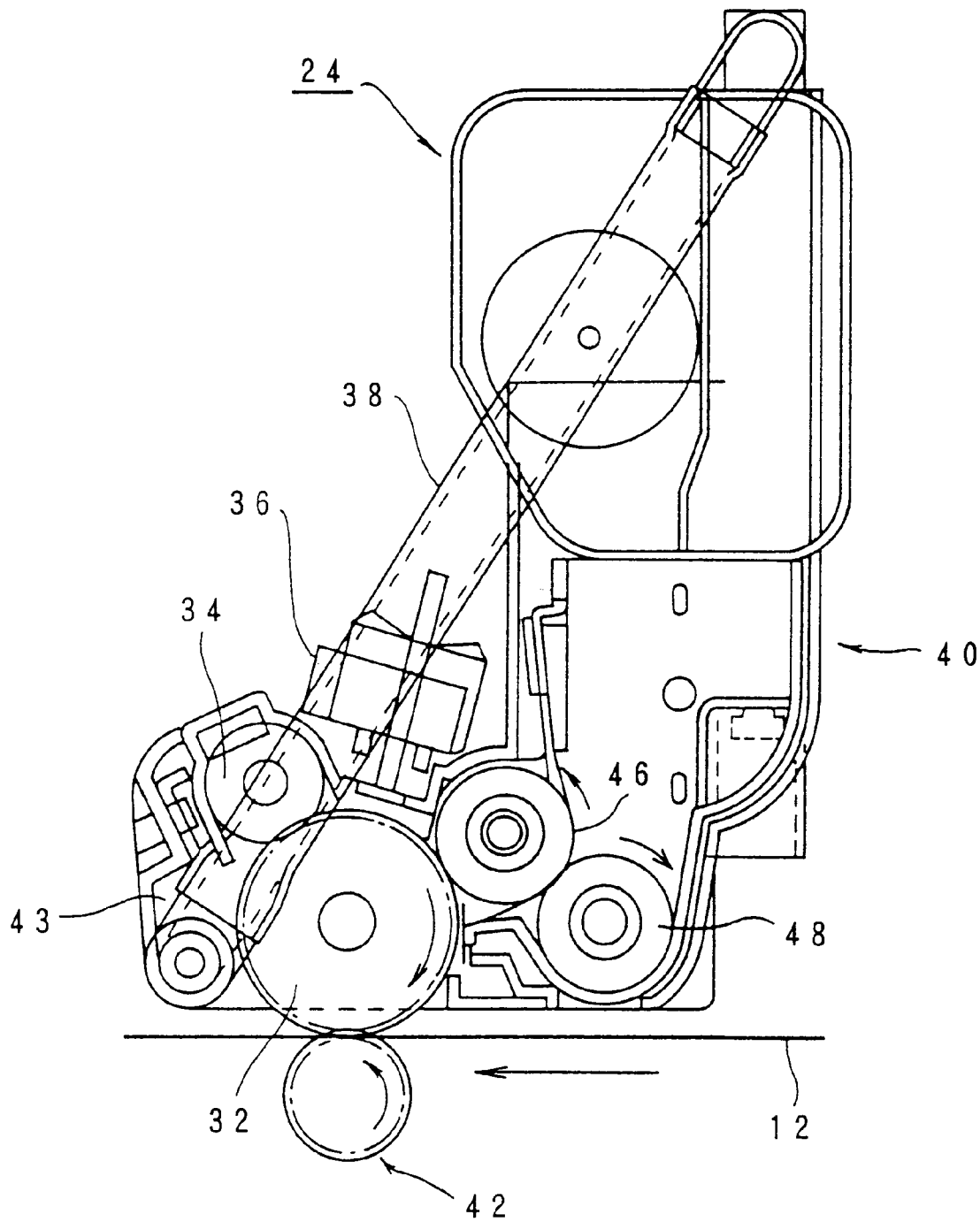
FIG. 2 is a cross-sectional view of the electrostatic recording unit of FIG. 1.

FIG. 2 takes up each of the electrostatic recording units 24-1 through 24-4. The electrostatic recording unit 24 is provided with a photosensitive drum 32, which is rotated and driven clockwise during recording. Above the photosensitive drum 32, a pre-charger 34, specifically a corona charger or scorotron charger, is placed, to uniformly charge the rotating surface of the photosensitive drum 32. In the charging region of the photosensitive drum 32, an LED array 36 which acts as an optical write-in unit is placed, to emit light as scanning in order to write in electrostatic latent images. That is, light emitting elements arranged in the main scanning direction of the LED array 36 are driven on the basis of gradation values of the pixel data (dot data) developed from the image data supplied as printing information from a computer or word processor, thus writing in the electrostatic latent image as a dot image. The electrostatic latent image thus written onto the photosensitive drum 32 is electrostatically developed as a charged toner image based on a prescribed color toner by a developer 40 mounted above the photosensitive drum 20. The charged toner image on the photosensitive drum 20 is electrostatically transferred onto recording paper by a conductive transfer roller 42 mounted below. That is, the conductive transfer roller 42 gives charge opposite in polarity to the charged toner image onto recording paper which is conveyed on the endless belt 12 and also which is placed via the endless belt 12 near the photosensitive drum 32 with a slight gap therebetween, thus transferring the charged toner image on the photosensitive drum 32 onto the recording paper electrostatically. During transfer, a toner remain as nontransferred onto the recording paper sticks to the surface of the photosensitive drum 32. This toner remain is removed by a toner cleaner 43 mounted on the downstream side of the recording paper travel path with respect to the photosensitive drum 32. The toner remain thus removed is returned to the developer 40 by a screw conveyer 38 and used again as a developing toner.

Referring again to FIG. 1, as recording paper passes through the recording paper travel path between the driven roller 22-2 and the drive roller 22-1 of the endless belt 12, four-color (Y, M, C, and K) toner images are overlapped and transferred by the electrostatic recording units 24-1 through 24-4 into a full-color image, which is then sent out from the side of the drive roller 22-1 to the side of a heat roller-type thermal fixing apparatus 26, to be thermally fixed onto the recording paper. The recording paper as completed of thermal fixation passes through guide rollers and is stacked at a stacker 28 mounted above the printing apparatus body. A pair of sensors 30-1 and 30-2 are placed on the back side of the endless belt 12 of the conveyer belt 10 in a direction perpendicular to the belt conveyance direction. FIG. 1 shows only the sensor 30-1 on this side. These sensors 30-1 and 30-2 are used to optically read out resist marks transferred onto the endless belt 12 when conducting drum rotational phase correction processing and wow and flutter correction processing according to the present invention.

Figure 3:
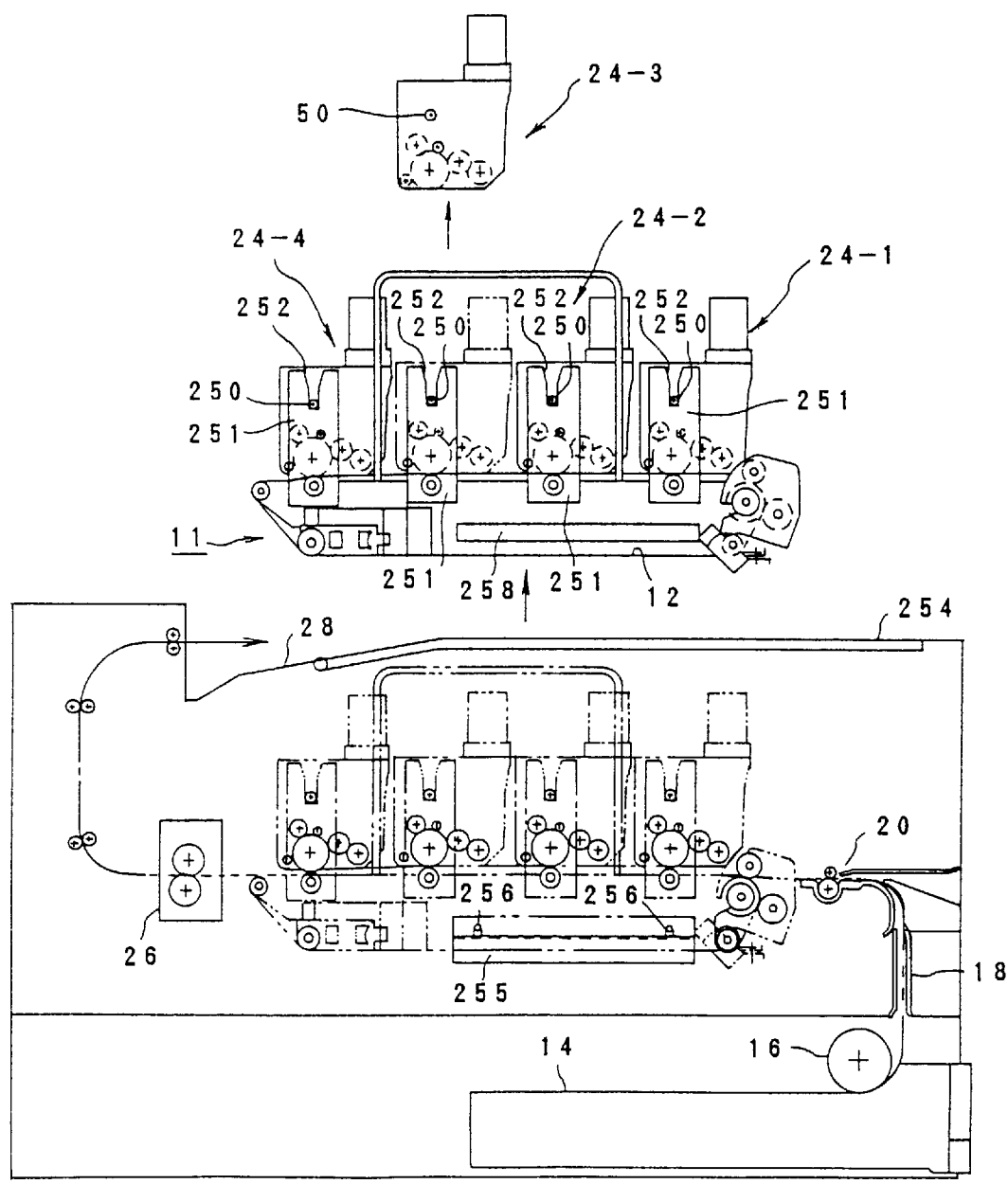
FIG. 3 shows a detached state of conveyance belt unit and electrostatic recording units of FIG. 1.

FIG. 3 shows a state where the conveyer belt unit 11 provided inside the printing apparatus body 10 is taken out and a structure whereby the electrostatic recording units 24-1 through 24-4 are detached. Above the printing apparatus body 10, an open-and-close cover 254 is provided whose left side is a supporting point. Inside the printing apparatus body 10 is arranged a frame 255, at two positions on which pins 256 are arranged. On the side of the conveyer belt unit 11 whose upward taken out state is illustrated; on the other hand, a frame 258 opposing to the frame 255 arranged on the side of the printing apparatus body 10 is provided, at the opposing position of which pin holes are provided. Therefore, by opening the cover 254, the conveyer belt unit 11 can be pulled up and removed from the pin 256 on the side of the printing apparatus body. The electrostatic recording units 24-1 through 24-4 are mounted on the conveyer belt unit 11 by locking their side pin 252 into upward mounting grooves 252 of a mounting plate 251 arranged on both sides. The mounting grooves 252 form a straight groove having nearly the same width as the pin 250 extending from an V-shaped opening of the upper side, so that an accurate location can be conducted by aligning the pin 250 and pressing it downward. Also, to maintain or supply toner to the electrostatic recording units 24-1 through 24-4, they can be easily removed by pulling them up like with, for example, the electrostatic recording unit 24-3.

Figure 4A:
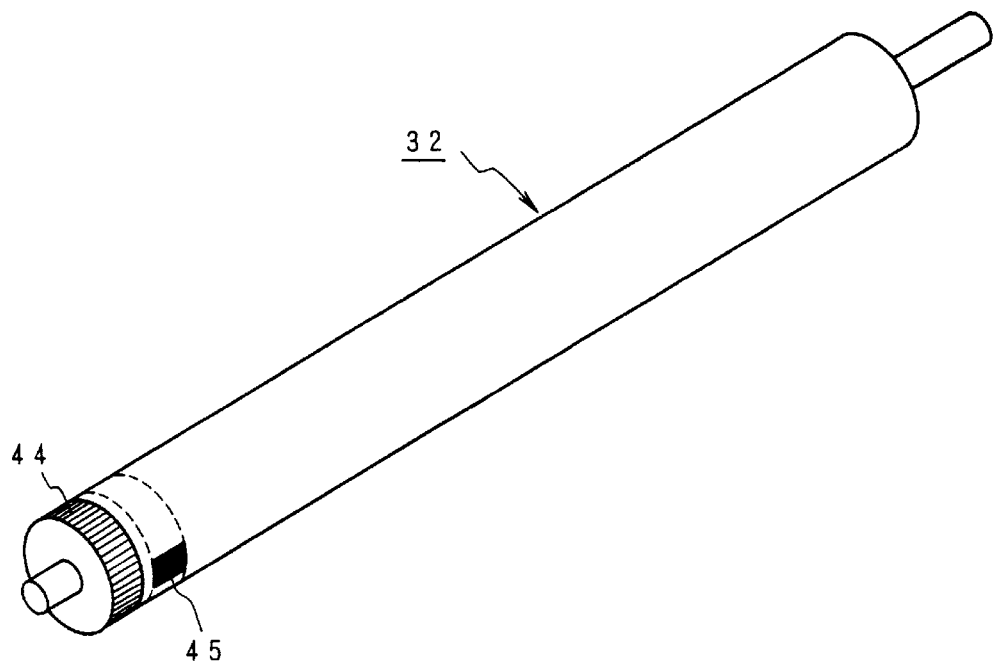
FIGS. 4A and 4B show a reflection-type drum position sensor mounted on a drum.
Figure 4B:
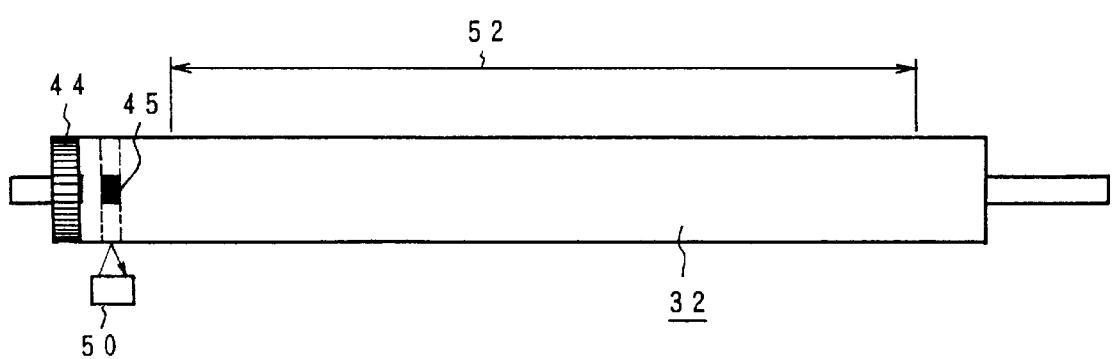

FIGS. 4A and 4B show an embodiment of a drum position sensor provided on the photosensitive drums 32-1 through 32-4 mounted on the electrostatic recording units 24-1 through 24-4. FIG. 4A shows the photosensitive drum 32, which forms a gear 44 on the peripheral plane of one end, inside of which gear 44 a black marker 45 is provided to detect a rotational position. The black marker 45 has a low optical refractive index, whereas the circumferential plane other than the black marker 45 has a high refractive index. FIG. 4B shows a state where the drum position sensor is set against the photosensitive drum 32. The photosensitive drum 32 assigns a printing region 52 in an axial direction and provides the black marker 45 on the left side of the printing 52 as shown in FIG. 4. Corresponding to a rotational position of the black marker 45, a reflection type drum position sensor 50 is arranged which is a drum position sensor. The reflection type drum position sensor 50 has light emitting elements and light reception elements, to apply a light emitted from the light emitting elements to the position in a rotational plane of the black marker 45 indicated by an arrow. Since the position of the rotational plane other than the black marker 45 has a higher refractive index, a light emitted from the light emitting elements at the reflection type drum position sensor 50 is reflected on the drum plane and enters the light reception element of the reflection type drum position sensor 50, to provide light reception output in excess of a prescribed level. When the photosensitive drum 32 is so rotated as to cause the black marker 45 to face the opposing position of the reflection type drum position sensor 50, the light from the light emitting element at the reflection type drum position sensor 50 is absorbed because of a low refractive index of the black marker 45, so that a light amount for the light reception element is largely decreased down below the prescribed level, thus outputting position detection pulses which have an L level at a portion where the black marker 45 passes.

Figure 5:
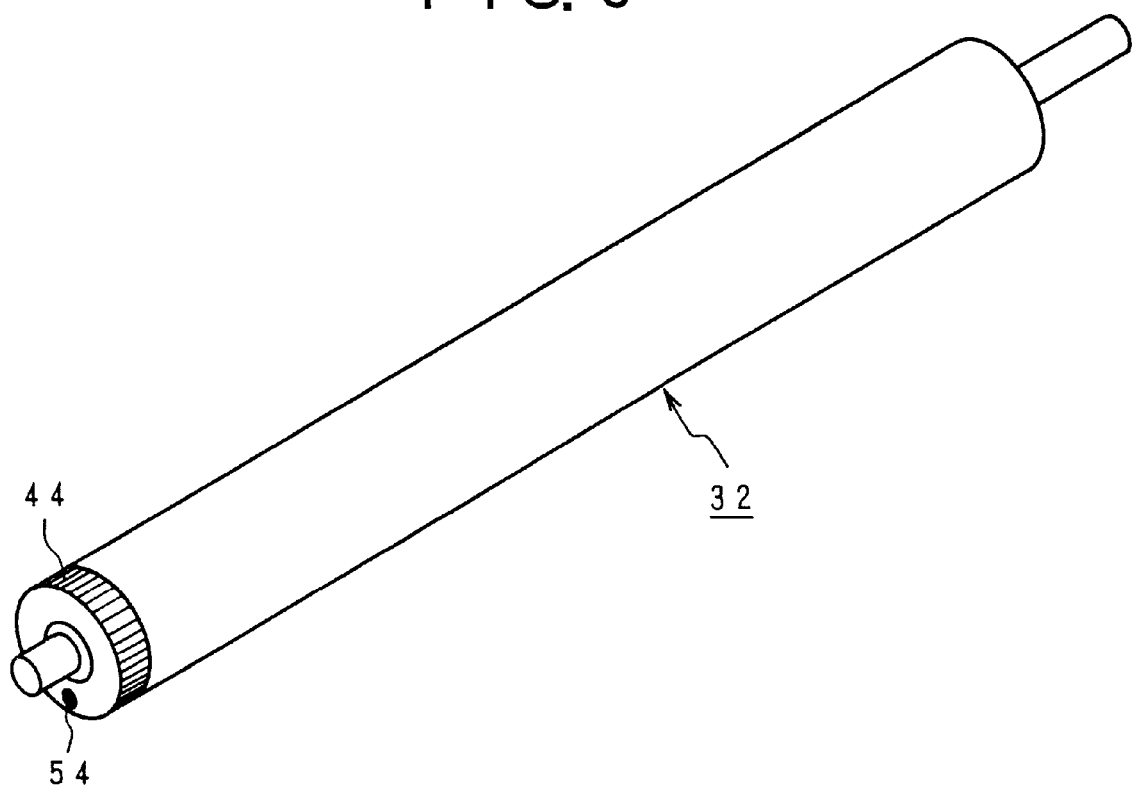
FIG. 5 shows a drum-side magnet used in a magnetic drum position sensor.
Figure 6:
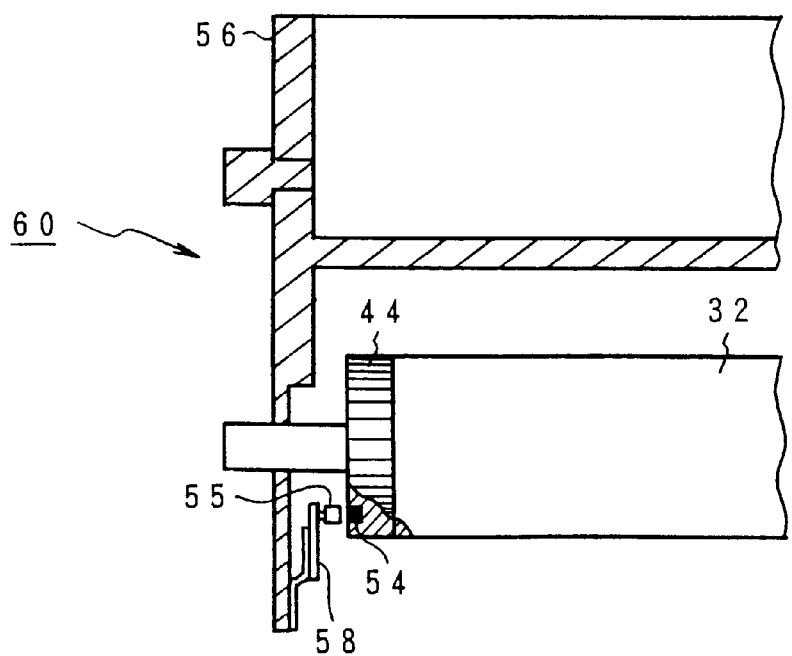
FIG. 6 shows a magnetic drum position sensor mounted on a photosensitive drum.

FIG. 5 shows another embodiment of the drum position sensor, i.e. the photosensitive drum 32 used as a magnetic drum position sensor, in which a magnet 54 is embedded in the end surface on the side where a gear 44 of the photosensitive drum 32 is formed. FIG. 6 shows a structure of the magnetic drum position sensor 60. At the left end of the photosensitive drum 32 mounted in a rotational manner on the frame 56, the magnet 54 is embedded. On the side of the frame 56 corresponding to the rotational position below this magnet 54, an opposing Hall element 61 is arranged as mounted on a printed circuit board 58. The Hall element 61, as shown, is affected by the magnetism of the magnet 54 at the rotational position of the photosensitive drum 32 to which the magnet 54 opposes, to output pulses of a detection signal.

Figure 7:
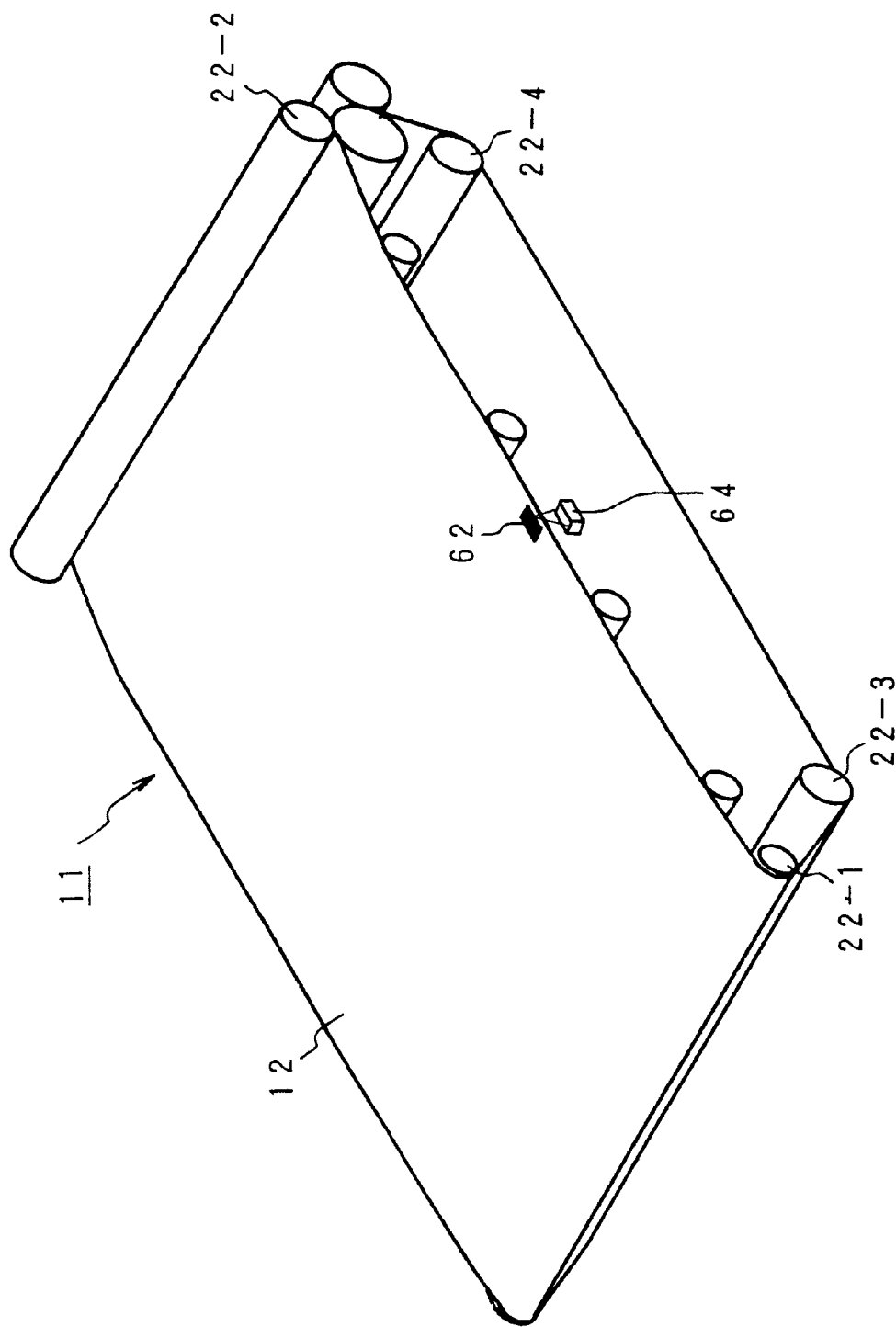
FIG. 7 shows a reflection-type belt position sensor mounted on a belt.

FIG. 7 shows an embodiment of the reflection type belt position sensor 64 provided on the endless belt 12 of the conveyer belt unit 11. In this belt position sensor 64, inside one end surface of the endless belt 12, a small black marker 62 is formed. The portions other than the black marker 62 have a large refractive index. Inside the belt corresponding to a position where the black marker 62 passes through when the endless belt 12 is rotated; a reflection type belt position sensor 64 is arranged. The reflection type belt position sensor 64 has light emitting elements and light reception elements, to detect a drop in the amount of a reflected light when the black marker 62 passes and output a belt position detection signal for the endless belt 12.

Figure 8:
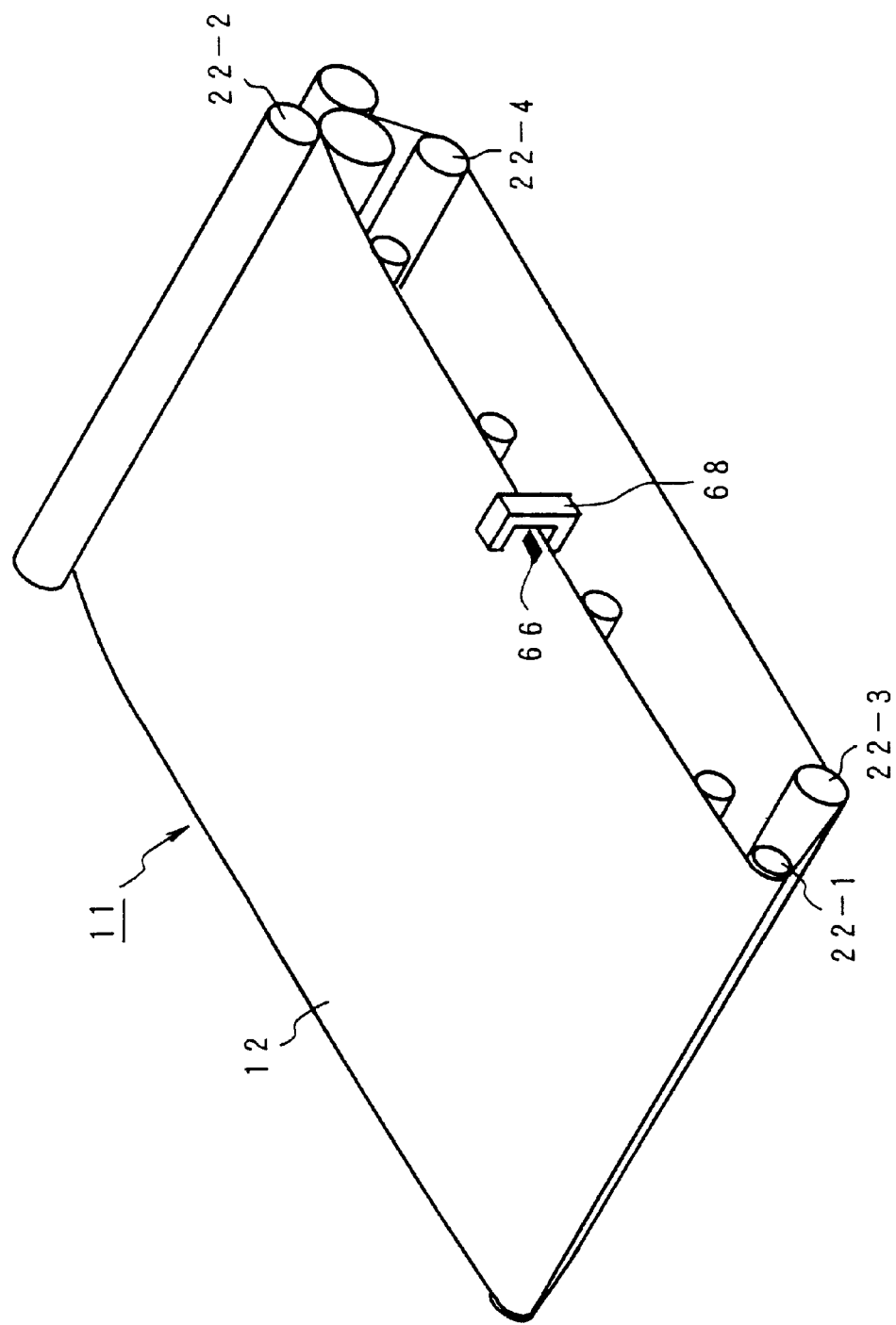
FIG. 8 shows a magnetic transmission-type belt position sensor mounted on a belt.

FIG. 8 shows another embodiment of the belt position sensor, which features a magnet type sensor. That is, in the present embodiment, on the side of one end plane of the endless belt 12, a permeable marker 66 having a high magnetic permeability is provided, according to whose passing position, a magnetic transmission type belt position sensor 68 is provided which has yokes sandwiching the endless belt 12. The magnetic transmission type belt position sensor 68 may well have, for example, a magnet at one passing position of the permeable marker 66 and a Hall element at the other. Therefore, a position detection signal is output in pulses when the magnetic transmission type belt position sensor 68 passes the permeable marker 66 when driven by the belt 12.

Figure 9:
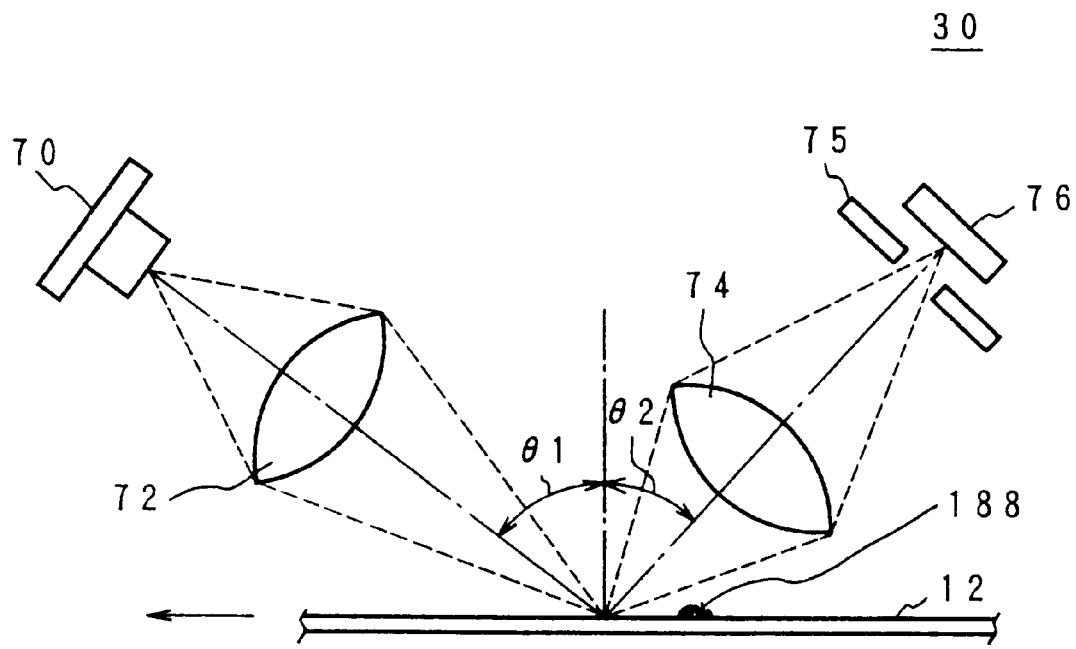
FIG. 9 shows a sensor which detects resist marks for belt transfer.

FIG. 9 is an embodiment of a sensor 30 to read out resist marks transferred onto a belt provided on the conveyer belt unit 11. In the present embodiment, the sensor 30 has a light emitting element 70 in the direction of an incident angle theta 1 against the endless belt 12, thus converging a light from the light emitting element 70 with an image-formation lens 72, to image-form a beam spot on the endless belt 12. In the direction of an outgoing angle theta 2 against this beam spot, a light reception element 76 is arranged via a converging lens 74 and a slit 75. Here, the incident angle theta 1 against the light emitting element 70 and the outgoing angle theta 2 against the light reception element 76 are determined so as to provide an optimal reflection light amount in a range of, for example, 45 degrees to 75 degrees. The sensor 30 optically detects a resist mark (unfixed toner image) 188 transferred onto the endless belt 12 for the detection of a drum interval or a wow and flutter according to the present invention. That is, at the position on the belt without the resist mark 188, an incident light from the light emitting element 70 is sufficiently reflected and enters the light reception element 76, a reception signal from which is thus controlled at a prescribed level or higher. When the resist mark 188 reaches a detection position as the endless belt 12 moves, an incident light is reflected irregularly because the resist mark 188 is an aggregate of fine toner components, so that an amount of reflection light against the light reception element 76 decreases, which in turn decreases the level of a light reception signal from the light reception element 76, thus detecting the resist mark 188.

Figure 11A:
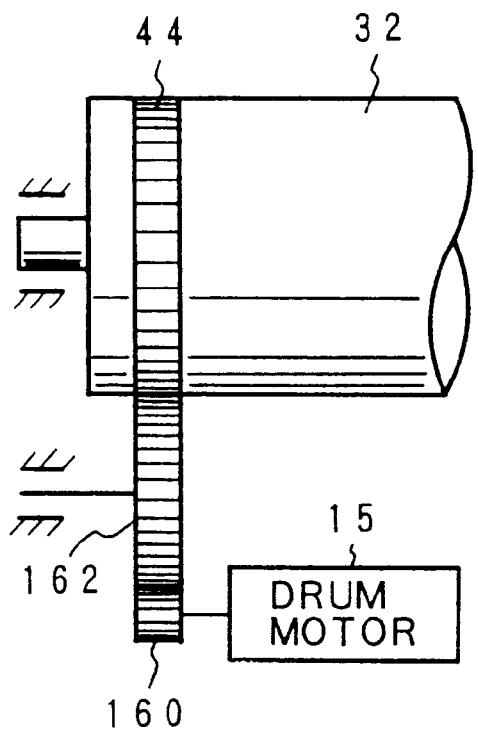
FIGS. 11A and 11B show photosensitive drum and belt drive systems according to the present invention.
Figure 11B:
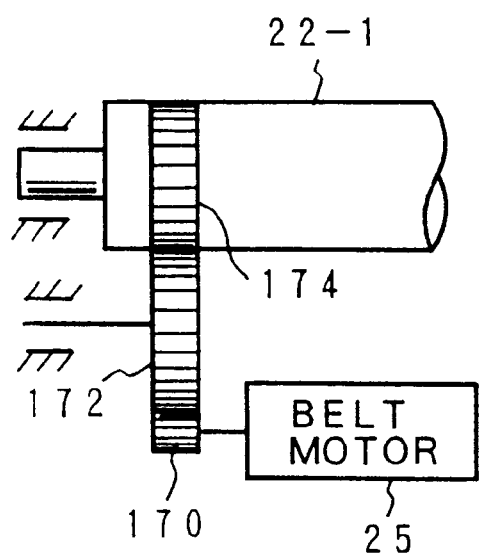

FIG. 10 is a block diagram of drive systems for the photosensitive drums 32-1 through 32-4 and the endless belt 12 of FIG. 1. For the yellow (Y) electrostatic recording unit 24-1 for example, the drum motor 15-1 is coupled to a gear train 78-1, which is coupled to the photosensitive drum 32-1. A drive system covering from this drum motor 15-1 to the photosensitive drum 32-1 is represented by, for example, FIG. 11A. That is, at the output axis of the drive motor 15, a drive gear 160 is provided, to which is engaged a gear 162, to which is in turn engaged a gear 44 formed in the periphery of the axis end of the photosensitive drum 32. Likewise, also for the other magenta (M), cyan (C), and black (K) electrostatic recording units 24-1 through 24-4 in FIG. 10, drive systems covering over the drum motors 15-2 through 15-4, the gear trains 78-2 through 78-4, and the photosensitive drums 32-2 through 32-4 are provided, having the same configuration as that shown in FIG. 11A. The conveyer belt unit of FIG. 10 is provided with a drive system covering over a belt motor 25, a gear train 84, and a drive roller 22-1. This belt unit 11 drive system is such as shown in FIG. 11B. That is, at the output axis of the belt motor 25, a drive gear 170 is provided, to which gear 170 is engaged a gear 172, to which in turn is engaged a gear 174 formed in the periphery of the axis end of a drive roller 22-1. The conveyer belt unit 11 drive roller 22-1 shown in FIG. 10 operates as a drive pulley to circulate and drive the endless belt 12 at a constant speed as shown in FIG. 1. The endless belt 12 sucks thereron recording paper 80 electrostatically and coveys it at a constant speed. For this recording paper 80, toner images obtained by developing latent images on the photosensitive drums 32-1 through 32-4 of the electrostatic recording units 24-1 through 24-4 are transferred sequentially.

Hardware configuration and functions

Figure 12B:
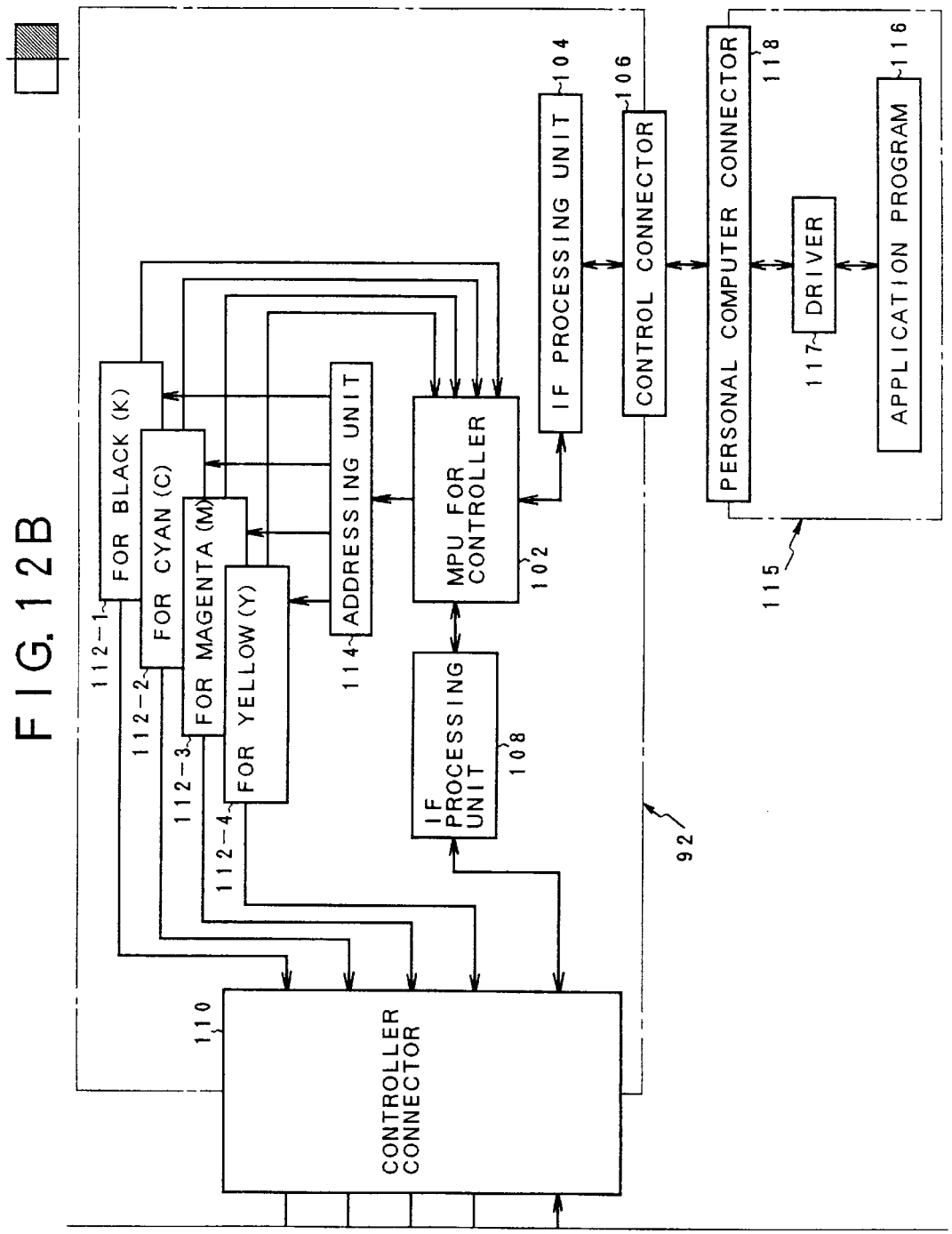

FIGS. 12A and 12B are block diagrams of a hardware configuration for control processing of a printing apparatus according to the present invention. A hardware according to the present invention comprises an engine 90 and a controller 92. The engine 90 is provided with a mechanical controller 94 which controls the conveyer belt unit 11 and the electrostatic recording units 24-1 through 24-4. The mechanical controller 94 has an MPU96 for sensor processing. To the sensor processing MPU96 are connected detection signals from a pair of sensors 30-1 and 30-2, magnetic drum position sensors 60-1 through 60-4 of FIG. 6 provided, e.g. for the photosensitive drums 32-1 through 32-4 of the electrostatic recording units 24-1 through 24-4, and reflection type belt position sensor 64 provided to the endless belt 12 of FIG. 7. Actually, the detection signals from those sensors are converted from analog representations into digital signals by an AD converter and then enter the sensor processing MPU96. The mechanical controller 94 is connected via an engine connector 100 to a controller 92. A printing mechanism mounted on the engine 90 is shown in a state where the LED arrays 36-1 through 36-4 and photosensitive drums 32-1 through 32-4 provided to the endless belt 12 and the Y, M, C, and K electrostatic recording units 24-1 through 24-4 are taken out. The controller 92 has a controlling MPU102. To the controlling MPU102, for example, a personal computer 115 is connected as a host processor via an interface processing unit 104 and a controller connector 106. The personal computer 115 is provided with a driver 117 for printing color image data based on printing commands sent from an arbitrary application program 116. The driver 117 is connected via a personal computer unit connector 118 to a controller connector 106 of the controller unit 92. The controlling MPU102 of the controller unit 92 has image memories 112-1 through 112-4 which store pixel data (dot data) obtained by expanding Y, M, C, and K image data transferred from the personal computer 115. The MPU102 for the controller is connected via an interface processing unit 108 and a controller connector 110 to an engine 90, so that it sends printing instructions to the engine 90 and, based on those instructions, transfers various control commands such as printing preparation completion commands with it, thus enabling printing control. The MPU102 for the controller has an addressing unit 114 for addressing the pixel data of various colors when the pixel data is expanded into the image memories 112-1 through 112-4. The addressing unit 114 also specifies the output addresses when each line of pixel data expanded into the image memories 112-1 through 112-4 during printing is read out and transferred in each scanning direction (direction perpendicular to the belt conveyance direction) of the LED arrays 36-1 through 36-4 in the engine 90. The resolution, here, of the pixel data expanded in the image memories 112-1 through 112-4 is, for example, 600 dpi in the main scanning direction of the LED arrays 36-1 through 36-4 and 600 dpi in the sub-scanning direction (belt conveyance direction).

FIG. 13 is an overall flowchart for printing processing by a printing apparatus according to the present invention. Upon power application, the printing apparatus performs pre-set initialization at step S1. When initialization is completed phase correction is performed to match the rotational phases of the Y, M, C, and K photosensitive drums at step S2. This phase correction for the photosensitive drums is performed at the final adjustment step before factory shipment of the printing apparatus and, after delivery to the user, is done again for, e.g. toner supply, as shown in FIG. 3, when any one of the electrostatic recording units 24-1 through 24-4 has been detached or replaced with a new one. Control then goes to step S3, where the system checks for an instruction to adjust a wow and flutter and, if any, detects a speed flutter at step S4, to detect correction information for the correction of the wow and flutter. The adjustment of wow and flutter at step S3 is basically performed at the final step in the factory shipment of a printing apparatus according to the present invention. If necessary, further seed flutter adjustment can be performed by operating DIP switches on the circuit board in the printing apparatus or by commands sent from the host processor. Therefore, since no adjustment instructions are given during usual operation upon power application, wow and flutter detection is not performed at step S4, so that printing is performed on the basis of the speed flutter correction information obtained by the previous speed flutter correction processing. For usual printing processing, the system waits for a printing request at step S4 and, if any, stays in a wait state at step S6 until the printing preparation is completed, and then starts printing at step S7 including wow and flutter correction. Such processing is repeated until an instruction for stopping of color printing is given at step S8.

Figure 14A:
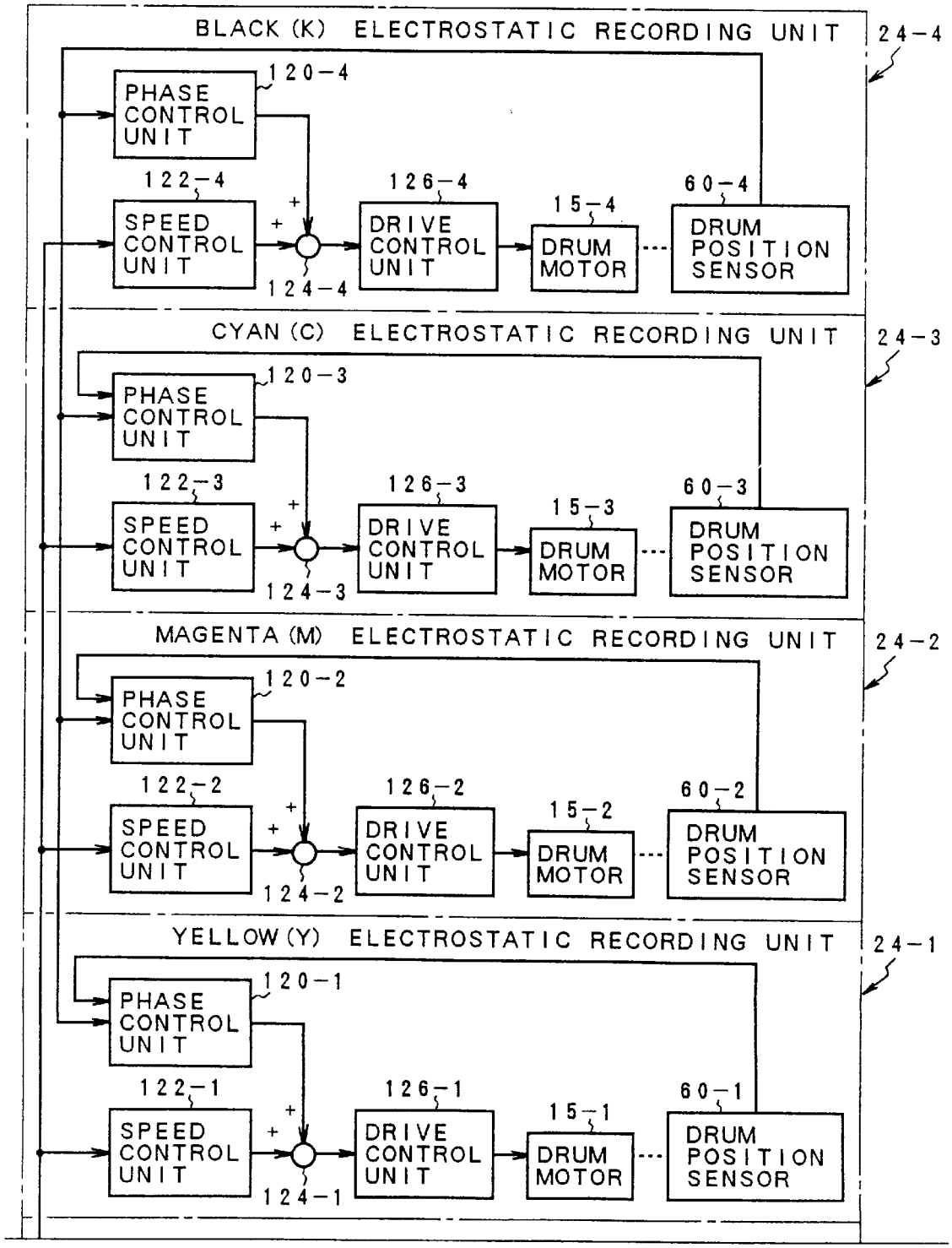
FIGS. 14A and 14B are block diagrams of drum rotational phase correction processing and speed flutter correction processing respectively.
Figure 14B:
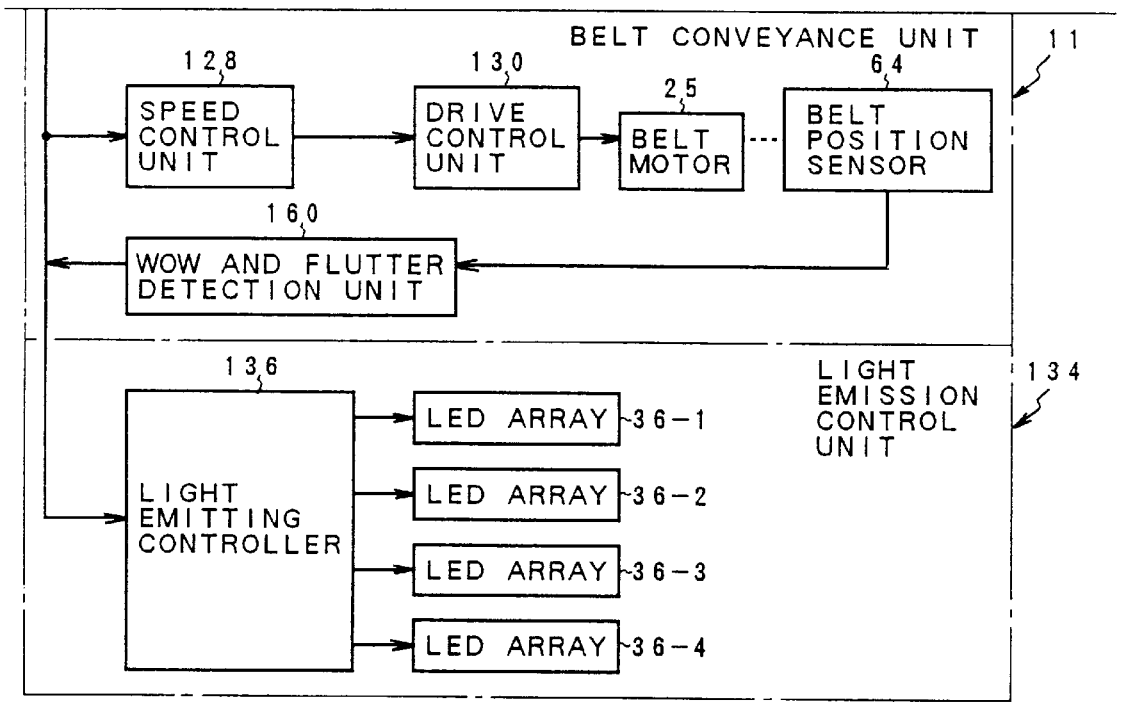

FIGS. 14A and 14B are block diagrams of control functions realized by the mechanical controller 94 provided on the engine 90 shown in FIG. 1 in order to perform both the phase correction for photosensitive drums indicated at step S2 and the wow and flutter detection indicated at steps S4 and S7 of the flowchart of FIG. 13. Each of the Y, M, C, and K electrostatic recording units 24-1 through 24-4 is provided with phase control units 120-1 through 120-4 for the correction of drum rotational phases and speed control units 122-1 through 122-4 for the correction of a speed flutter. The outputs of those phase control units 120-1 through 120-4 and the speed control units 122-1 through 122-4 are summed by adders 124-1 through 124-4, to drive drum motors 15-1 through 15-4 via drive control units 126-1 through 126-4. Photosensitive drums (not shown) rotated and driven by the drum motors 15-1 through 15-4 are provided with drum position sensors 60-1 through 60-4. As the drum motors 15-1 through 15-4, for example, stepping motors are employed, so that the drive control units 126-1 through 126-4 actually control the speed by controlling the period of drive pulses for the drum motors 15-1 through 15-4. The conveyer belt unit 11 is provided with a wow and flutter detection unit 160 and a speed control unit 128 which corrects and controls a wow and flutter based on the correction information detected by the wow and flutter detection unit 132. The correction information for correcting a wow and flutter detected by the speed flutter detection unit 160 is used for correcting a wow and flutter also for the speed control units 122-1 through 122-4 provided on the sides of the electrostatic recording units 24-1 through 24-4. Next to the speed control unit 160, a drive control unit 130 is provided to drive and control a belt motor 25. Like the drum motors 15-1 through 15-4, as the belt motor 25 also, e.g. a stepping motor is used, so that the speed is controlled by by drive control unit 130, which controls the period of drive pulses for the stepping motor. The conveyer belt 12 (not shown) driven by the belt motor 25 is provided with a belt position sensor 64 which detects a circulatory position of the belt. Correction information for a wow and flutter detected by the wow and flutter detection unit 160 provided on the side of the belt unit 11 is supplied to a light emission controller 136 of the light emission control unit 134. The light emission controller 136 controls light emission based on the image data given by the LED arrays 36-1 through 36-4 provided on the electrostatic recording units 24-1 through 24-4. For this light emission control, the light emission controller 136 regulates timing based on wow and flutter correction information given by the speed flutter detection unit 160, thus obtaining printing results corrected for a wow and flutter caused by a wow and flutter of the recording paper moving on the conveyer belt. The speed processing based on speed flutter correction information detected by the wow and flutter detection unit 160 is actually performed by selecting one of the correction processing by the speed control unit 128 of the conveyer belt unit, the correction processing by the speed control units 122-1 through 122-4 provided on the electrostatic recording units 24-1 through 24-4, and the correction processing by the light emission controller 136 provided on the light emission control unit 134. As the drum motors 15-1 trough 15-4 and the belt motor 25, servo motors may be employed, in which case, the speed is controlled by controlling a motor driving current.

Correction of drum rotational phase

FIG. 15 is a block diagram of the control functions of correcting the drum rotational phases by the phase control units 120-1 through 120-4 of the electrostatic recording units 24-1 through 24-4. The drum rotational phase is actually corrected by the drum phase correction units 145-1 through 145-4 provided on the drum phase detection unit 140 and each of the electrostatic recording units 24-1 through 24-4. The drum phase detection unit 140 is provided with a resist mark transfer unit 142, a drum phase detection unit 144, and a correction phase information storage unit 146. The resist mark transfer unit 142 drives the Y, M, C, and K electrostatic recording units 24-1 through 24-4 concurrently, thus transferring resist marks onto the endless belt 12 at an interval between the drums. The resist marks transferred by this resist mark transfer unit 142 onto the belt are detected by the sensor 30, so that based on an interval of the resist marks read out, the drum phase detection unit 144 detects a drum interval of the C, M, and K photosensitive drums 32-3, 32-3, and 32-1 based on, for example, the K photosensitive drum 32-4 data, based on which with relative to the K photosensitive drum data, the phases φ1, φ2, and φ3 of the other photosensitive drums are detected. The phases φ1, φ2, and φ3 of the photosensitive drums 32-3, 32-2, and 32-1 detected by the drum phase detection unit 144 relative to the reference K photosensitive drum 32-4 are stored in the correction position information storage unit 146. Although the reference K photosensitive drum 32-4 has no phase, it is assumed for explanation that phase φ0=0 (degree). The correcting phases φ0, φ1, φ2, and φ3 stored in the correction position information storage unit 146 are set to target phase setting units 148-4, 148-3, 148-2, and 148-1 of the electrostatic recording units 24-4, 24-3, 24-2, and 24-1, respectively. The electrostatic recording units 24-1 through 24-4 are provided with phase detection units 150-1 through 150-4 respectively. The phase detection units 150-1 through 150-4 use as a reference the detection signal of the drum position sensor 60-4 of the K electrostatic recording unit 24-4, to detect a phase which makes up an actual rotational angle formed up to a time when a detection signal of each of the drum position sensors 60-1, 60-2, and 60-3 was obtained. It should be noted here that since the phase detection unit 150-4 of the K electrostatic recording unit 24-4 detects the phase of detected pulses of its own drum position sensor 60-4, that detected value is always 0. The phases detected by the phase detection units 150-1 through 150-4 are given to addition points 152-1 through 152-4. Then, phase differences between those detected phases and target phases φ3, φ2, φ1, and φ0 output by the target phase setting units 148-1 through 148-4 are detected, so that deviation signals corresponding to those phase differences are output via the addition points 124-1 through 124-4 to the drive control units 126-1 through 126-4. The addition points 124-1 through 124-4 are provided, as shown in FIG. 14, with deviation signals sent from the speed control units 122-1 through 122-4, which corrects a wow and flutter.

FIGS. 16A and 16B illustrate the positions to which resist marks are transferred onto the endless belt of photosensitive drums before the rotational phases of FIG. 15 are corrected. FIG. 16A shows the position for the photosensitive drums 32-1 through 32-4 before the drum rotational phases are corrected, in which each rotational center is represented by P. The photosensitive drums 32-1 through 32-4, like the drum position sensor 60 of FIG. 6 for example, is pivoted at the axes of both ends to the frame 56, in which case, the actual rotational center is eccentric as represented by Q with respect to the true rotational center P. The eccentricity direction of the actual rotational center Q with relative to the true rotational center P is shown in FIG. 1. As shown in it, the electrostatic recording units 24-1 through 24-4 have mutually different toner components but have roughly the same structure. Therefore, even if the eccentricity directions are mutually different when a color printing apparatus is assembled, the eccentric rotation can be synchronized with the position on recording paper being conveyed on by the belt by matching the rotational phases with each other. Thus, the present invention corrects rotational phases so as to establish a prescribed phase relationship for the photosensitive drums 32-1 through 32-4 whose eccentric rotational centers Q are not in agreement with the true rotational center P in a state where the electrostatic recording units 24-1 through 24-4 are assembled as shown in FIG. 16A.

Figure 17:
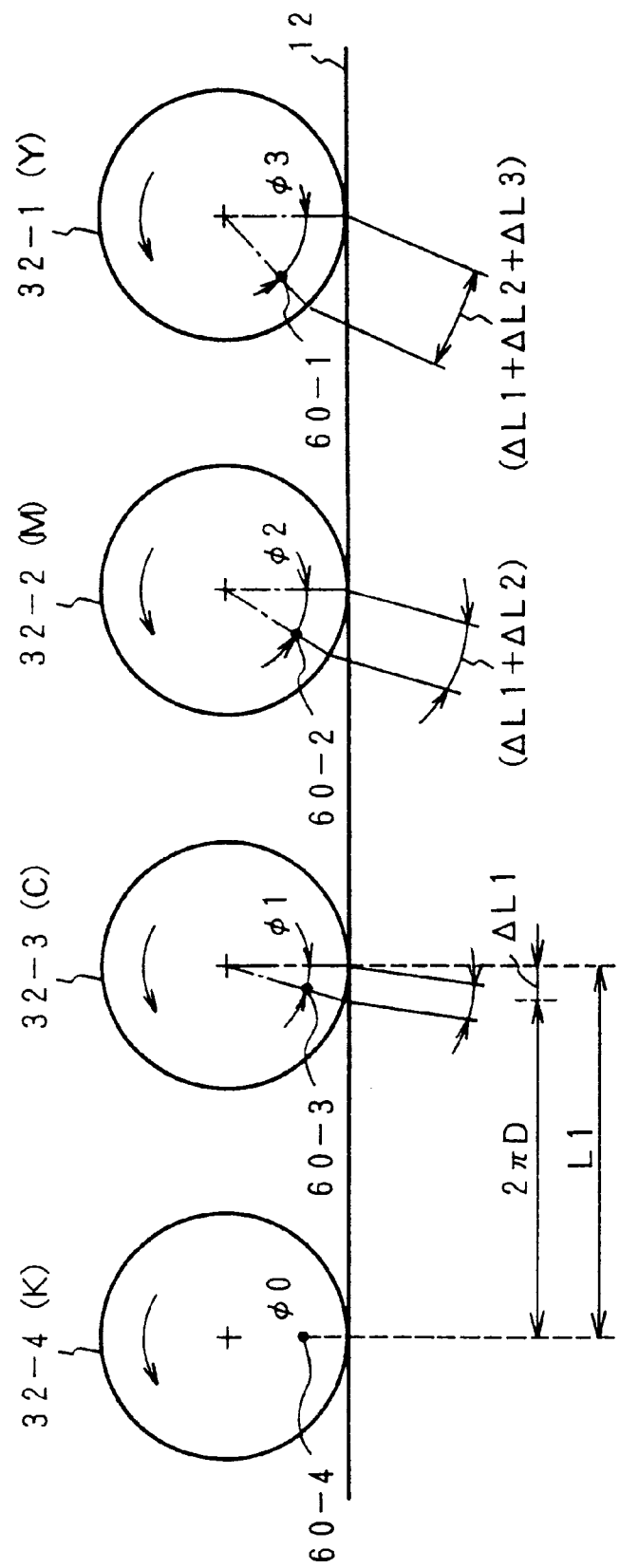
FIG. 17 shows a state of how photosensitive drums are rotated with the drum rotational phase as corrected.
Figures 18A, 18B, 18C, 18D:
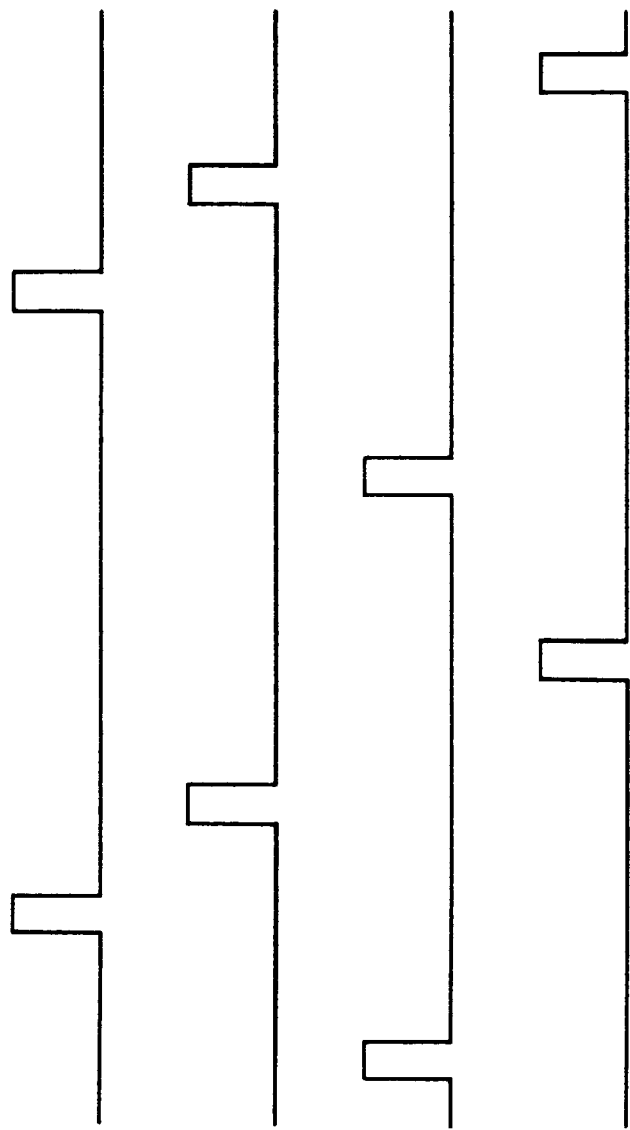
FIGS. 18A, 18B, 18C, and 18D are timing charts for detection signals of a drum position sensor before drum rotational phases are corrected.

FIG. 17 shows a state where the drum rotational phases have been corrected according to the present invention. The drums 32-1 through 32-4 are provided with drum position sensors 60-1 through 60-4 at prescribed positions, at the rotational positions of which sensors 60-1 through 60-4 a prescribed phase relationship is set. It is assumed here that a diameter of the photosensitive drums 32-1 through 32-4 is, as shown in FIG. 16A, D and intervals at which the drums are set are L1, L2, and L3. These drum intervals L1, L2, and L3 should be of the same value in design but are mutually different slightly after actual assembly. The drum intervals L1, L2, and L3 are supposed to be larger than a circumference $2\pi D$ of the photosensitive drum. Under these conditions and when the rotational phases have been corrected as shown in FIG. 17, a rotational angle φi 0 between the K photosensitive drum 32-4 placed on the ejection side of recording paper and a transfer position of the endless belt 12 which is determined by a position of the drum position sensor 60-4 becomes zero (0). When the drum surface of the next drum, i.e. the C photosensitive drum 32-3 has come in contact with the position of the circumference $2\pi D$ of the K photosensitive drum 32-4, resist marks can be transferred to the same position on the belt surface. Therefore, by locating the drum position sensor 60-3 at a position where a distance on the drum circumference of the C photosensitive drum 32-3 is given by an error delta L obtained by subtracting the circumference $2\pi D$ of the photosensitive drum 32-4 from an interval L1 up to the belt 12 with which the photosensitive drum 32-3 is in contact presently, resist marks can be transferred by the photosensitive drums 32-3 and 32-4 to the same position of the recording paper traveling on the belt 12. This relationship holds true also between the photosensitive drums 32-3 and 32-3 and between the photosensitive drums 32-3 and 32-1. If, in this case, their respective errors are indicated by delta 2 and delta 3, the lengths of circumferences required to set the drum position sensors 60-2 and 60-1 on the photosensitive drums 32-3 and 32-1 are $(\Delta L1+\Delta L2)$ and $(\Delta L1+\Delta L2+\Delta L3)$. A rotational angle φ1 from a belt transfer position to the drum position sensor 60-3 on the photosensitive drum 32-3 is as follows:

$$\phi1=\Delta L1/(D/2) \text{ [rad]}$$

Since delta L1=L1−2πD, the following equation is given:

$$\phi1=(\Delta L1-2\pi D)/(D/2)$$

These two equations are combined into the following:

$$\phi1=(\Delta L1-2\pi D)/(D/2) \quad (1)$$

$$\phi2=\phi1+(L2-2\pi D)/(D/2) \quad (2)$$

$$\phi3=\phi1+\phi2+(L3-2\pi D)/(D/2) \quad (3)$$

Although the drum intervals for the drums 32-1 through 32-4 were supposed to be L1, L2, and L3, those intervals are here assumed to be equal to a prescribed design value L0 to simplify the explanation of the processing shown in FIG. 16A, as follows:

$$L1=L2=L3=L0$$

Then, the Equations (1), through (3) are given as follows:

$$\phi1=(L0-2\pi D)/(D/2) \quad (4)$$

$$\phi2=2\cdot\phi1 \quad (5)$$

$$\phi3=3\cdot\phi1 \quad (6)$$

In FIG. 16B, resist marks are actually transferred onto the belt 12 and, the intervals L1, L2, and L3 between the adjacent drums 23-1 through 32-4 are detected to obtain phases of the above-mentioned equations (1) through (3), thereby correcting the corresponding phase shifts. That is, by driving the electrostatic recording units 24-1 through 24-4 simultaneously, Y-color, M-color, C-color, and M-color resist marks 154Y, 154M, 154C, and 154K are transferred in this order at two positions, starting from the right, on both ends of the endless belt 12. These resist marks 154Y through 154K are read by the sensors 30-1 and 30-2 provided below the conveyer belt unit 11 of FIG. 1, so that a time indicating the detection interval is multiplied by a belt conveyance speed to obtain drum intervals L1, L2, and L3. By substituting thus obtained drum intervals L1, L2, and L3 into Equations (1) through (3), phases φ1, φ2, and φ3 of the photosensitive drums 32-3, 32-2, and 32-1 can be obtained. Here, however, the phase φ0 of the K photosensitive drum 32-4 is zero (0). By setting the phases φ0, φ1, φ2, and φ3 of the photosensitive drums 32-3, 32-2, and 32-1, if detected, to the target phase setting units 148-3, 148-2, and 148-1 respectively and also by driving and controlling the drum motors, the rotational phases of the photosensitive drums can be controlled so as to be equal to a pre-set phase.

FIGS. 18A through 18D show the state where the rotational phases of the photosensitive drums 32-1 through 32-4 such as shown in FIG. 16A are not matched with each other. Those phases are detected and then controlled into φ1, φ2, and φ3 of the photosensitive drums 32-3, 32-3, and 32-1, as shown in FIGS. 19A through 19D, as detected against the position detection pulses of the reference photosensitive drum 32-4 in FIG. 19A.

FIGS. 20A through 20D show a wow and flutter of the drum circumferential speed before the rotational phases of the photosensitive drums of FIG. 16A are corrected. More specifically, the phases for the speed flutter of the photosensitive drums 32-3, 32-3, and 32-1 of FIGS. 20B through 20D with relative to the wow and flutter of the K photosensitive drum 32-4 of FIG. 20A are random totally. Those random phases for wow and flutter can be matched by a control method according to the present invention, to realize a phase relationship such as shown in FIGS. 21A through 21D. By thus realized phase relationship, toner images are transferred at the same position on the photosensitive drums 32-1 through 32-4 with respect to a position of recording paper conveyed at a constant speed on the endless belt 12 as shown in FIG. 17. Therefore, even if, as shown in FIG. 16A, the rotational center Q of the photosensitive drums 32-1 through 32-4 is actually eccentric with respect to the rotational center P, a drum circumferential speed flutter due to this eccentricity is offset by a wow and flutter common to the drums at the same position on the recording paper being conveyed by the belt 12, so that a wow and flutter due to the wow and flutter may occur in the pixel pitch in the conveyance direction but no wow and flutter caused by the four photosensitive drums will occur at each color pixel transfer position.

FIG. 22 is a flowchart of the processing of detecting and correcting the phase of the photosensitive drums shown in FIG. 15. First, if the system decides the replacement of an electrostatic recording unit at step S1, the system goes to step S2, to transfer Y, M, C, and K resist marks onto a belt concurrently. Then, the system goes to step S3 to detect intervals L1, L2, and L3 of the Y, M, C, and K resist marks on the belt and, at step S4, calculates phases φ0, φ1, φ2, and φ3 using the above-mentioned equations (1) through (3), to set those calculations as target phases.

Figure 23:
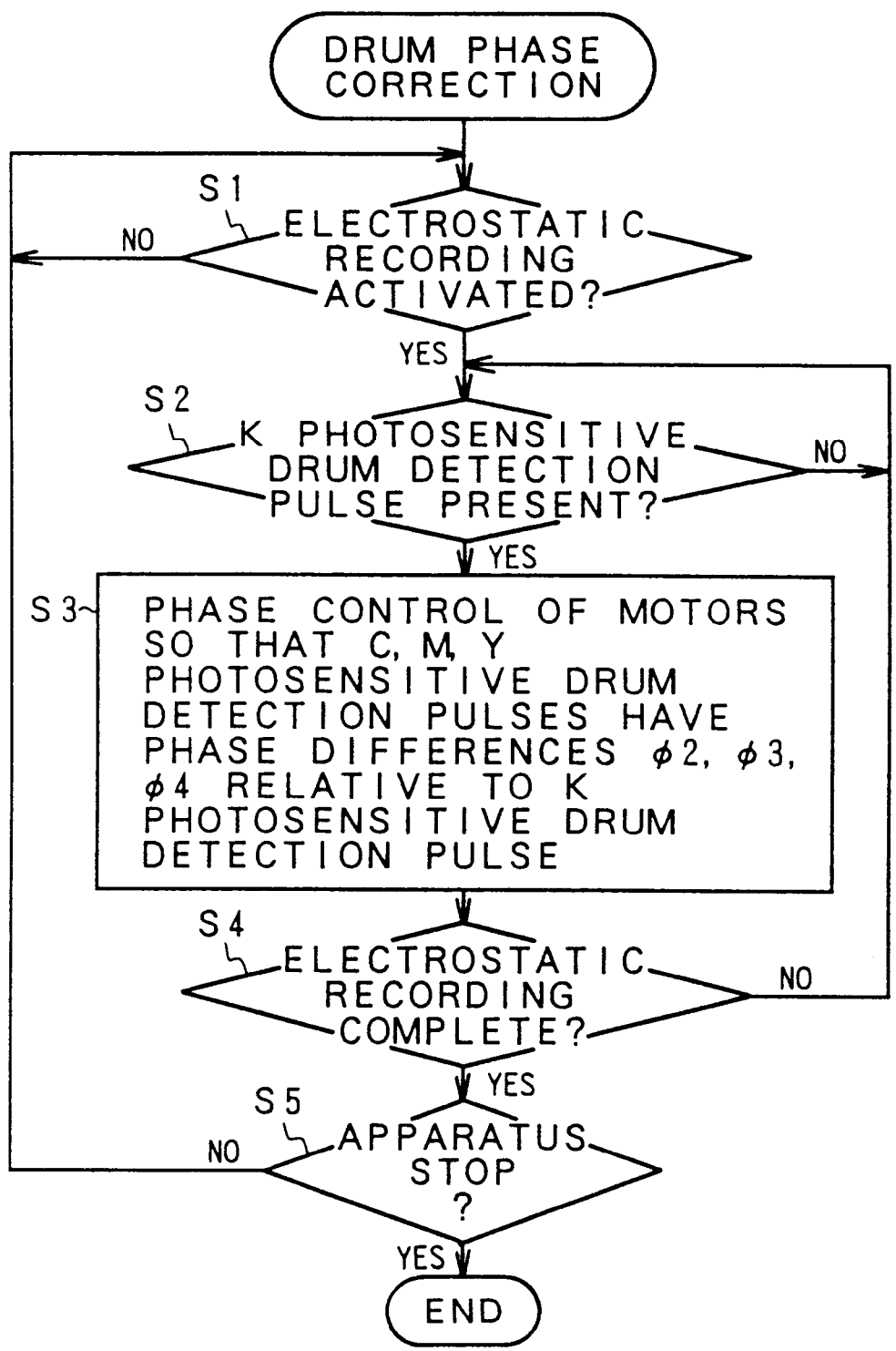
FIG. 23 is a flowchart for correcting drum phases, according to the present invention.

FIG. 23 is a flowchart of the phase correction processing for the electrostatic recording units 24-1 through 24-4 in FIG. 15. First at step S1, the system checks whether electrostatic recording has been activated and, if it has been activated, goes to step S2 to check the existence of detection pulses by a drum position sensor of the reference K photosensitive drum 32-4. If detection pulses of the K photosensitive drum 32-4 are obtained, the system goes to step S3 to obtain the phases of detection pulses of the C, M, and Y photosensitive drums 32-3, 32-2, and 32-1 and then controls the drum motors 15-3, 15-2, and 15-1 so that those phases may be equal to target phases φ1, φ2, φ3 respectively. Since the target phase φ0=0 for the reference K electrostatic recording unit 24-4, no actual phase control is conducted for that unit. The system repeats phase control of steps S2 and S3 until it decides the termination of electrostatic recording at step S4. When electrostatic recording is terminated, the system repeats the processing starting from step S1 until it decides the apparatus is stopped at step S5. As can be seen from Equations (4) through (6), in a case where drum intervals L1, L2, and L3 in FIG. 16A are supposed to be a prescribed value L0, the drum phase detection processing of FIG. 22 is not necessary, so that phases φ1, φ2 and φ3 obtained by Equations (4) through (6) are set as target phases, to immediately start phase correction processing of FIG. 23.

Correction of wow and flutter

Figure 24A:
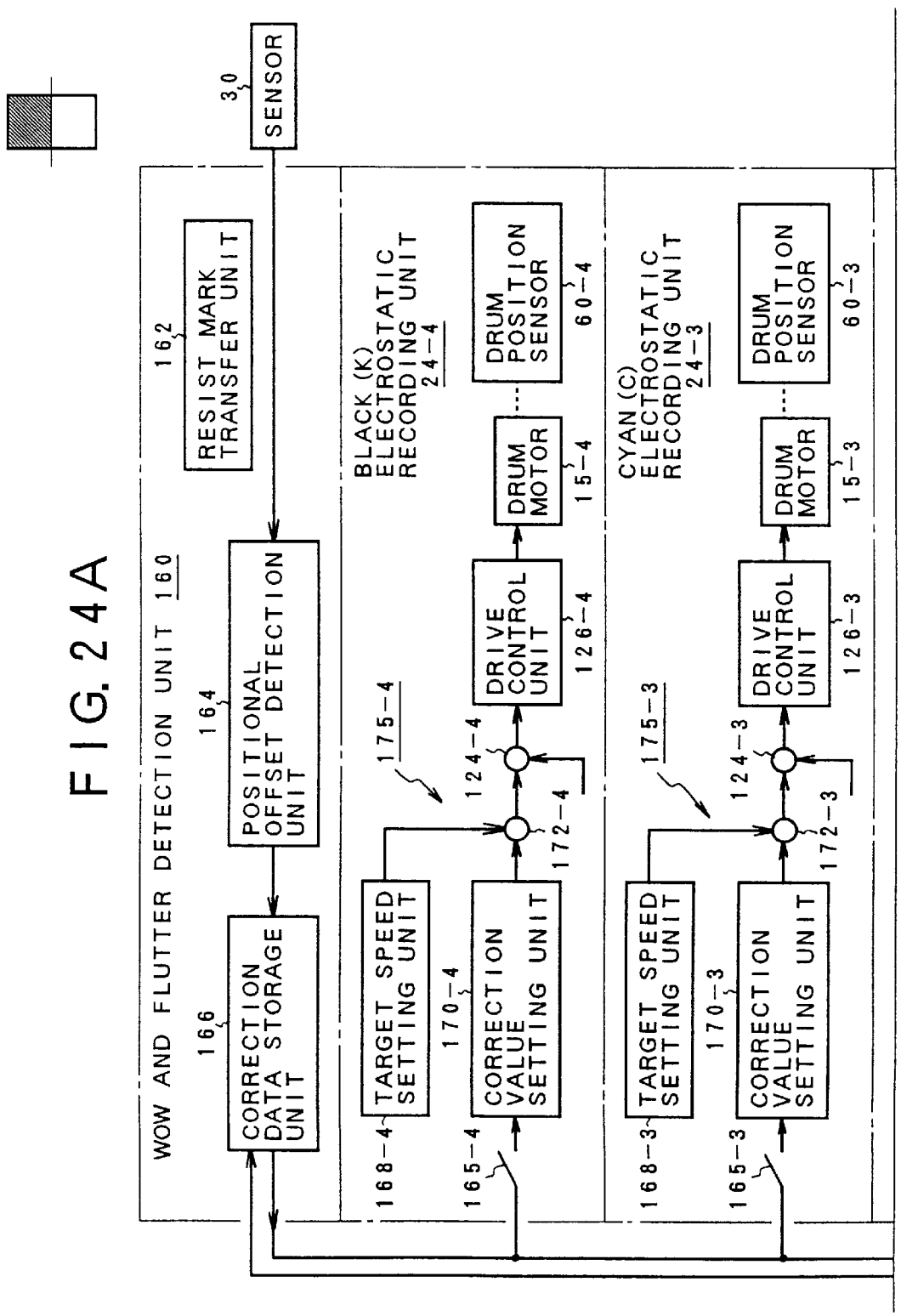
FIGS. 24A and 24B are block diagrams of control functions for speed flutter detection and correction according to the present invention.
Figure 24B:
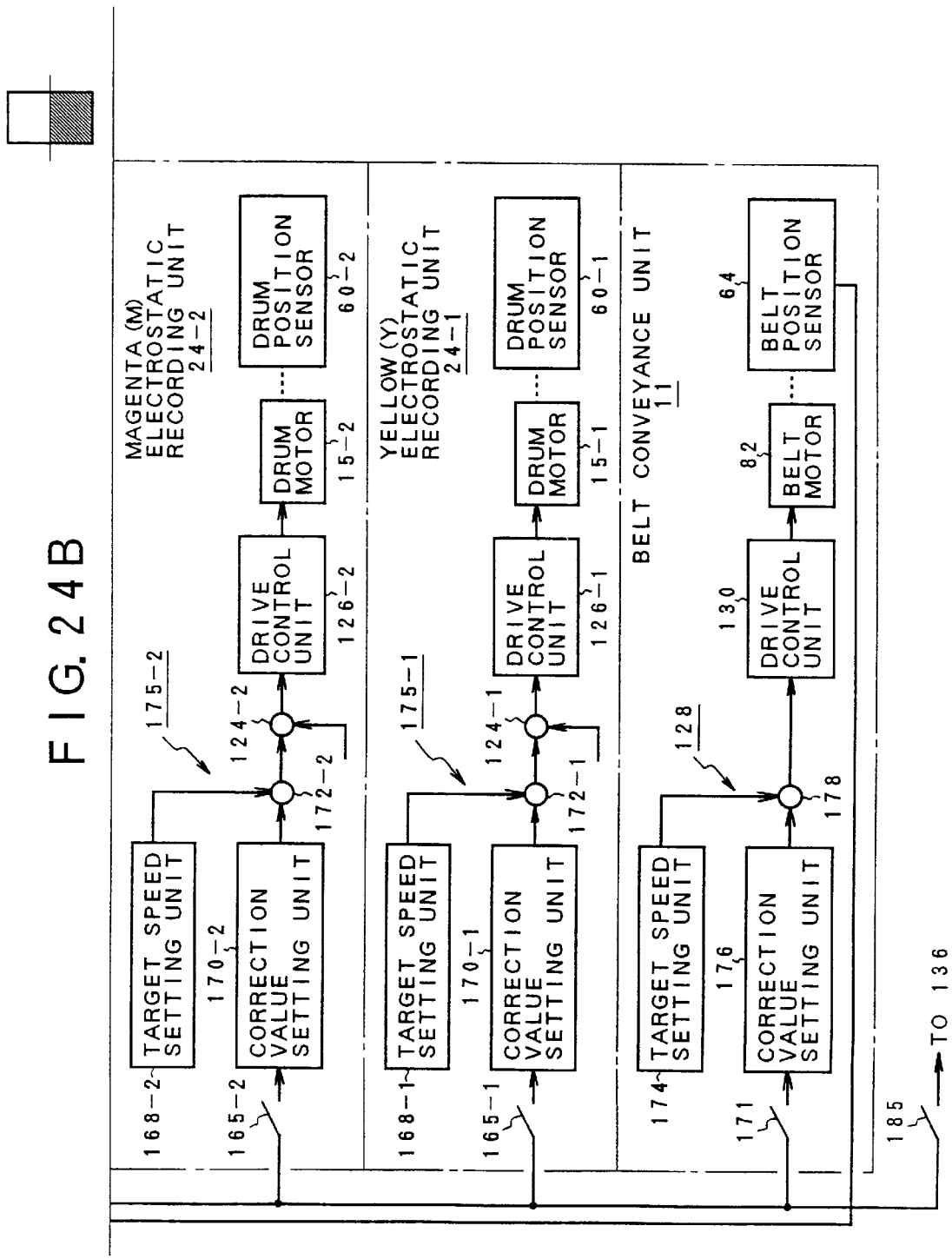

FIGS. 24A and 24B are functional block diagrams of the control processing for detecting and correcting a wow and flutter caused by an eccentricity of the rotational position of drive systems for the photosensitive drums and the belts in a printing apparatus according to the present invention. For this speed flutter detection and correction, a wow and flutter detection unit and the four wow and flutter correction units mounted on the electrostatic recording units 24-1 through 24-4 are provided. The wow and flutter detection unit 160 has a resist mark transfer unit 162, a wow and flutter detection unit 164, and a correction information storage unit 166. The speed flutter correction units 175-1 through 175-4 comprise target speed setting units 168-1 through 168-4, correction value setting units 170-1 through 170-4, and addition points 172-1 through 172-4, having the same configuration of addition points 124-1 through 124-4 and the subsequent. To the conveyer belt unit 11 also, a speed control unit 128 shown in FIGS. 14A and 14B is provided for wow and flutter correction. The speed control unit 128 comprises a target speed setting unit 174, a correction value setting unit 176, and an adder 178. To the correction value setting units 170-1 through 170-4 provided to the electrostatic recording units 24-1 through 24-4, wow and flutter correction information is set which is sent from the correction information storage unit provided to the wow and flutter detection unit 160. This correction information is specifically set using mode selection switches 165-1 through 165-4. Likewise, a mode selection switch 171 is provided to the correction value setting unit 176 of the belt conveyer unit 11 and, to the light emission controller 136 shown in FIGS. 14A and 14B, a mode selection switch 185 is provided for supplying correction values. Correction and control based on a detected wow and flutter may come in the correction based on photosensitive drum speed control, the correction based on belt speed control, or the correction based on control of LED array light emission. It is supposed here, for example, that the correction based on belt conveyance speed is mode 1, the correction based on photosensitive drum rotation speed is mode 2, and the correction based on light emission control is mode 3 so that either one of these three modes may be selected to correct the corresponding wow and flutter.

Figure 25A:
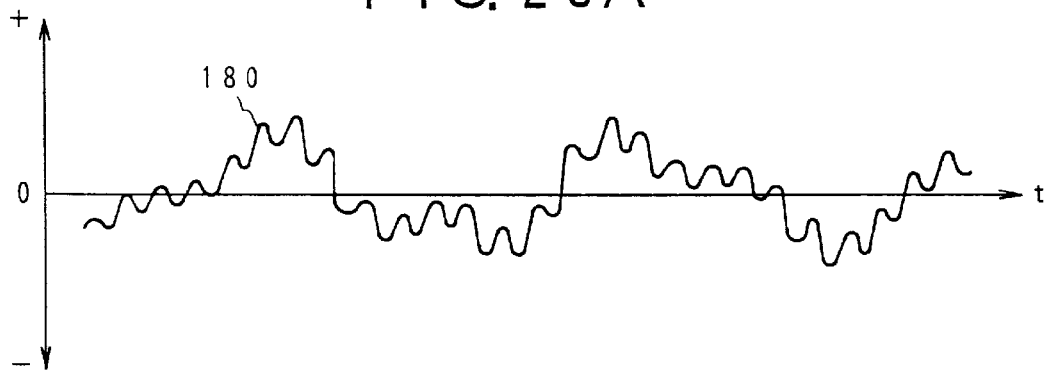
FIGS. 25A, 25B, 25C, and 25D show speed flutters and frequency components which appear on recording paper on a belt.
Figure 25B:
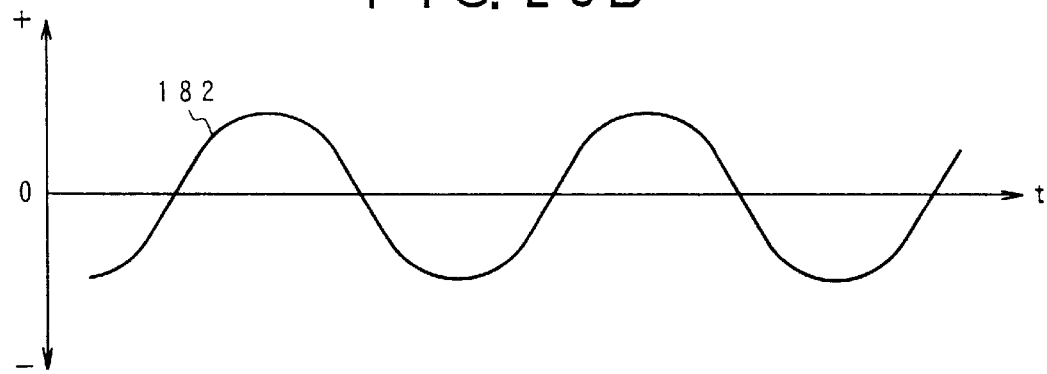
Figure 25C:
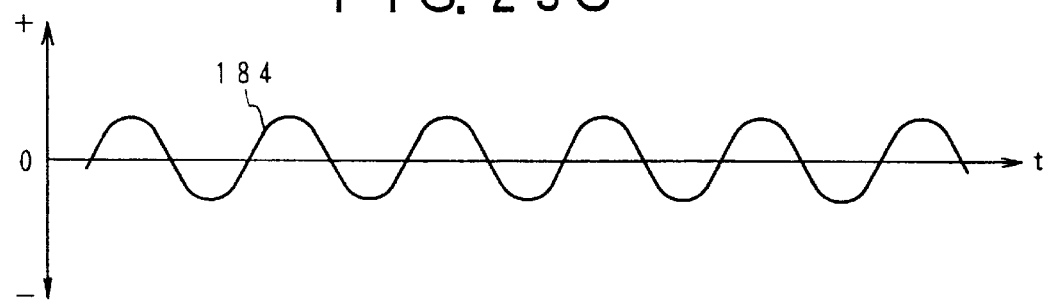
Figure 25D:
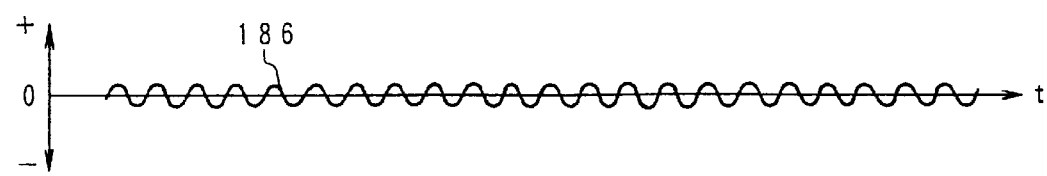

FIG. 25A shows a wow and flutter 180 when toner images are transferred onto recording paper sucked on to and being conveyed by the endless belt 12 of FIG. 1. This speed flutter on the recording paper is given by combining a wow and flutter 182 of a photosensitive drum of FIG. 25B, a wow and flutter 184 of a drive roller of FIG. 25C, and a wow and flutter 186 of a motor gear of FIG. 25D. Here, the wow and flutter of the motor gear of FIG. 25D is made up of two components because different motor gears are used on the photosensitive drum and belt sides, but to simply the explanation, they are expressed as the wow and flutter 186 of one motor gear with matched phases. The wow and flutter detection unit 160 of FIG. 24A obtains a wow and flutter 180 on recording paper shown in FIG. 25A based on both a resist mark transferred by the resist mark transfer unit 162 onto the belt and a wow and flutter detected by the wow and flutter detection unit 164 when the resist mark is read by the mark sensor 30.

Figure 26:
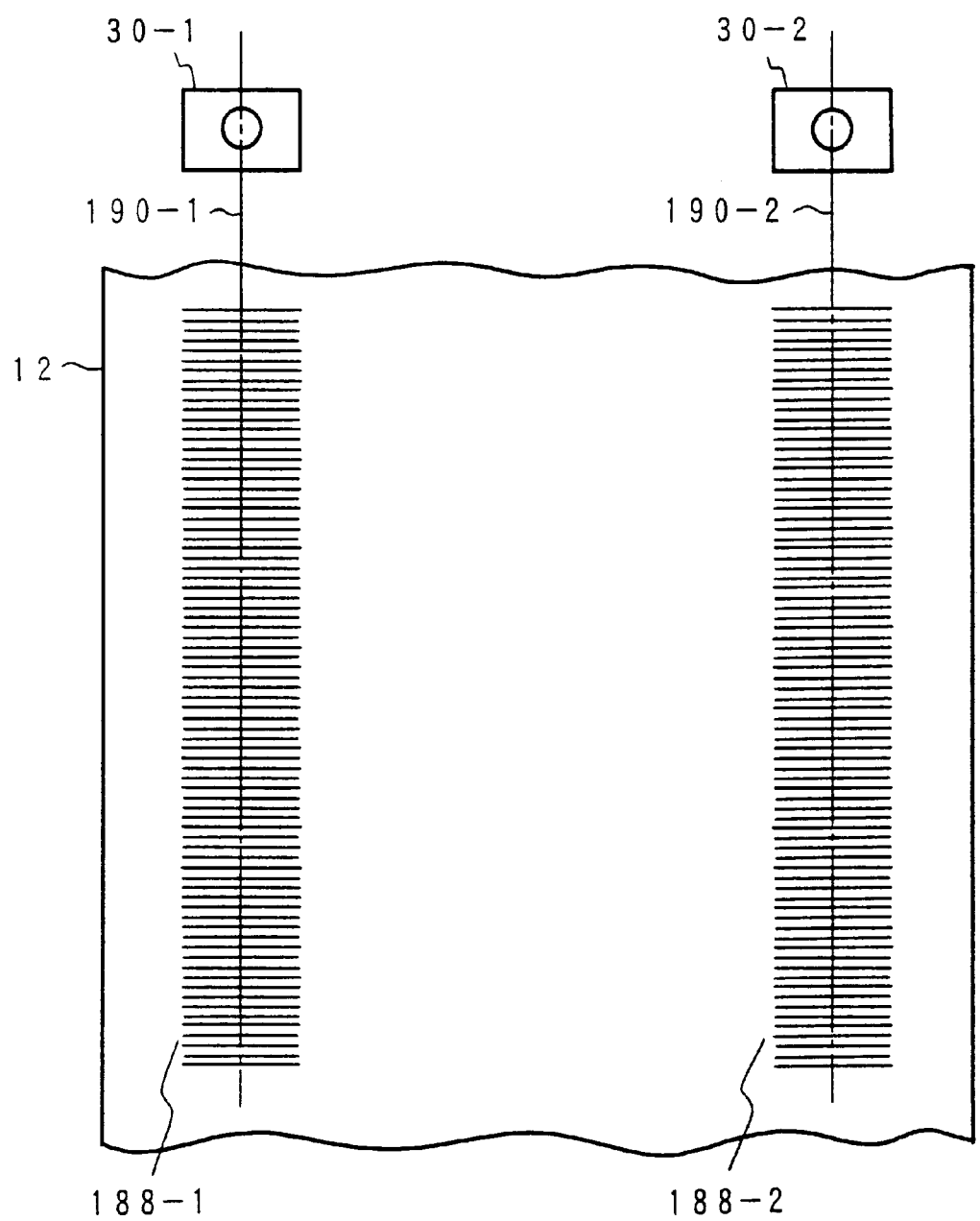
FIG. 26 shows resist marks transferred onto a belt for correction of a wow and flutter caused by a wow and flutter.

FIG. 26 illustrates how to resist marks are transferred for wow and flutter detection for the endless belt 12. In the present embodiment, the K (black) electrostatic recording unit 24-1, which has the strongest contrast, is driven on the endless belt 12, thus transferring, at a constant pitch, resist marks 188-1 and 188-2 continuously, at two positions on the belt motor side, all over the belt circumference which are in a direction perpendicular to the conveyance direction. These resist marks 188-1 and 188-2 are read by the sensors 30-1 and 30-2 and then multiplied by a belt speed at a resist mark time interval, thus enabling it to detect conveyance directional intervals at the resist marks 188-1 and 188-2 respectively.

Figure 27:
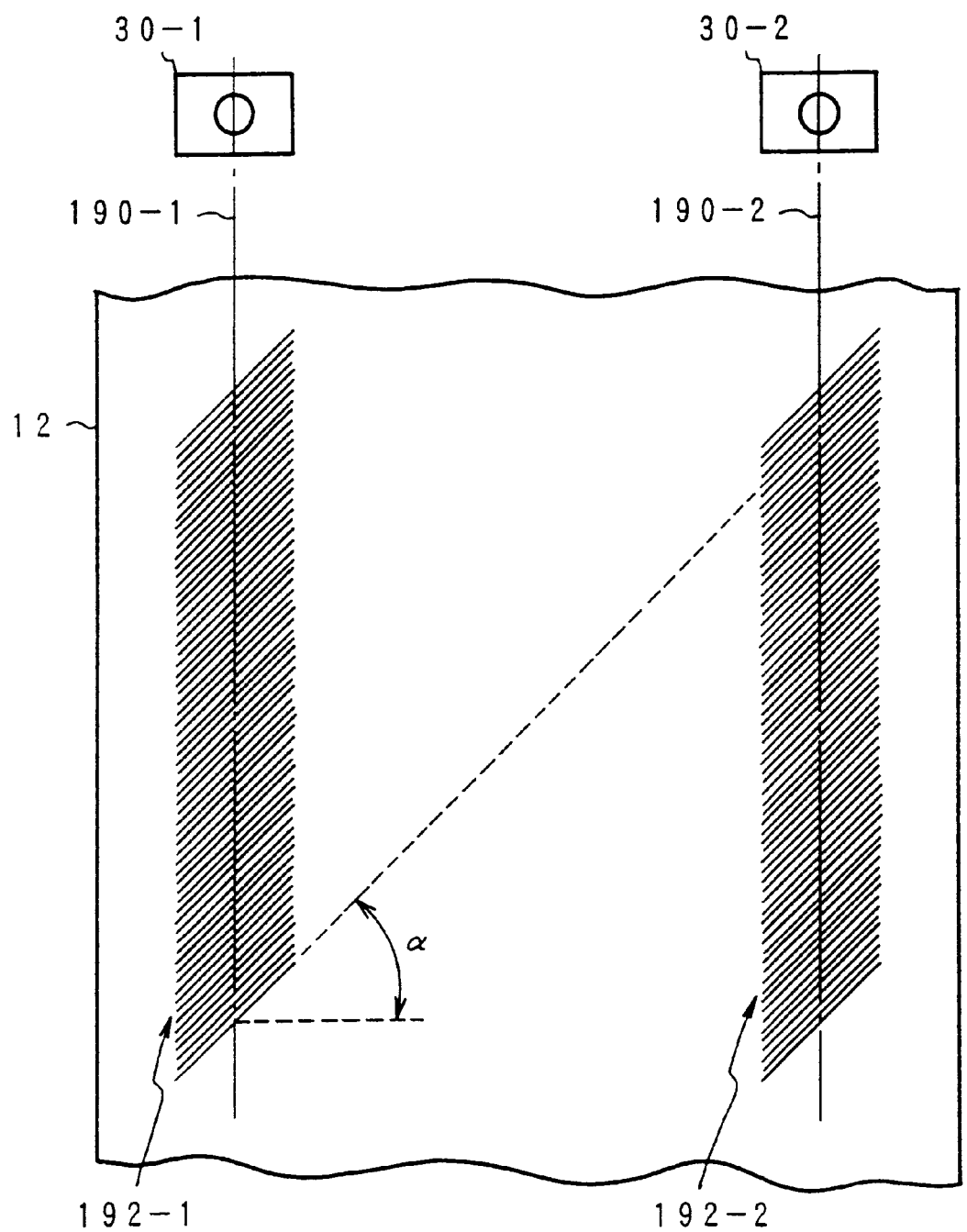
FIG. 27 shows resist marks transferred onto a belt for detection of a wow and flutter when oblique lines are used.

FIG. 27 shows how the resist mark transfer unit 162 prints, at a constant pitch, other resist marks 192-1 and 192-2 having a prescribed inclination angle alpha on the endless belt 12. Like in FIG. 26, these resist marks 12-1 and 192-2 can be read by the sensors 30-1 and 30-2 to detect the corresponding interval. Moreover, correspondence between a pair of resist marks 192-1 and 192-2 expressed by a broken line can be detected to obtain an inclination angle alpha, which may be used instead of the interval.

Figure 28:
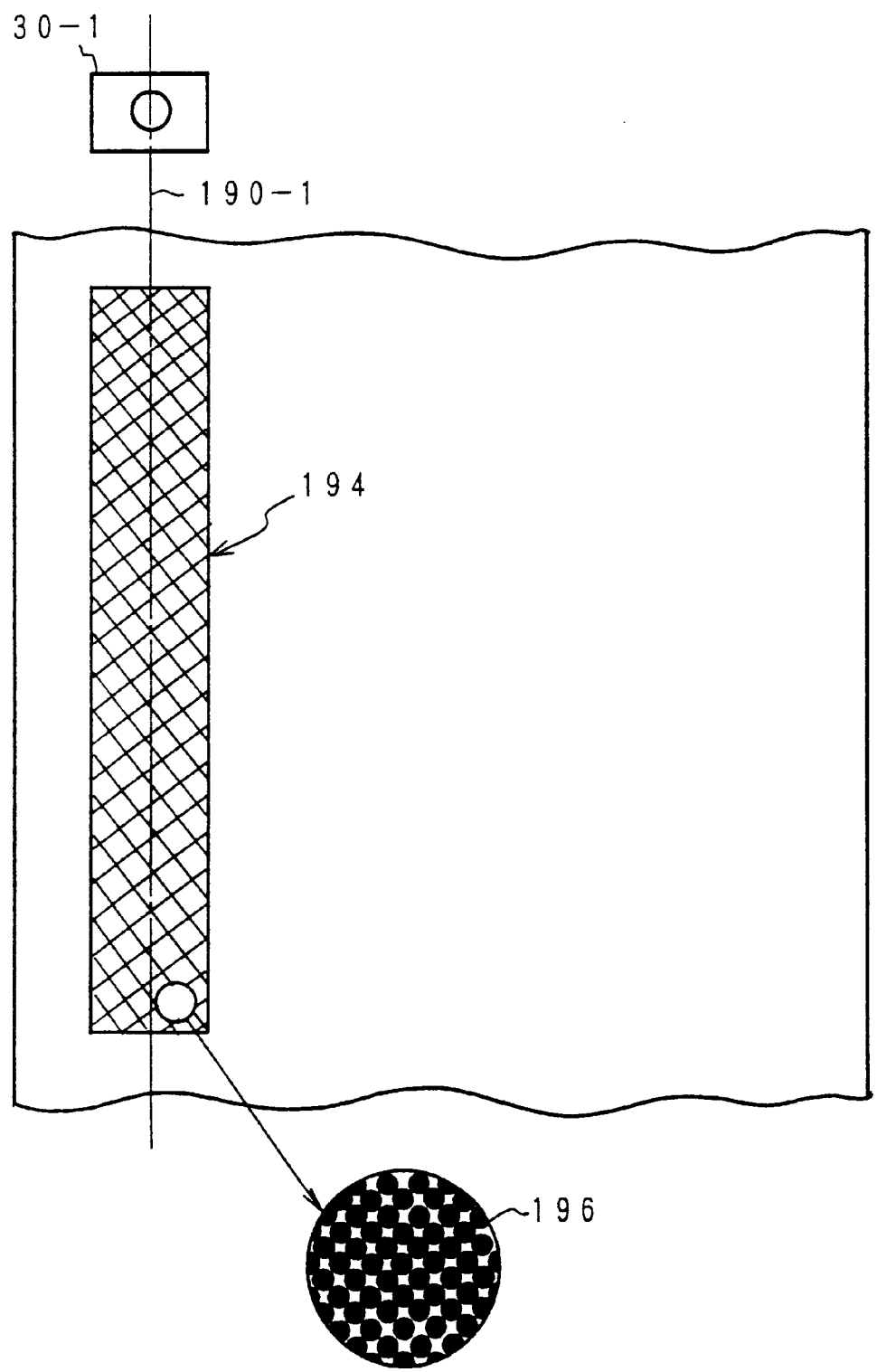
FIG. 28 shows resist marks transferred onto a belt for detection of a wow and flutter caused by a speed flutter when variable density patterns are used.

FIG. 28 illustrates the embodiment in which other resist marks are used to transfer a variable density resist pattern 194. Like an expansion portion 196, the variable density resist pattern 194 is, for example, a monochromatic dot pattern, whose pattern density is detected by the sensor 30-1. That is, if the speed is higher, the length that the variable density resist pattern 194 passes the sensor 30-1 becomes larger, thus increasing a mode detection value; if the speed is lower, the mode detection value is decreased. Therefore, the wow and flutter can be converted into a variable density detection signal and detected by the sensor 30.

Figure 29:
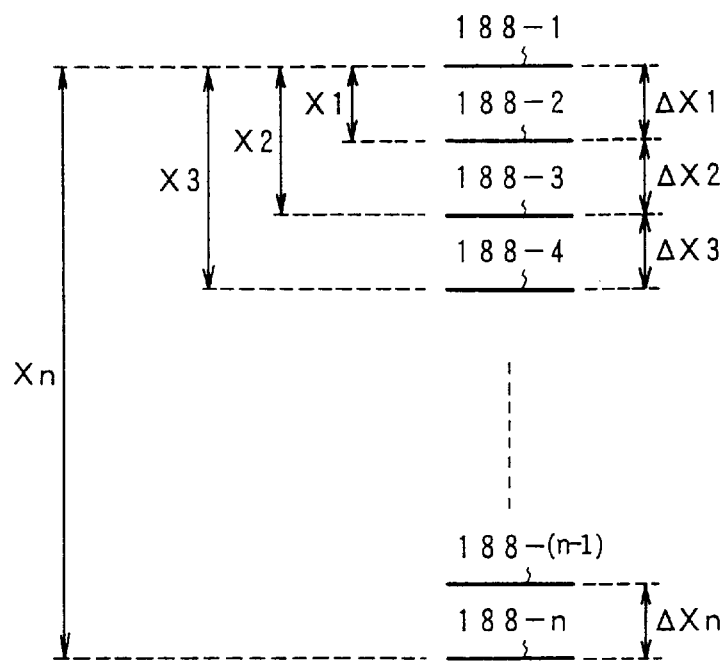
FIG. 29 shows how a wow and flutter is detected when a sensor reads out resist patterns.

FIG. 29 illustrates how a wow and flutter can be detected which is due to a wow and flutter concerning resist marks 188-1 through 188-n transferred onto the belt. In this wow and flutter detection, first the adjacent intervals $\Delta X1$, $\Delta X2$, ..., $\Delta Xn$ of the resist marks 188-1 through 188-n are detected. Next, cumulative values $X1$, $X2$, ..., $Xn$ of the detected intervals are obtained, as follows:

$$X1 = \Delta X1$$
$$X2 = \Delta X1 + \Delta X2$$
$$X3 = \Delta X1 + \Delta X2 + \Delta X3 \qquad (7)$$
$$X4 = \Delta X1 + \Delta X2 + \Delta X3 + \Delta X4$$
$$\ldots$$
$$\ldots$$
$$Xn = \Delta X1 + \Delta X2 + \Delta X3 + \Delta X4 + \Delta X5 + \ldots \Delta Xn$$

Subsequently, an average interval delta Xa is obtained as follows:

$$\Delta Xa = Xn/n \qquad (8)$$

With this, wow and flutters $\delta X1$, $\delta X2$, ..., $\delta Xn$ for a constant speed determined by target speeds for those detected intervals $\Delta X1$, through $\Delta Xn$ are given as follows:

$$\delta X1 = (\Delta X1 - \Delta Xa)$$
$$\delta X2 = (\Delta X2 - \Delta Xa)$$
$$\delta X3 = (\Delta X3 - \Delta Xa)$$
$$\delta X4 = (\Delta X4 - \Delta Xa) \qquad (9)$$
$$\delta X5 = (\Delta X5 - \Delta Xa)$$
$$\ldots$$
$$\ldots$$
$$\delta Xn = (\Delta Xn - \Delta Xa)$$

Figure 30:
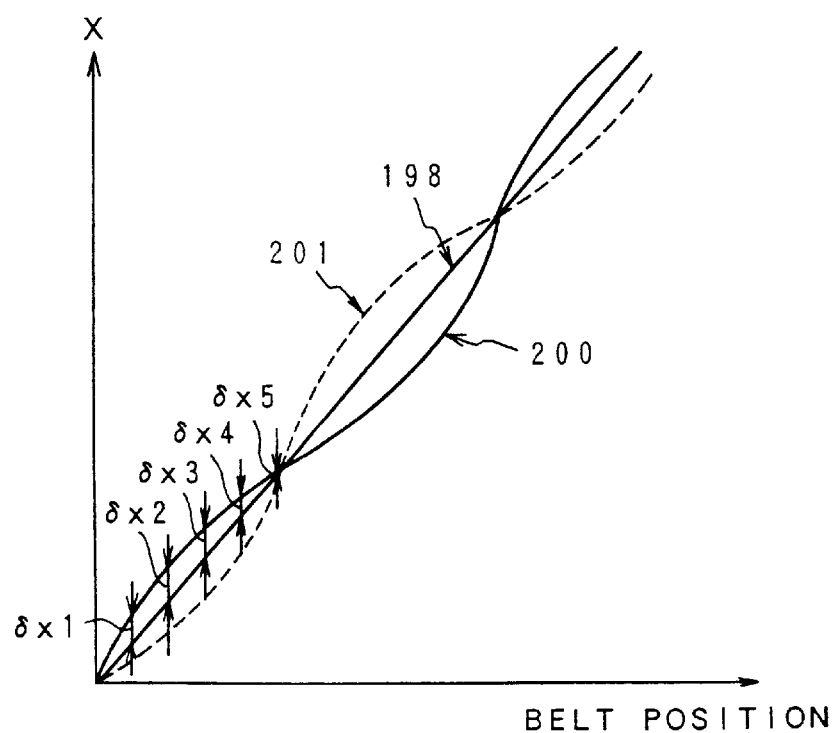
FIG. 30 shows cumulative results of detection intervals for belt positions of resist patterns.

FIG. 30 shows a wow and flutter due to a speeds flutter given by Equation (9), in which at a constant speed, a cumulative value X for a belt position indicated by the horizontal axis increases linearly. This brings about a speed deviation due to a wow and flutter. Equation (9) obtains X-directional deviations of cumulative values of the wow and flutter 200 against this constant-speed line 198, i.e. wow and flutters $\delta X1$, $\delta X2$, ....

Figure 31:
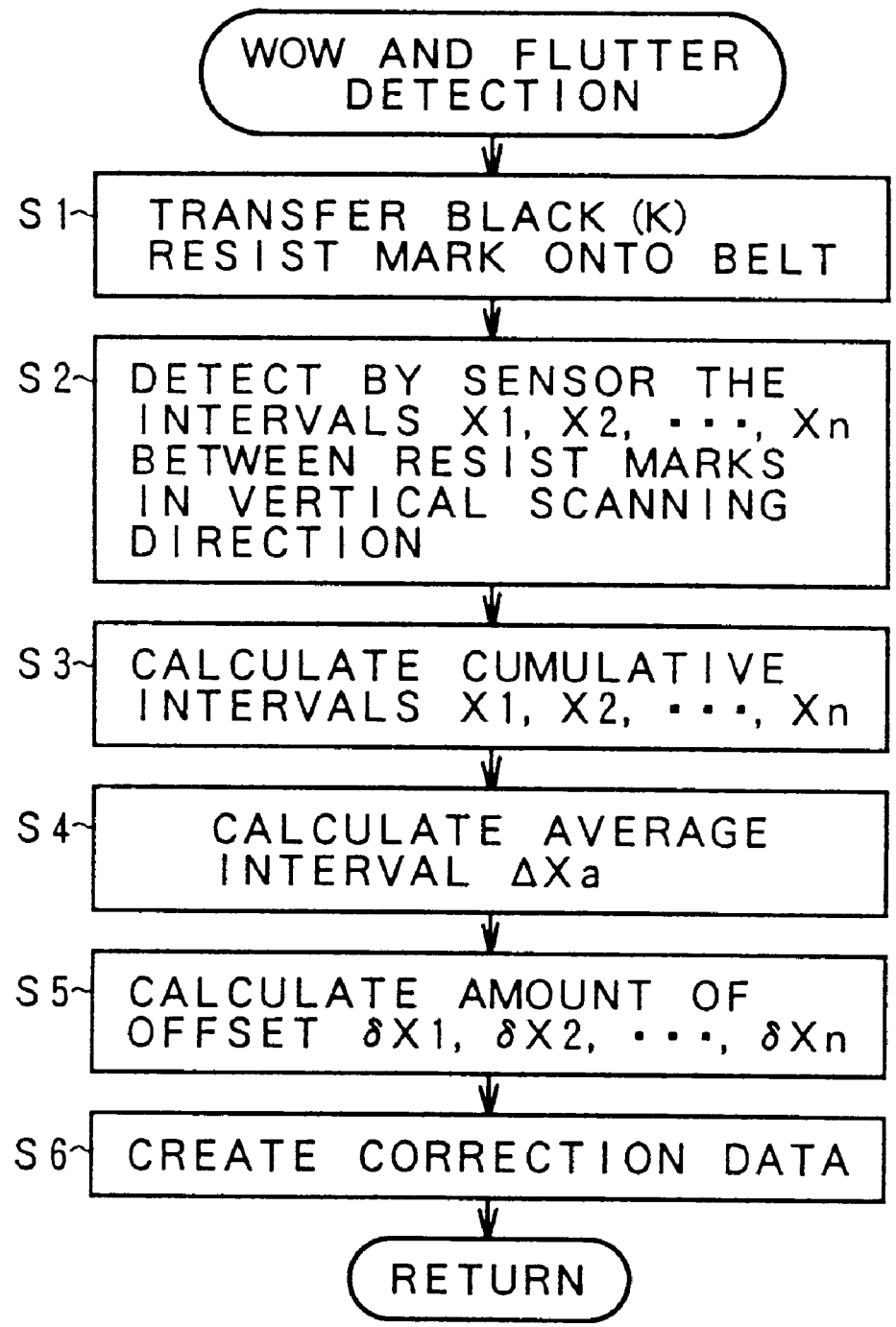
FIG. 31 is a flowchart for detection of a speed flutter according to the present invention.

FIG. 31 is a flowchart of detecting a wow and flutter by the wow and flutter detection unit 164 of FIG. 25. First, at step S1, as transferring, e.g. black (A) resist marks, which have the strongest contrast, all over the circumference of the belt, the system detects intervals X1, X2, . . . , Xn, by sensors at step S2, in a sub-scanning direction of the resist marks, i.e. the belt conveyance direction. Next, at step S3, the system uses Equation (7) to calculate cumulative intervals X1, X2, . . . , Xn and then, at step S4, obtains an average interval ΔXa. Finally at step S6, the system stores the detected wow and flutter as correction information.

Figure 32:
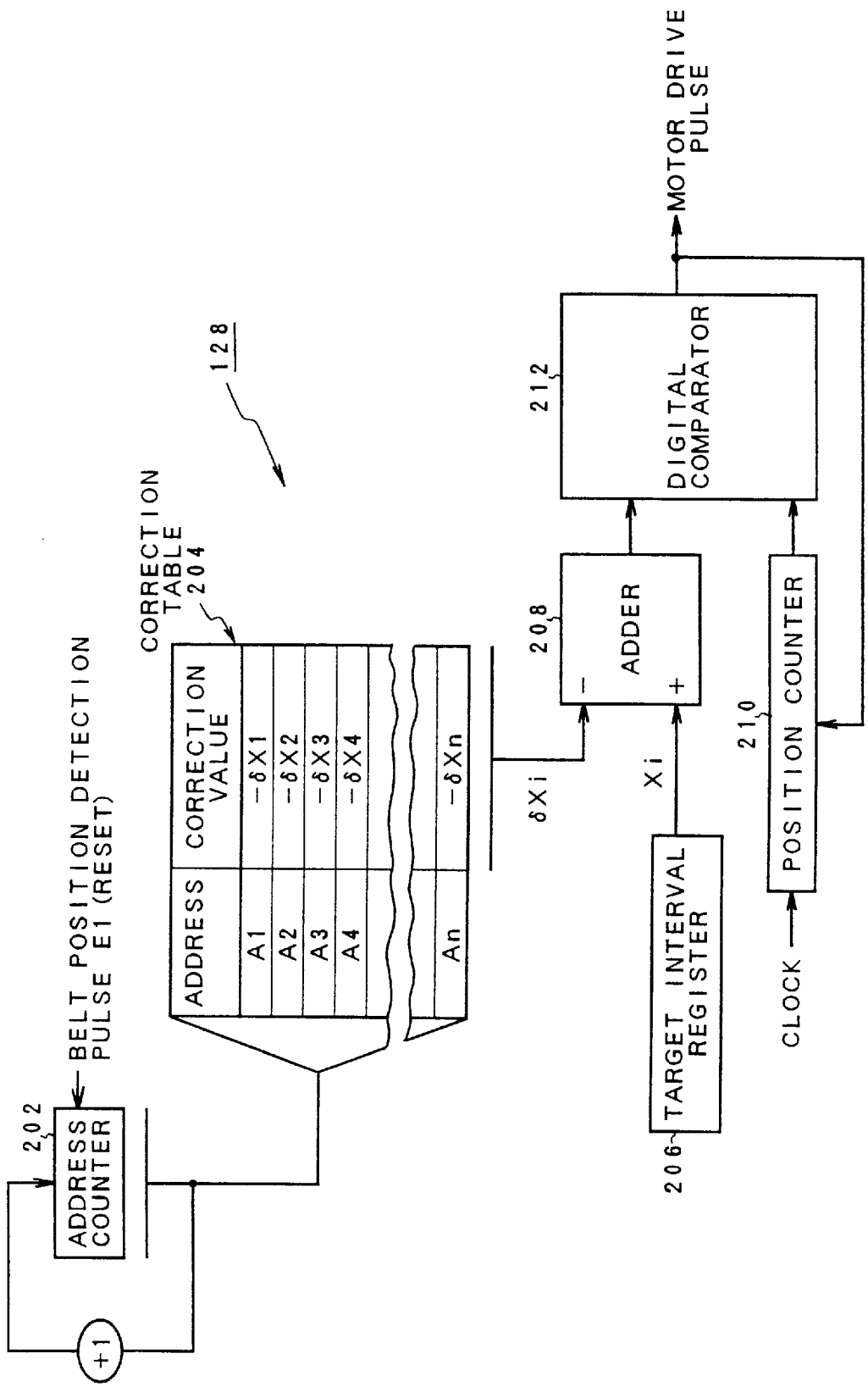
FIG. 32 is a functional block diagram of correction of a wow and flutter of FIG. 24.

FIG. 32 shows a function block which corrects a wow and flutter by the speed control unit 128 provided to, for example, the conveyer belt unit 11. In this wow and flutter correction processing, the speed is controlled so that wow and flutters δX1 through δXn obtained from Equation (9) by the wow and flutter detection unit 160 may be offset against the target speed. That is, in FIG. 30, to the wow and flutter 200 due to a wow and flutter, an opposite wow and flutter, i.e. a seed fluctuation 201 expressed by a broken line is given, thus obtaining speed control results of the constant-speed line 198. In FIG. 32, a function block for correcting a wow and flutter is provided with a correction table 204 which stores as correction values the results detected by the wow and flutter correction detection unit 164. The correction table 204 actually stores detection correction values corresponding to various belt positions in addresses. The correction table 204 reads in correction values corresponding to addresses specified by an address counter 202. The correction table 204 is addressed by the address counter 202. The address counter 202 is reset by a detection pulse E1 of the belt position sensor, to generate addresses corresponding to a belt position based on a count synchronized with belt circulation, thus reading out a corresponding correction value δXi from the correction table 204. The target interval register 206 stores prescribed target intervals Xi synchronized with a clock pulse interval of the address counter 202 corresponding to a belt target speed. The adder 208 subtracts a small delta Xi read out from the correction table 204 from a target value Xi of the target interval register 206 and outputs to a digital comparator 212 a target interval (Xi−δXi) corrected with the correction value. The position counter 210 is reset by a motor drive pulse output from the digital comparator 212, to immediately start counting the clocks with a constant period synchronized with a belt circulation speed in order to compare the count, using the digital comparator 212, to a target interval given as a target by the adder 208, so that at a matched timing, the motor drive pulse is output from the digital comparator 212.

FIGS. 33A through 33F are timing charts of correcting a wow and flutter of FIG. 32. FIG. 33A shows belt conveyance synchronization pulses, which are obtained for each belt circulation period T1 based on a detection signal of the belt position sensor. FIG. 33B shows clocks for the position counter 210. FIG. 33C shows motor drive pulses sent from the digital comparator 212, to which a constant period T2 is set for a constant speed based on a target value Xi stored in the target interval register 206. That is, motor drive pulses are output at a constant period T2 unless correction is conducted. FIG. 33D shows addresses of the address counter 202, which are incremented in synchronization with the motor drive pulses and reset by the belt conveyance synchronization pulse. FIG. 33E shows correction values read out from the correction table 204, which are subtracted by the adder 208 from a target value X0 in the target interval register 206, thus correcting the value of the target interval X0 which gives the constant period T2 of the motor drive pulses. For example, for a motor drive pulse 216 at a time t2 next to a motor drive pulse 214 at a time t1, a period based on a target interval X0 is given at a timing of a motor drive pulse 218 expressed by a broken line. In this case, this timing is corrected into (X0+δX1) such as an output of the adder of FIG. 33F, so that pulses are output at a timing of a motor drive pulse 216 at time t2. That is, in this case, a pulse interval of motor drive pulses is increased by as much as δX1, thus decreasing the motor speed. Oppositely, in the case of, for example, adder output values (X0−δX4) and (X0−δX5) of the fifth and sixth circulations where the target interval X0 is subtracted by a correction value, the pulse interval of motor drive pulses is decreased by as much as the subtrahend, increasing the motor speed that much.

The timing charts of FIGS. 33A through 33F concern the correction processing of a wow and flutter by the speed control unit 128 of the conveyance belt unit 11 of FIG. 24A, in mode 1 where the mode selection switch 171 is turned on. In the case of correcting a speed flutter in mode 2, on the other hand, the mode selection switches 165-1 through 165-4 are turned on, so that correction is conducted by controlling the speed of the drum motors 15-1 through 15-4 of the electrostatic recording units 24-1 through 24-4. This correction of the drum motors 15-1 through 15-4 is conducted by the same function block as in FIG. 32, so that both the target interval X0 in the target interval register 206 and the clock period for the position counter 210 take values peculiar to the photosensitive drum.

FIGS. 34A through 34H are timing charts in mode 3 for correcting a speed flutter based on light emission control by the light emission controller 136 when the mode selection switch 185 is turned on in FIG. 24B. In these timing charts, too, light emission timing pulses in the sub-scanning direction of FIG. 34C are replaced by motor drive pulses of FIG. 33C. Moreover, write-in gates of FIG. 34G are set, so that at time t2 when the write-in gates are turned high (H) and later, the sub-scanning directional light emission timing pulses of FIG. 34C are output, to act as sub-scanning directional light emission synchronization pulses of FIG. 34H. The belt conveyance synchronization pulses of FIG. 34A, the clocks of FIG. 34B, the address counters of FIG. 34D, values read out from the correction table of FIG. 34E, and values output from the adders of FIG. 34F are basically the same as the case of motor driving of FIGS. 33A, 33B, 33D, 33E, and 33F, i.e. the clock period takes a value corresponding to a resolution, for example, 600 dpi in the sub-scanning direction, i.e. the belt conveyance direction.

FIG. 35 is a flowchart of correcting a wow and flutter shown in FIGS. 24A and 24B. First, at step S1, one mode is selected. That is, the system selects either one of mode 1 to correct the belt conveyance speed, mode 2 to correct the drum rotational speed, and mode 3 to correct the timing at which LED arrays emit lights. The mode can be set appropriately by using, for example, DIP switches mounted on the, for example, control boar data step of manufacturing and assembling a printing apparatus according to the present invention. Of course, alternatively, instead of using the mode selection function, a particular mode may be set fixedly, to correct a wow and flutter. Next, when having decided the start of printing at step S2, the system goes to step S3, to check the existence of belt conveyance pulses by using a belt position sensor. When belt conveyance pulses are given, the system goes to step S4, to set A=1 as an initialization of address A used to read out the correction table. If no belt conveyance pulses are given, on the other hand, the system goes to step S5, to update the address. Next, at step S5, the system reads out a correction value δ Xi from the correction table based on address A and then goes to step S6 to correct X, i.e. the number of target interval clocks. Subsequently, at step S7, the system increments a clock count X and then goes to step S8 to check whether the count X agrees with a target clock count X0. When they agree, the system goes to step S9, to output drive pulses or light emission pulses. Next, at step S10, the system checks for drive termination and, if no termination is found, returns to step S3 to process the next pulse output. If drive termination is found, the system goes to step 11 to check for printing apparatus termination and, if termination is found, goes again to step S2 to wait for drive start by the next print instruction.

Wow and flutter correction by use of Fourier transform

Figure 36A:
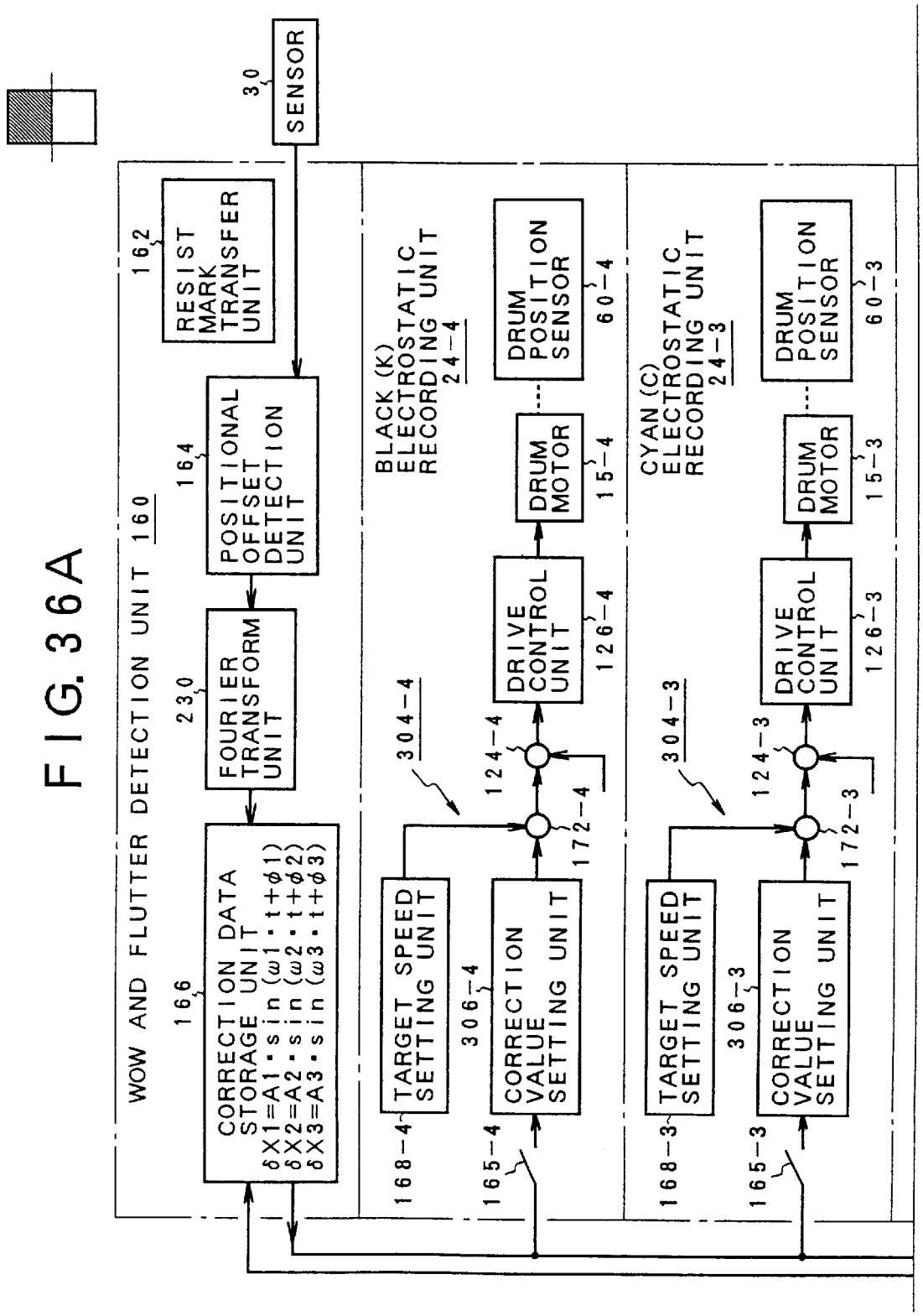
FIGS. 36A and 36B are block diagrams of control functions of correcting a seed flutter whereby detected wow and flutter results are Fourier-transformed.
Figure 36B:
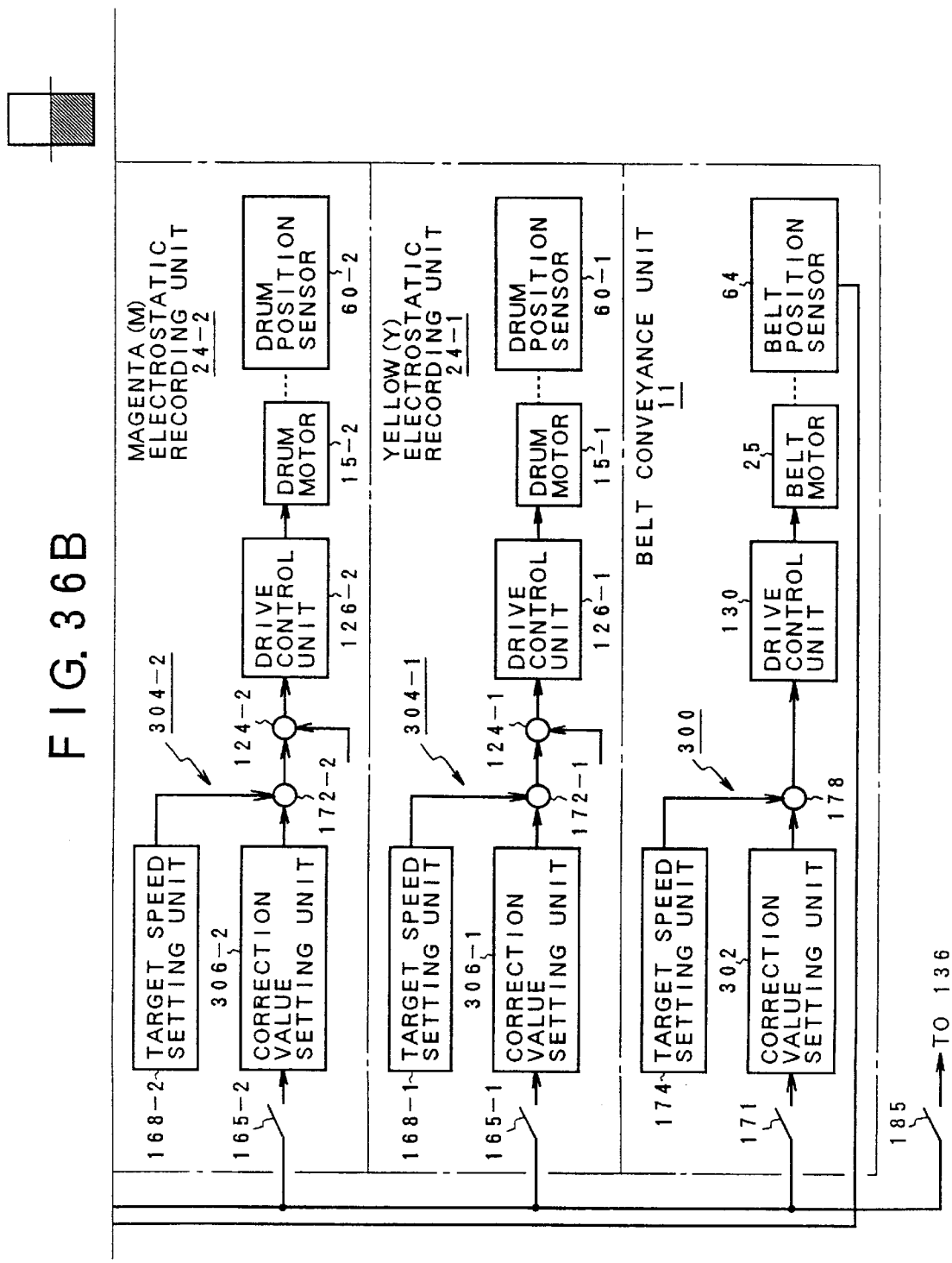

FIGS. 36A and 36B show another embodiment of the speed flutter detection and correction according to the present invention. The present embodiment features that the detection results of wow and flutter due to a speed flutter are Fourier-transformed to generate correction information, which is then used to correct the speed. The wow and flutter detection unit 160 is provided with a Fourier transform unit 230, like the resist mark transfer unit 162 and the wow and flutter detection unit 164. The Fourier transform unit 230 performs Fourier transform on digital information obtained of the wow and flutter 180 for recording paper such as shown in FIG. 25A in the wow and flutter detection unit 160, to generate analysis results of, for example, speed flutter components of a photosensitive drum of FIG. 25B, speed flutter components of a drive pulley of FIG. 25C, and also speed flutter components of a motor gear of FIG. 25D. The analysis results of various frequency components thus obtained by Fourier transform are stored in the correction information storage unit 166. Corresponding to the wow and flutter detection unit 160, the belt conveyance unit 11 is provided with a speed control unit 300, a target speed setting unit 174, a correction value setting unit 302 for correction processing based on Fourier transform results, and an adder 178. The electrostatic recording units 24-1 through 24-4, on the other hand, are provided with speed flutter correction units 3-4-1 through 3-4-4 for speed correction based on Fourier transform results. These speed flutter correction units 304-1 through 304-4 are provided with target speed setting units 168-1 through 168-4, correction value setting units 306-1 through 306-4, and addition points 172-1 through 172-4. Also, mode selection switches 165-1 through 165-4, 175, and 185 are provided to correct and control the speed of the belt motor 25 and the drum motors 15-1 through 15-4 or select either one of the modes to control the LED array light emission timing.

Figure 37:
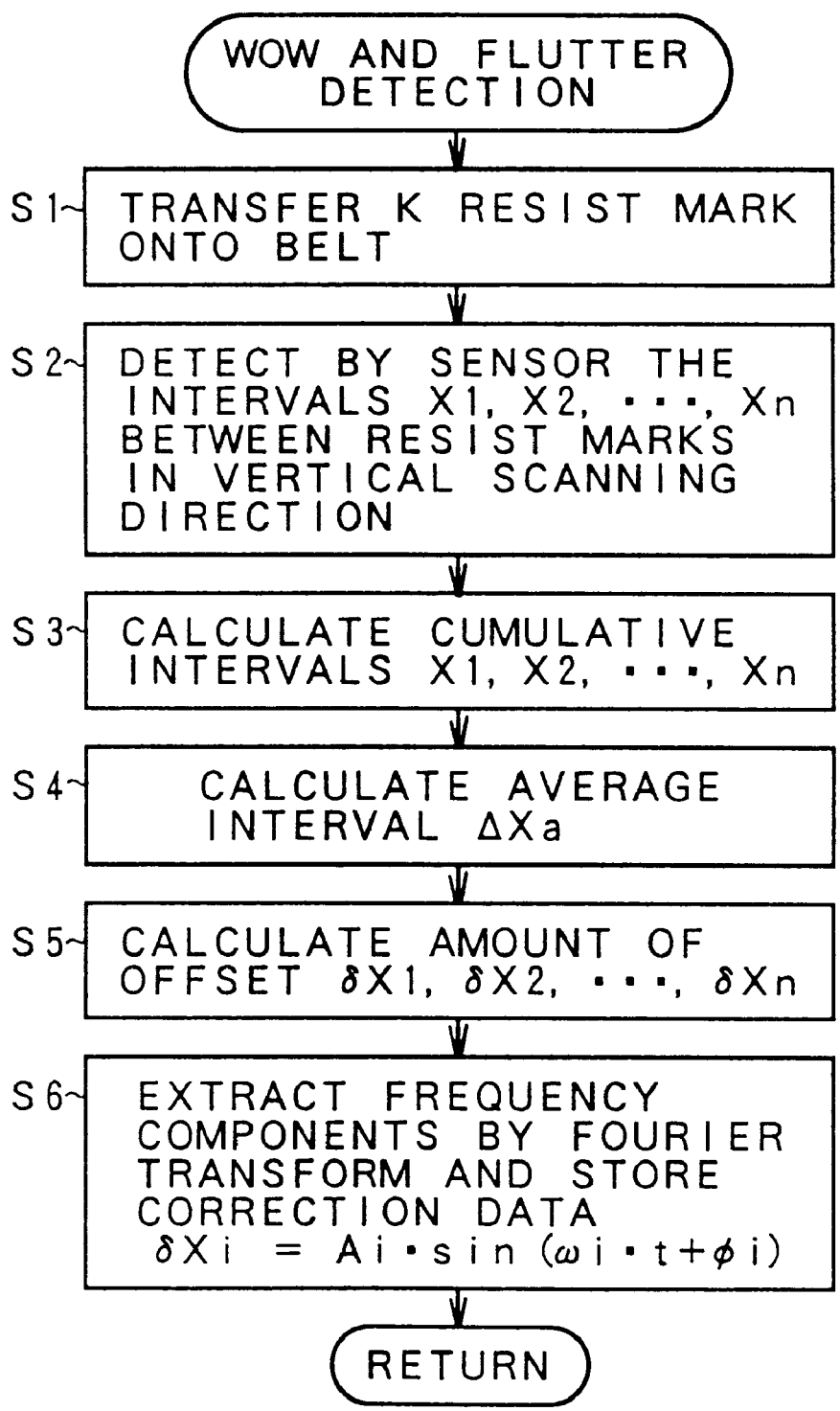
FIG. 37 is a flowchart for detection of a wow and flutter of FIGS. 36A and 36B.

FIG. 37 is a flowchart of detection processing by the wow and flutter detection unit 160 of FIGS. 36A and 36B. At steps S1 through S5, wow and flutters δX1 through small delta Xn are detected on the basis of transferred resist marks in the same way as in FIG. 32. At step S6, however, the detected results of the wow and flutters are Fourier-transformed to extract frequency components, which are stored as correction information. Specifically, a wow and flutter δXi of a given frequency component fi is expressed as follows:

$$\delta Xi = Ai \cdot \sin(\omega i \cdot t + \phi i)$$

Amplitude A, angular velocity ωi, and phase φi are stored as correction information.

Figure 38A:
FIGS. 38A, 38B, 38C, and 38D show frequency components after a wow and flutter in FIGS. 36A and 36B is Fourier-transformed.
Figure 38B:
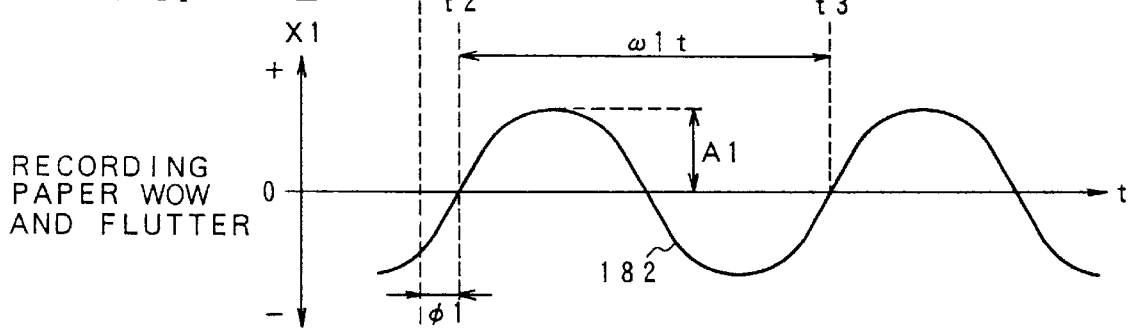
Figure 38C:
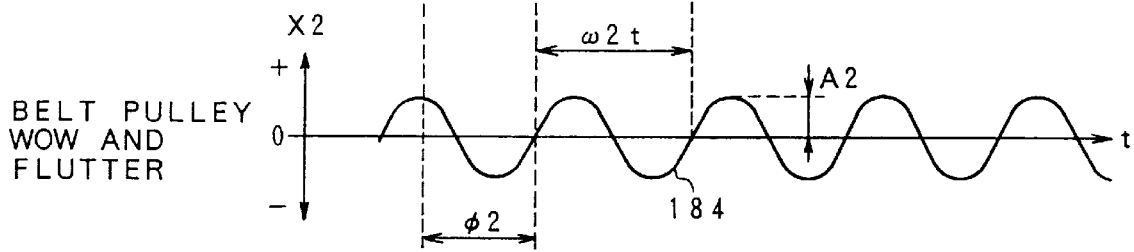
Figure 38D:
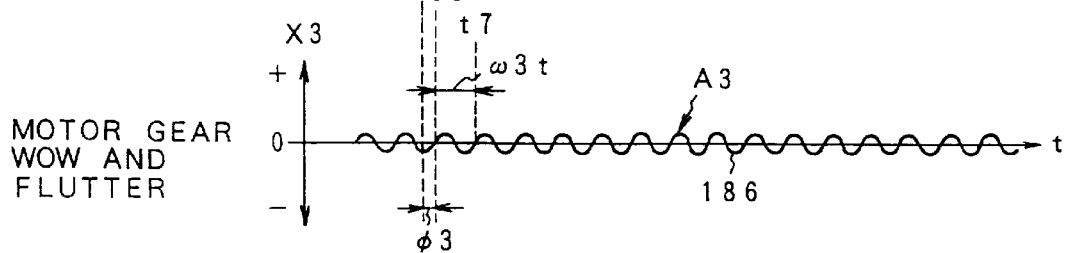

FIGS. 38A through 38D show analysis results of three frequency components of a photosensitive drum, a drive pulley, and a motor gear obtained by performing Fourier transform on the results of wow and flutter detection processing of FIG. 37. That is, FIG. 38A shows belt synchronization pulses obtained by the belt position sensor, whose time t1 for the belt synchronization pulses provides a reference position in the analysis results of frequency components of Fourier transform. FIG. 38B show frequency components of a wow and flutter of a large photosensitive having a period ω1t, the largest diameter, phase φ1, and an amplitude A1 for belt synchronization pulses. FIG. 38C shows frequency components of a drive pulley having a period ω2t, the second largest diameter, an amplitude of A2, and a phase φ2 for the belt synchronization pulse t1. FIG. 38D shows frequency components of a motor gear having the smallest period ω3t, an amplitude A3, and a phase φ3 for the belt synchronization pulse.

Figure 39:
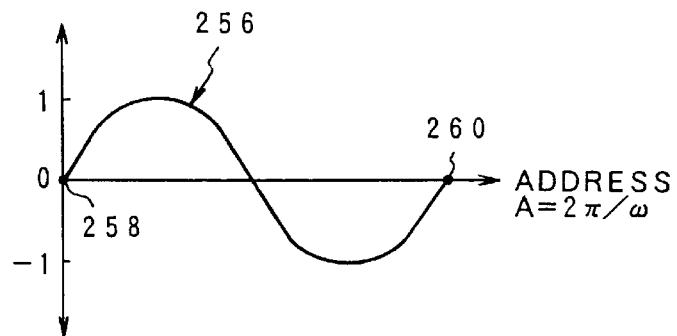
FIG. 39 shows a sine table used in correction of a wow and flutter based on Fourier-transformed frequency components.

FIG. 39 shows a sine table which stores sine data for one period used to generate correction values for wow and flutter correction based on an amplitude Ai, an angular velocity ωi, and a phase φi of a frequency component obtained by Fourier transform as shown in FIGS. 38B through 38D. This sine table has a horizontal axis indicating addresses, out of which address A is defined as 2 π/ω. The vertical axis has normalized values in a range of plus-minus 1. The start address 258 corresponds to A=0. The end address 260 also has the same value, whereupon the address is reset to address 258.

Figure 40A:
FIGS. 40A and 40B show read-out addresses of sine tables which generate Fourier-transformed frequency components.
Figure 40B:
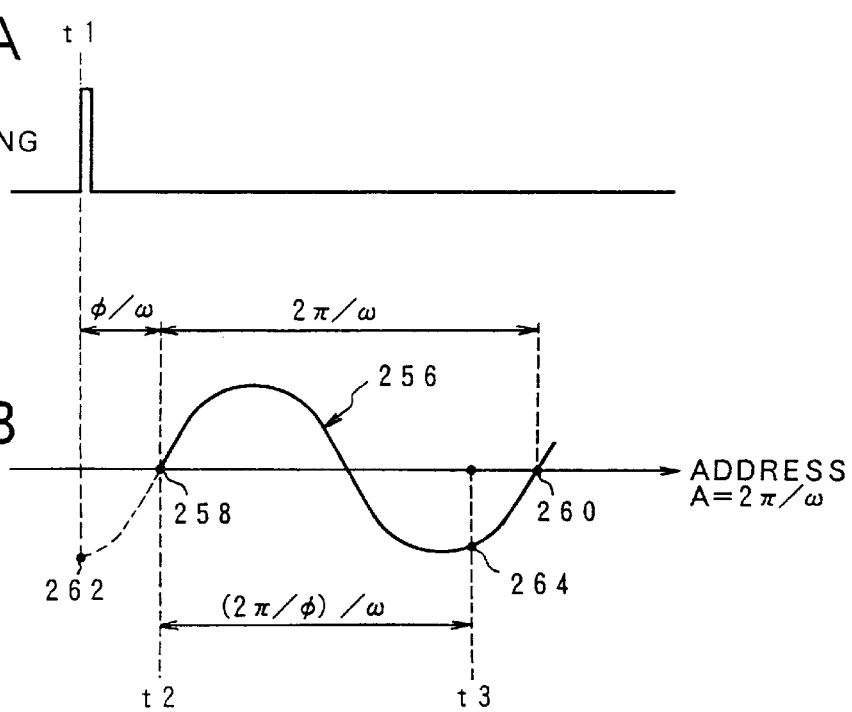

FIGS. 40A and 40B show addresses read out from the sine table in the case where as shown in FIGS. 37B through 37D, phases φ1 through φ3 have phase shifts as against a reference position determined by the belt synchronization pulse. If, as shown in FIG. 40B, a phase φ is given for a belt synchronization pulse of FIG. 40A and is converted into an address, a sine value 262 is given of the address that a position which is shifted by φ/ω before the start address 258 matches the belt synchronization pulse. This sine value 262 provides an address that gives a sine value 264 which is shifted by (2 π−φ)/ω as against the start address 258 in a sine table having a range of the start address 258 through the end address 260. That is, when a phase φ is given, an address offset by (2 π−φ)/ω corresponding to φ is used as the start address, to read out the sine table.

Figure 41A:
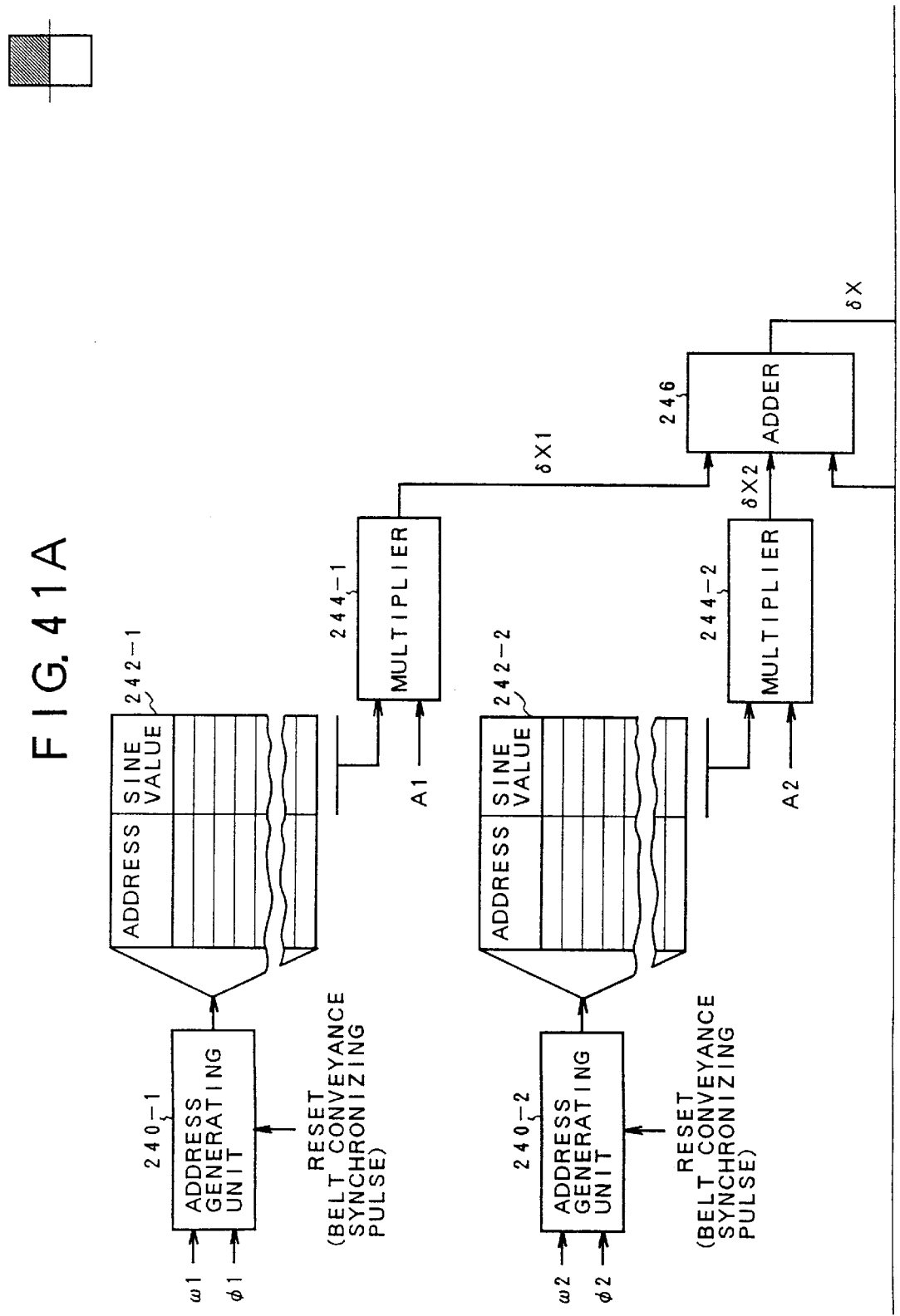

FIGS. 41A and 41B show a function block for correcting a wow and flutter based on the Fourier transform results of FIGS. 38B through 38D. First, to generate correction values according to three frequency components, sine tables 242-1 through 242-3 are provided. To these sine table 242-1 through 242-3, address generation units 240-1 through 240-3 are provided respectively. The address generation units 240-1 through 240-3 are reset by belt conveyance synchronization pulses, to generate addresses according to FIG. 40B based on both the angular velocities ω1 through ω3 and the phases φ1 through φ3 which are set as correction information obtained by Fourier transform. Sine values read out from the sine tables 242-1 through 242-3 are multiplied by amplitude values A1, A2, and A3 which are also set as correction information by the multipliers 244-1, 244-2, and 244-3, to obtain wow and flutters δX1, δX2, and δX3 for each frequency component, which are then added by the adder 246, thus obtaining a composite wow and flutter correction value δX. Subsequently, the adder 250 subtracts a target interval X0 read out from the target interval register 248 from the composite wow and flutter correction value δX of the adder 246, to obtain a corrected interval (X0+δX). This interval value is entered into the digital comparator 254 and compared to the position counter 252 which is counting clocks. If they agree, the counter 252 outputs drive pulses. That is, the stages from the adder 250 through the output side of the digital comparator 254 are the same as the embodiment of FIG. 32, except that it has a previous stage of a unit forming correction values based on the correction information of the Fourier transform results.

Figure 42:
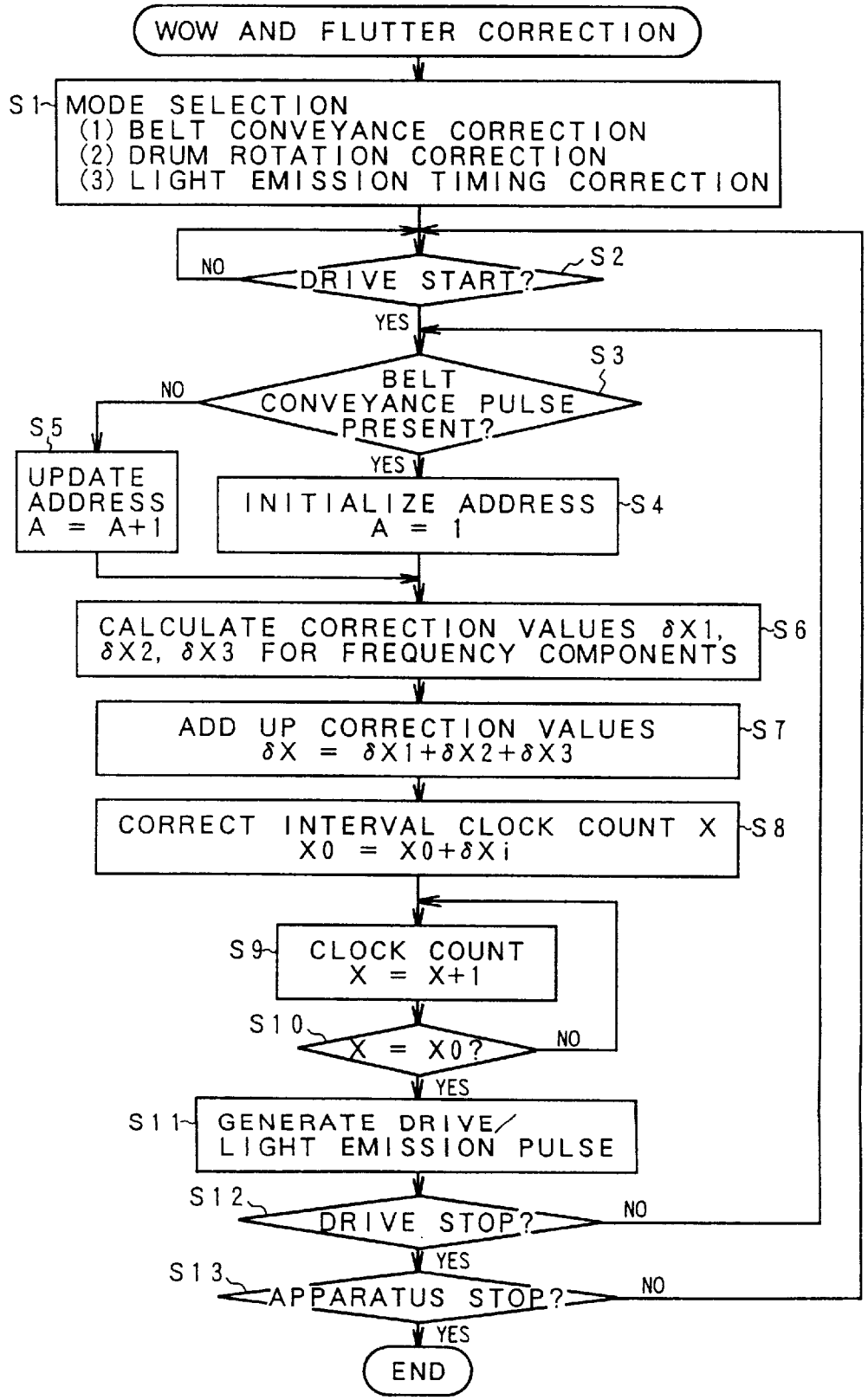
FIG. 42 is a flowchart for correction of a wow and flutter of FIGS. 40A and 40B.

FIG. 42 is a flowchart for correcting a wow and flutter using as correction information the Fourier transform results of FIGS. 41A and 41B. This flowchart is the same as the speed flutter correction processing of FIG. 35, except that the system calculates correction values δX1 through δX3 for each frequency component at step S6 and then goes to step S7 to obtain their sum, δX.

As explained above, a printing apparatus according to the present invention detects drum rotational positions of the photosensitive drums of a plurality of electrostatic recording units corresponding to different color components, to correct the rotational phases of the drums into a prescribed phase so that the transfer positions of the drum circumferential surfaces with respective to the rotational position of one photosensitive drum placed at one edge may be the same on recording paper being conveyed by the belt. That is, the transfer positions on those drums with respect to the recording paper on the belt can be agreed even if a wow and flutter may occur in the circumferential speed of the photosensitive drums because of an eccentricity of the rotational center in a drive system ranging from the drum motor via gear trains to the photosensitive drums, thus decreasing a wow and flutter, i.e. a color shift for each color pixel although the pixel pitch in the recording paper conveyance direction may change.

Moreover, a wow and flutter due to an eccentricity of the drive systems of the photosensitive drums and the belt drive systems can be detected, to correct and control that speed so as to eliminate this wow and flutter. With this, a wow and flutter due to an eccentricity of the rotational centers of such rotating members as gears, drums, and pulleys of the drive system can be decreased, thereby easily improving the accuracy of pixel pitches in the recording paper conveyance direction without increasing the processing accuracy and assembly accuracy, which are costly.

Although the above-mentioned embodiments have been described with the cases where LED arrays are used as Y, M, C, and K electrostatic recording units, laser beam scanners may of course be used instead. Also, the present invention is not restricted by the numerals indicated in the above-mentioned embodiments.

What is claimed is:

1. A printing apparatus comprising:
   a belt conveying mechanism including a belt for conveying recording paper at a certain speed;
   a plurality of electrostatic recording units arranged in a direction in which said recording paper is conveyed by said belt, for forming latent images in conformity with image data through optical scanning of a plurality of rotating photosensitive drums, to develop the latent images with toner components having different colors prior to the transfer onto the recording paper lying on said belt;
   a plurality of drum position sensors for detecting rotational positions of said plurality of photosensitive drums; and
   a drum phase correction unit for correcting rotational phases of said photosensitive drums to predetermined phases in a manner such that transfer positions on circumferential surfaces of said photosensitive drums relative to said belt have a specific relationship on said recording paper when employing, as respective references, the rotational positions detected by said plurality of drum position sensors,
   wherein said drum phase correction unit comprises:
   a resist mark transfer unit for causing said plurality of electrostatic recording units to act simultaneously on said belt, to transfer of resist marks having different colors thereonto;
   a phase detection unit for detecting transfer resist marks on said belt by a sensor to determine transfer intervals relative to adjacent said electrostatic recording units, thereby calculating differences in rotational phases between specific one of said photosensitive drums as a reference and the other photosensitive drums; and
   a phase control unit for phase controlling drum motors so that said the other photosensitive drums keep the rotational phases detected by said phase detection unit relative to the reference phase of said reference photosensitive drum.

2. A printing apparatus according to claim 1, wherein said phase detection unit finds errors (L mod 2πD) from a remainder of the drum circumference (2πD) based on the drum diameter D from the detected interval L between the adjacent drums, finds cumulative errors of the other photosensitive drums relative to the photosensitive drum as a reference positioned at the end, and converts each of said cumulative errors into drum rotational angles to thereby obtain rotational phases φ relative to said reference drum.

3. A printing apparatus according to claim 1, wherein said drum phase correction unit comprises:
   a phase detection unit for setting the interval between adjacent drums of said plurality of electrostatic recording units to a predetermined value L0, finding errors (L mod 2πD) from a remainder of the drum circumference (2πD) based on the drum diameter D from the detected interval L0 between the adjacent drums, finding cumulative errors of the other photosensitive drums relative to the photosensitive drum as a reference positioned at the end, and converting each of said cumulative errors into drum rotational angles to thereby obtain rotational phases φ relative to said reference drum; and
   a phase control unit for phase controlling drum motors so that said the other photosensitive drums keep the rotational phases detected by said phase detection unit relative to the reference phase of said reference photosensitive drum.

4. A printing apparatus according to claim 3, wherein said phase control unit phase controls in such a manner that the phase from the detected rotational position of said reference photosensitive drum up to the detected rotational position of said other photosensitive drums has a specific relationship including coincidence relative to the detection phase detected by said phase detection unit.

5. A printing apparatus according to claim 3, wherein said plurality of electrostatic recording units are arranged from the upstream of said belt toward the downstream thereof in the sequence of yellow, magenta, cyan and black, or cyan, magenta, yellow and black, and wherein said phase detection unit and said phase control unit perform their respective phase detection and phase control by employing as a reference said photosensitive drum of said black electrostatic recording unit.

6. A printing apparatus according to claim 1, wherein upon a start up by power on after the change of said electrostatic recording unit, said drum phase correction unit detects rotational positions of said plurality of photosensitive drums and corrects so as to set the rotational phases of said drums to a predetermined phase.

7. A printing apparatus according to claim 1, wherein at the stage of manufacture previous to shipments, said drum phase correction unit detects rotational positions of said plurality of photosensitive drums and corrects so as to set the rotational phases of said drums to a predetermined phase.

8. A printing apparatus comprising:

a belt conveying mechanism having a belt by means of which recording paper is conveyed at a certain speed;

a plurality of electrostatic recording units arranged in a direction in which said recording paper is conveyed, for forming latent images in conformity with image data through optical scanning of a plurality of rotating photosensitive drums, to develop them with toner components having different colors prior to the transfer onto the recording paper lying on said belt;

a positional offset detection unit for detecting positional offsets of transfer images onto the recording paper attributable to the wow and flutter in a drive system including said belt and photosensitive drums; and a wow and flutter correction unit for correcting positional offsets of the transfer images onto the recording paper attributable to said wow and flutter, on the basis of positional offsets detected by said positional offset detection unit.

9. A printing apparatus according to claim 8, wherein said wow and flutter detection unit comprises:

a resist mark transfer unit for causing at least one of said electrostatic recording units to act on said belt, to allow it to transfer resist marks at predetermined intervals thereonto; and a positional offset detection unit for detecting the intervals between said transfer resist marks on said belt by means of a sensor, to detect the positional offsets of the transfer images relative to the positions on said belt to thereby create the correction values.

10. A printing apparatus according to claim 9, wherein said wow and flutter detection unit has a belt position sensor for detecting a reference position of said conveyance belt; and wherein said resist mark transfer unit transfers said resist marks at predetermined pitches over the entire circumference of said belt starting from the detection position by said belt position sensor; and wherein said positional offset detecting unit detects a positional offset for each predetermined pitch over the entire circumference of said belt starting from the detection position by said belt position sensor, to generate a correction value and stores it into a correction information storage unit.

11. A printing apparatus according to claim 9, wherein said positional offset detection unit detects intervals $\Delta X1, \Delta X2, \ldots, \Delta Xn$ between resist marks in the conveyance direction on said belt by means of an optical sensor to obtain an average interval $\Delta Xa$ of the resist marks, and then it subtracts said average interval $\Delta Xa$ from the intervals $\Delta X1, \Delta X2, \ldots, \Delta Xn$ to obtain interval errors $\delta X1, \delta X2, \ldots, \delta Xn$ and stores either said intervals $\Delta X1, \Delta X2, \ldots, \Delta Xn$ or said interval errors $\delta X1, \delta X2, \ldots, \delta Xn$.

12. A printing apparatus according to claim 8, wherein said wow and flutter correction unit comprises a belt speed control unit for controllably correcting the speed of said belt motor so as to eliminate the positional offsets of the transfer images attributable to the wow and flutter in the drive system, on the basis of correction values generated by said positional offset detection unit.

13. A printing apparatus according to claim 8, wherein said wow and flutter correction unit comprises a drum speed control unit for controllably correcting the speed of said plurality of drum motors so as to eliminate the positional offsets of the transfer images attributable to the wow and flutter in the drive system, on the basis of correction values generated by said positional offset detection unit.

14. A printing apparatus according to claim 8, wherein said wow and flutter correction unit comprises a light emitting control unit for controllably correcting the light emission timing in the vertical scanning direction which is a belt conveyance direction in the optical scanning by said electrostatic record unit so as to eliminate the positional offsets of the transfer images attributable to the wow and flutter in the drive system, on the basis of correction values generated by said positional offset detection unit.

15. A printing apparatus according to claim 8, wherein said wow and flutter detection unit comprises:

a resist mark transfer unit for causing at least one of said electrostatic recording units to act on said belt, to allow it to transfer resist marks at predetermined intervals thereonto;

a positional offset detection unit having a sensor by means of which are detected intervals between the transfer resist marks on said belt, to detect positional offsets of the transfer images relative to the positions in the belt conveyance direction; and a Fourier transform unit for Fourier transforming the positional offset in the belt conveyance direction of said positional offset detection unit and decomposing it into positional offset components for each of a plurality of frequency components.

16. A printing apparatus according to claim 15, wherein said positional offset detection unit detects intervals $\Delta X1, \Delta X2, \ldots, \Delta Xn$ between resist marks in the conveyance direction on said belt by means of an optical sensor to obtain an average interval $\Delta Xa$ of the resist marks, and then subtracts said average interval $\Delta Xa$ from the intervals $\Delta X1, \Delta X2, \ldots, \Delta Xn$ to obtain interval errors $\delta X1, \delta X2, \ldots, \delta Xn$; and wherein said Fourier transform unit Fourier converts either said resist mark intervals $\Delta X1, \Delta X2, \ldots, \Delta Xn$ or interval errors $\delta X1, \delta X2, \ldots, \delta Xn$ in the belt conveyance direction, to generate a sine function indicative of a positional offset $\delta Xi$ of an intrinsic frequency component fi from $$\delta Xi = Ai \cdot \sin(\omega \cdot t + \phi i)$$

and stores as correction information angular frequency $\omega i$ [rad/sec], phase $\phi i$ [rad], and amplitude $Ai$ [$\mu$m] into said correction information storage unit.

17. A printing apparatus according to claim 15, wherein said wow and flutter correction unit calculates the amount of correction $\delta Xi$ for each frequency component fi from said sine function for each belt conveyance position on the basis of the correction information consisting of angular frequency $\omega i$, phase $\phi i$, and amplitude $Ai$ stored in said Fourier transform unit, to obtain an addition correction value $\delta X$ and controls on the basis of said addition correction value $\delta X$ so as to eliminate the positional offsets of the transfer images.

18. A printing apparatus according to claim 17, wherein said wow and flutter correction unit comprises a belt speed control unit for controllably correct the speed of said belt motor on the basis of so as to eliminate the positional offsets of the transfer images attributable to the wow and flutter of the drive system, on the basis of the correction information consisting of angular frequency $\omega i$, phase $\phi i$, and amplitude $Ai$ stored in said Fourier transform unit.

19. A printing apparatus according to claim 17, wherein said wow and flutter correction unit comprises a drum speed control unit for controllably correct the speed of said drum motor so as to eliminate the positional offset of the transfer images attributable to the wow and flutter in the drive system, on the basis of the correction information consisting of angular frequency $\omega i$, phase $\phi i$, and amplitude $Ai$ stored in said Fourier transform unit.

20. A printing apparatus according to claim 17, wherein said wow and flutter correction unit comprises a light emission control unit for controllably correct the light emission timing in the vertical scanning direction which is the belt conveyance direction in the optical scanning by said electrostatic recording unit, so as to eliminate the positional offsets of the transfer images attributable to the wow and flutter, on the basis of the correction information consisting of angular frequency $\omega i$, phase $\phi i$, and amplitude $Ai$ stored in said Fourier transform unit.

21. A printing apparatus according to claim 8, wherein upon a start up by power on after the change of said plurality of electrostatic recording units, said positional offset detection unit detects the positional offsets of the transfer images attributable to the wow and flutter in the drive system.

22. A printing apparatus according to claim 8, wherein at the stage of manufacture pervious to shipments, are detected the positional offsets of the transfer images attributable to the wow and flutter in the drive system.

* * * * *